United States Patent
Asai

(10) Patent No.: US 8,683,884 B2
(45) Date of Patent: Apr. 1, 2014

(54) MOTION CONVERSION DEVICE, FLEXIBLE ACTUATOR USING THE SAME, AND JOINT DRIVING UNIT

(75) Inventor: Katsuhiko Asai, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/105,332

(22) Filed: May 11, 2011

(65) Prior Publication Data
US 2011/0209570 A1 Sep. 1, 2011

Related U.S. Application Data

(63) Continuation of application No. PCT/JP2010/004084, filed on Jun. 18, 2010.

(30) Foreign Application Priority Data

Jul. 22, 2009 (JP) .................................. 2009-170850

(51) Int. Cl.
*F16H 25/18* (2006.01)
*B25J 19/00* (2006.01)

(52) U.S. Cl.
USPC .................. 74/89; 74/126; 74/129; 74/490.01

(58) Field of Classification Search
USPC ............... 74/89, 110, 126, 128, 129, 490.05, 74/490.01
See application file for complete search history.

(56) References Cited

U.S. PATENT DOCUMENTS 4,924,719 A 5/1990 Hyde et al.
5,650,704 A 7/1997 Pratt et al.

FOREIGN PATENT DOCUMENTS

| CN | 101209556 | 7/2008 |
|---|---|---|
| JP | 44-15849 | 7/1969 |
| JP | 3-157547 | 7/1991 |
| JP | 5-93780 | 12/1993 |

OTHER PUBLICATIONS

International Search Report issued Sep. 21, 2010 in International (PCT) Application No. PCT/JP2010/004084.
Michael Zinn et al., "A New Actuation Concept for Human-Friendly Robot Design—Playing it Safe", IEEE Robotics & Automation Magazine, vol. 11, Issue 2, pp. 12-21, Jun. 2004.
Antonio Bicchi et al., "Dealing with the Safety-Performance Tradeoff in Robot Arms Design and Control—Fast and 'Soft-Arm' Tactics", IEEE Robotics & Automation Magazine, vol. 11, Issue 2, pp. 22-33, Jun. 2004.
Translation of International Preliminary Report on Patentability issued Mar. 22, 2012 in International (PCT) Application No. PCT/JP2010/004084.
Chinese Office Action, with English translation, issued Dec. 4, 2013 in counterpart Chinese Patent Application No. 201080004171.1.

*Primary Examiner* — Willaim C Joyce
(74) *Attorney, Agent, or Firm* — Wenderoth, Lind & Ponack, L.L.P.

(57) ABSTRACT

Three or more displacement generation mechanisms, which allow some of a plurality of guide members that are provided respectively to a plurality of guide holding members that is capable of reciprocally moving substantially perpendicularly to shifting directions of a reciprocally movable linear motion structural member with respect to a base member, and a rocking member that is provided to an end of a linear motion member capable of reciprocally moving in directions substantially in parallel with the shifting directions of the guide holding members so as to rock around an axis substantially perpendicular to the respective shifting directions of the linear motion structural member and the linear motion member, to be made in contact with each other so that some of the guide holding members are displaced relatively to the linear motion structural member, are operation-controlled, with a result that a transmission gear ratio between a displacement velocity of the linear motion member and a displacement velocity of the linear motion structural member is changed.

17 Claims, 31 Drawing Sheets

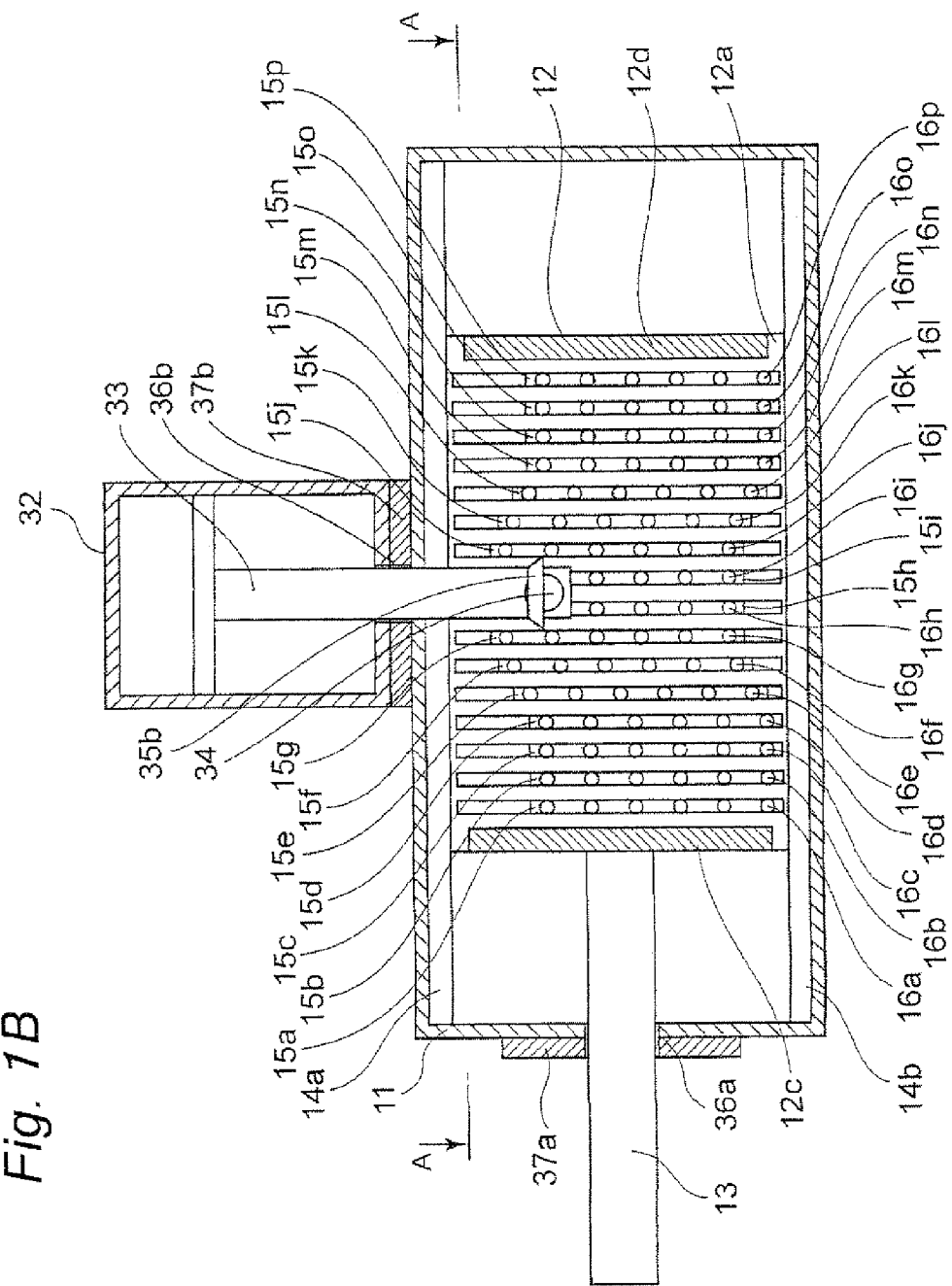

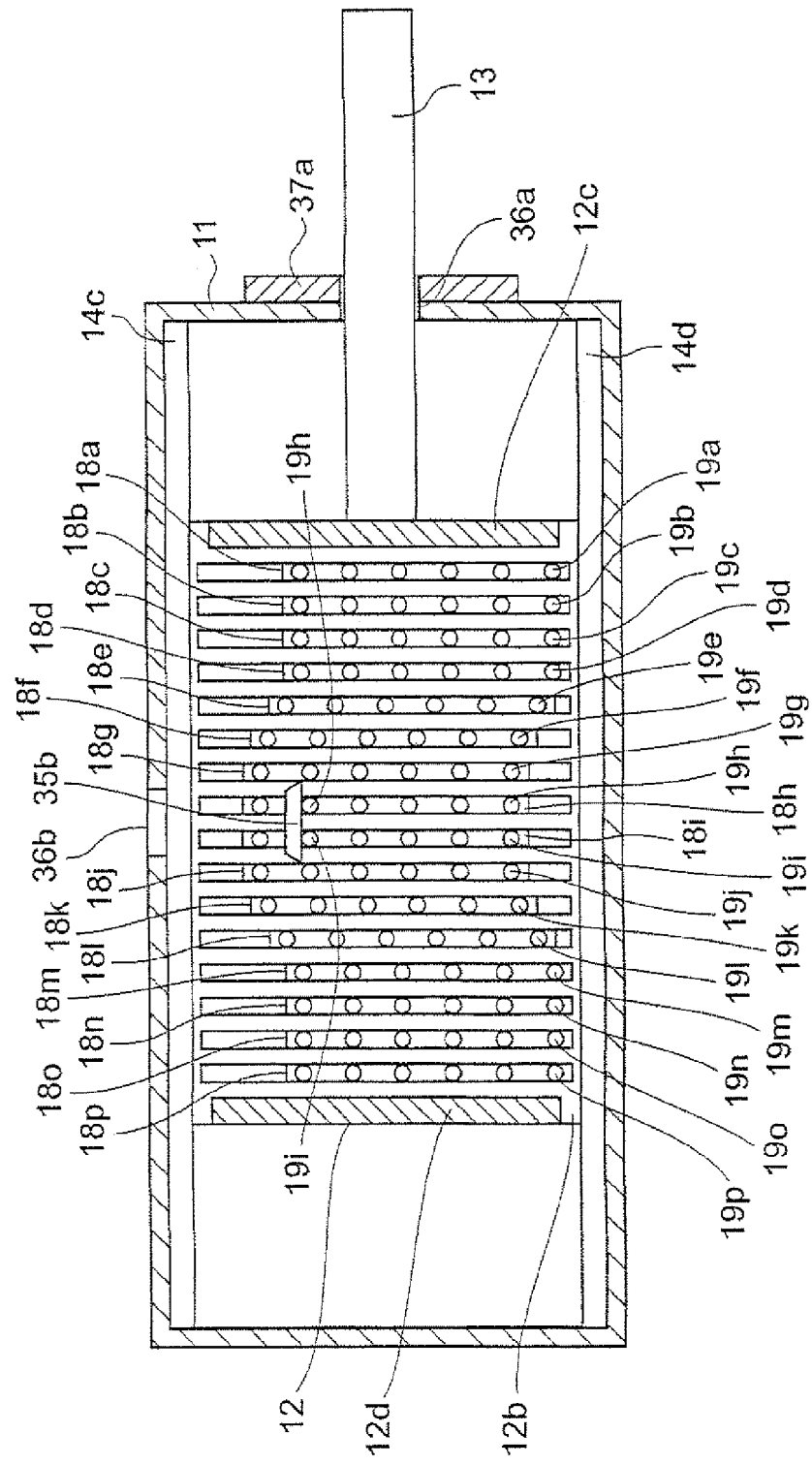

MOTION CONVERSION DEVICE, FLEXIBLE ACTUATOR USING THE SAME, AND JOINT DRIVING UNIT

This is a continuation application of International Application No. PCT/JP2010/004084, filed Jun. 18, 2010.

BACKGROUND OF THE INVENTION

The present invention relates to a motion conversion device that is capable of variably changing a transmission gear ratio and is superior in conversion efficiency, a flexible actuator using such a device, and a joint driving unit.

In recent years, there have been strong expectations for robots that are operated in an area close to the person, such as medical-use robots, home-use robots, and job-assistant robots for use in factories. Unlike industrial robots, it is important for these robots to ensure safety when made in contact with the person. In order to suppress an impact upon contact, a force to be exerted on the contact point needs to be minimized. Accordingly, a torque in the joint needs to be controlled so as to make the joint flexible for the robot arm. However, a force (torque) control operation by using an actuator for driving the joint fails to infinitely increase a response frequency, with the result that, in a case when a force in a high-frequency region is exerted (for example, when a robot arm collides with the person), it is not possible to perform an appropriate control operation. Normally, a joint driving mechanism uses a combination of a motor and a speed reducer, and the inertia for the robot arm is indicated by a value obtained by multiplying the inherent inertia of the motor by a square of a speed reducing ratio. For this reason, in a state where the force control is not effectively exerted, an extremely great force is exerted onto the contact point, with the result that the safety is not sufficiently ensured by relying only upon the force control.

In view of this issue, a system has been proposed in which an actuator and a load are connected to each other by using an elastic member referred to as Series Elastic Actuators (SEA) (for example, see Patent Document 1: U.S. Pat. No. 5,650,704). Since even a force in a high-frequency range that cannot be controlled by the actuators is constrained by the flexibility of the elastic member, the SEA are flexible actuators that can always realize a flexible joint for the arm and more highly safe operations can be ensured. In contrast, since the SEA and a load are connected to each other through the elastic member, a controllable frequency band is lowered in comparison with the conventional system. In order to compensate for these disadvantages, a system referred to as "Distributed macromini actuation (DM2)" in which an actuator for use in high frequencies is additionally installed (for example, see Non-Patent Document 1: IEEE Robotics & Automation Magazine, Volume 11, Issue 2, 12 to 21 pages, published in June, 2004), and a system referred to as "Variable Stiffness Transmission (VST)" in which the rigidity of the elastic member is variably changed (for example, see Non-Patent Document 2: IEEE Robotics & Automation Magazine, Volume 11, Issue 2, 22 to 33 pages, published in June, 2004) have been proposed.

In order to improve operation efficiency while maintaining flexibility, it will be desirable to provide a structure in which a force of the elastic structural member having a potential energy increased in response to a displacement is connected to an external load through a transmission capable of variably changing a transmission gear ratio with a reverse input being available. In this structure, a generated force of the elastic structural member is converted to an arbitrary force that is connected to an external load, and driving and regenerating operations can be switched without intermittences depending on operation directions. However, in a case of rocking operations in a joint driving process of a robot arm, there is a demand to the transmission for changing the transmission gear ratio with a small displacement, and there is also a demand for transmitting an output with a high force (torque)/velocity ratio. Under these conditions, even in a case when an actuator is structured by using a generally-used friction-type continuously variable transmission as a continuously variable transmission, a great energy is required for altering the transmission gear ratio. Therefore, it has been difficult to achieve an efficient flexible actuator.

In view of the above, an object of the present invention is to provide a motion conversion device that is capable of variably changing a transmission gear ratio and is superior in conversion efficiency, as well as a flexible actuator using such a device, and a joint driving unit.

SUMMARY OF THE INVENTION

In order to achieve the above-mentioned object, the present invention achieves the following structures.

In accordance with the present invention, there is provided a motion conversion device comprising:
a base member;
a linear motion structural member that is held on the base member so as to reciprocally move linearly relative to the base member;
a plurality of guide holding members that are provided on the linear motion structural member and is held thereon so as to reciprocally move substantially perpendicularly to shifting directions of the linear motion structural member;
a plurality of guide members that are provided respectively to the guide holding members at intervals in the shifting directions of the guide holding members;
a linear motion member that is held on the base member so as to reciprocally move in directions substantially in parallel with the shifting directions of the guide holding members;
a rocking member that is provided to an end of the linear motion member and is held thereon so as to rock around an axis substantially perpendicular to both of the shifting directions of the linear motion structural member and the shifting directions of the linear motion member, while being placed so as to be in contact with parts of the guide members;
three or more displacement generation mechanisms that are coupled to the guide holding members so as to allow parts of the guide holding members to be displaced relatively to the linear motion structural member; and
a control device that controls motions of the plurality of displacement generation mechanisms among the three or more displacement generation mechanisms so as to change a transmission gear ratio between a displacement velocity of the linear motion member and a displacement velocity of the linear motion structural member.

Moreover, in accordance with the present invention, there is provided a motion conversion device comprising:
a base member;
a rotary structural member that is held on the base member so as to rotate;
a plurality of guide holding members that are provided on the rotary structural member and are held thereon so as to reciprocally move substantially in parallel with a rotary axis of the rotary structural member;
a plurality of guide members that are provided respectively to the guide holding members at intervals in shifting directions of the guide holding members;

a linear motion member that is held on the base member so as to reciprocally move in directions substantially in parallel with the shifting directions of the guide holding members;

a rocking member that is provided to an end of the linear motion member and is held thereon so as to rock around an axis substantially perpendicular to the shifting directions of the linear motion member, while being placed so as to be in contact with parts of the guide members;

three or more displacement generation mechanisms that are coupled to the guide holding members so as to allow parts of the guide holding members to be displaced relatively to the rotary structural member; and a control device that controls motions of the plurality of the displacement generation mechanisms among the three or more displacement generation mechanisms so as to change a transmission gear ratio between a displacement velocity of the linear motion member and a rotation velocity of the rotary structural member.

Furthermore, in accordance with the present invention, there is provided a flexible actuator using the motion conversion device, wherein an elastic mechanism having potential energy changed in response to the displacement of the linear motion member is connected to the linear motion member.

In accordance with the present invention, there is provided a joint driving unit comprising:

the flexible actuator placed at a joint portion that couples two arms, wherein one of the arms is driven by the flexible actuator relative to the other arm.

In accordance with the present invention, it is possible to obtain a motion conversion device, as well as a flexible actuator using such a device, and a joint driving unit that are capable of variably changing a transmission gear ratio and are superior in conversion efficiency. In other words, in accordance with the present invention, a force exerted on the linear motion member is outputted to the linear motion structural member at a variably changed speed in response to the degree of a tilt of the rocking member, the tilt of which is changed along a row of guides formed by the guide members. For this reason, by controlling the displacement of the guide holding member by the displacement generation mechanism, the transmission gear ratio can be variably changed. Moreover, the outputs of the linear motion member and the linear motion structural member are designed to be operated in mechanical cooperation with each other at a ratio corresponding to the tilt of the rocking member, with motion conversion being carried out with no loss element interposed therebetween, so that it is also possible to improve the conversion efficiency.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1B is an X-X line cross-sectional view of FIG. 1A that shows the outline of the linear motion actuator in accordance with the first embodiment of the present invention;

FIG. 1K is a cross-sectional view that shows an outline of a driving state of the linear motion actuator in accordance with the first embodiment of the present invention;

DETAILED DESCRIPTION OF THE PREFERRED EMBODIMENTS

Figure 1A:
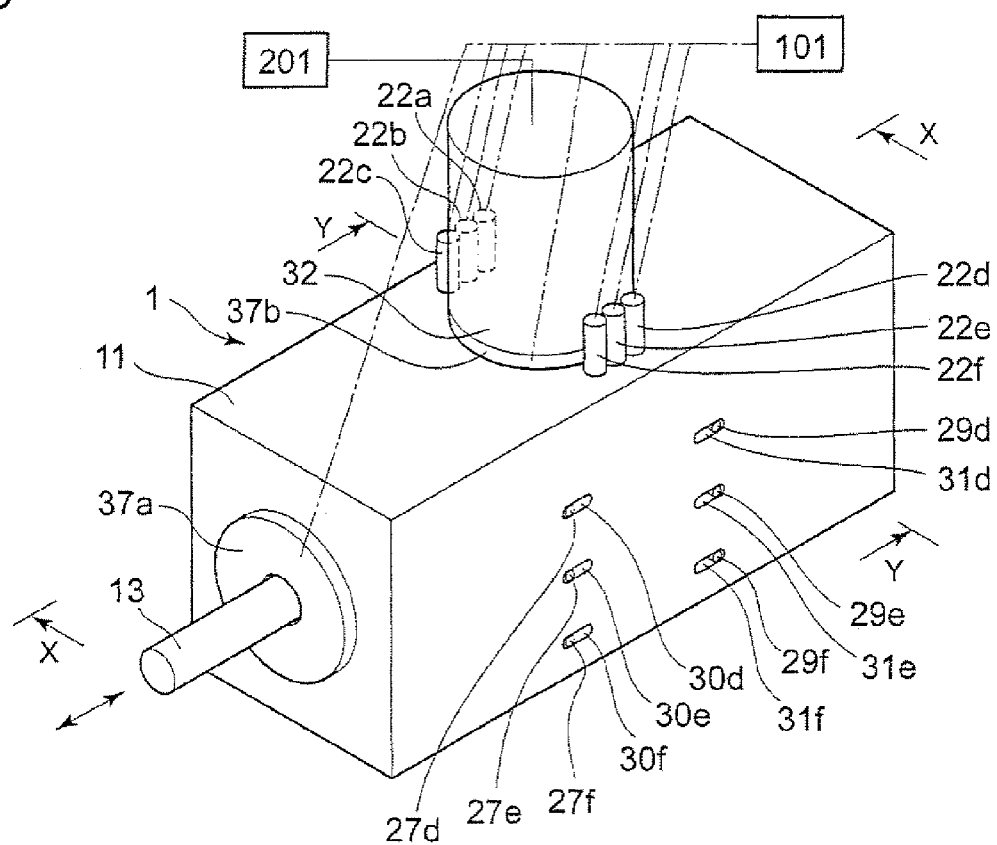
FIG. 1A is a perspective view that shows an outline of a linear motion actuator in accordance with a first embodiment of the present invention.

Referring to the drawings, the following will describe embodiments of the present invention in detail.

Prior to the detailed description of the embodiments of the present invention with reference to the drawings, the following will describe various aspects of the present invention.

In accordance with a first aspect of the present invention, there is provided a motion conversion device comprising:

a base member;

a linear motion structural member that is held on the base member so as to reciprocally move linearly relative to the base member;

a plurality of guide holding members that are provided on the linear motion structural member and are held thereon so as to reciprocally move substantially perpendicularly to shifting directions of the linear motion structural member;

a plurality of guide members that are provided respectively to the guide holding members at intervals in the shifting directions of the guide holding members;

a linear motion member that is held on the base member so as to reciprocally move in directions substantially in parallel with the shifting directions of the guide holding members;

a rocking member that is provided to an end of the linear motion member and is held thereon so as to rock around an axis substantially perpendicular to both of the shifting directions of the linear motion structural member and the shifting directions of the linear motion member, while being placed so as to be in contact with parts of the guide members;

three or more displacement generation mechanisms that are coupled to the guide holding members so as to allow parts of the guide holding members to be displaced relatively to the linear motion structural member; and a control device that controls motions of the plurality of displacement generation mechanisms among the three or more displacement generation mechanisms so as to change a transmission gear ratio between a displacement velocity of the linear motion member and a displacement velocity of the linear motion structural member.

With this structure, a force to be exerted on the linear motion member is outputted to the linear motion structural member in a speed-changed state in accordance with the degree of a tilt of the rocking member whose tilt is varied along a guide row that is formed by the guide members so that, by controlling the displacement of the guide holding members using the displacement generation mechanism, the transmission gear ratio can be variably changed. Moreover, the outputs of the linear motion member and the linear motion structural member are operated mechanically in cooperation with each other at a ratio in response to the tilt of the rocking member so that, since motion conversions are carried out without any loss factors, the conversion efficiency can also be improved. Therefore, it becomes possible to obtain the motion conversion device that has a variable transmission gear ratio and is superior in the conversion efficiency.

In accordance with a second aspect of the present invention, there is provided the motion conversion device according to the first aspect, wherein the plurality of guide holding members are provided along the shifting directions of the linear motion structural member at equal intervals.

In accordance with this arrangement, the displacement generation mechanism can be operated by using the same control method independent of the position of the linear motion structural member. Therefore, it is possible to provide the motion conversion device that can control the transmission gear ratio more easily.

In accordance with a third aspect of the present invention, there is provided a motion conversion device comprising:

a base member;

a rotary structural member that is held on the base member so as to rotate;

a plurality of guide holding members that are provided on the rotary structural member and are held thereon so as to reciprocally move substantially in parallel with a rotary axis of the rotary structural member;

a plurality of guide members that are provided respectively to the guide holding members at intervals in shifting directions of the guide holding members;

a linear motion member that is held on the base member so as to reciprocally move in directions substantially in parallel with the shifting directions of the guide holding members;

a rocking member that is provided to an end of the linear motion member and is held thereon so as to rock around an axis substantially perpendicular to the shifting directions of the linear motion member, while being placed so as to be in contact with parts of the guide members;

three or more displacement generation mechanisms that are coupled to the guide holding members so as to allow parts of the guide holding members to be displaced relatively to the rotary structural member; and a control device that controls motions of the plurality of the displacement generation mechanisms among the three or more displacement generation mechanisms so as to change a transmission gear ratio between a displacement velocity of the linear motion member and a rotation velocity of the rotary structural member.

With this arrangement, a force to be exerted on the linear motion member is outputted to the rotary structural member in a speed-changed state in accordance with the degree of a tilt of the rocking member whose tilt is varied along a guide row that is formed by the guide members so that, by controlling the displacement of the guide holding members using the displacement generation mechanism, the transmission gear ratio can be variably changed. Moreover, the outputs of the linear motion member and the rotary structural member are operated mechanically in cooperation with each other at a ratio in response to the tilt of the rocking member so that, since motion conversions are carried out without any loss factors, the conversion efficiency can be improved. Therefore, it becomes possible to obtain the motion conversion device that has a variable transmission gear ratio and is superior in the conversion efficiency.

In accordance with a fourth aspect of the present invention, there is provided a motion conversion device according to the third aspect, wherein the plurality of guide holding members are provided on a circumference around the rotation axis of the rotary structural member at equal intervals.

With this arrangement, the displacement generation mechanism can be operated by using the same control method independent of the rotation angle of the rotary structural member. Therefore, it is possible to provide the motion conversion device that can control the transmission gear ratio more easily.

In accordance with a fifth aspect of the present invention, there is provided a motion conversion device according to any one of the first to fourth aspects, wherein a plurality of rocking members are provided to the end of the linear motion member and the plurality of rocking members are disposed symmetrically with respect to a center axis in the shifting directions of the linear motion member.

With this arrangement, since the rotary torque to be exerted on the linear motion member is constrained, the mechanism used for maintaining the linear motion member can be simplified. Therefore, it is possible to provide the motion conversion device having a smaller size.

In accordance with a sixth aspect of the present invention, there is provided a motion conversion device according to anyone of the first to fourth aspects, wherein surface portions of the guide members capable of contacting the rocking member are freely rotatable with respect to the guide holding members.

With this arrangement, it becomes possible to reduce resistance that is exerted when the rocking member and the guide member are relatively moved while being made in contact with each other. Therefore, it is possible to provide the motion conversion device that has good conversion efficiency.

In accordance with a seventh aspect of the present invention, there is provided a motion conversion device according to any one of the first to fourth aspects, wherein the plurality of guide members are provided on the guide holding members at equal intervals.

With this arrangement, the displacement generation mechanism can be operated by using the same control method independent of the position of the linear motion member. Therefore, it is possible to provide the motion conversion device that can control the transmission gear ratio more easily.

In accordance with an eighth aspect of the present invention, there is provided a motion conversion device according to any one of the first to fourth aspects, further comprising a precompression mechanism that presses the guide holding members toward one side in the shifting directions of the guide holding members.

With this structure, a force can be sufficiently applied even from one direction as the force to be applied to the guide holding member by the displacement generation mechanism so that the structure of the displacement generation mechanism can be simplified. Therefore, it becomes possible to obtain the motion conversion device having a simpler structure.

In accordance with a ninth aspect of the present invention, there is provided a motion conversion device according to any one of the first to fourth aspects, wherein the guide holding members hold the guide members so as to allow a distance between the guide members to be extendable.

With this arrangement, it is possible to suppress a state where upon changing the transmission gear ratio, the rocking member is interfered with the adjacent guide member. It becomes possible to provide the motion conversion device that can control the transmission gear ratio more easily.

In accordance with a tenth aspect of the present invention, there is provided a motion conversion device according to any one of the first to fourth aspects, wherein a contact surface of the rocking member against the guide members forms a plane including a rocking center axis of the rocking member.

With this arrangement, it is possible to suppress the center of the contact surface from deviating from the rocking center axis when the rocking member is tilted. It becomes possible to provide the motion conversion device that can control the transmission gear ratio more easily.

In accordance with an eleventh aspect of the present invention, there is provided a motion conversion device according to any one of the first to fourth aspects, wherein the rocking member is further provided with a tapered portion that has a contact surface with a portion at a guide member side being widened in a cross-sectional shape on a plane perpendicular to a rocking center axis of the rocking member.

With this structure, even in the case when the rocking member is tilted, it is possible to prevent the rocking member from disturbing the operations of the guide holding member that is not made in contact with the contact surface of the rocking member. Therefore, it becomes possible to provide the motion conversion device that can control the transmission gear ratio more easily.

In accordance with a twelfth aspect of the present invention, there is provided a motion conversion device according to any one of the first to fourth aspects, wherein the guide holding member located at one end portion of the three or more guide holding members that are adjacent with one another and are displaced by the three or more displacement generation mechanisms is displaced simultaneously with the guide holding member that is not included in the three or more guide holding members and is positioned adjacent to the guide holding member located on another end portion of the three or more guide holding members.

With this arrangement, the distribution of the guide holding members to be operated by the respective displacement generation mechanisms is made uniform so that loads to be applied to the displacement generation mechanisms are averaged. Therefore, it is possible to obtain the motion conversion device in which the portion occupied by the displacement generation mechanisms is made smaller.

In accordance with a thirteenth aspect of the present invention, there is provided a motion conversion device according to any one of the first to fourth aspects, wherein displacements of the guide holding members in response to an operation of the displacement generation mechanisms are identical for each of installation intervals of the rocking members.

With this arrangement, although a plurality of rocking members are used, the number of the displacement generation mechanisms to be required can be made minimum. Therefore, it is possible to obtain the motion conversion device in which the portion occupied by the displacement generation mechanisms is made smaller.

In accordance with a fourteenth aspect of the present invention, there is provided a motion conversion device according to any one of the first to fourth aspects, wherein, when the plurality of guide members capable of newly contacting the rocking member are provided to the identical guide holding members, the control device controls the operation of the displacement generation mechanism such that the guide member located at a position closest to the linear motion member is in contact with the rocking member, and when the guide holding member including the guide member in contact with the rocking member is displaced so as to change a tilt of the rocking member, the control device controls the operation of the displacement generation mechanism so as to minimize an amount of displacement in a reverse direction from the contact surface of the guide member in contact with the rocking member.

With this structure, since the reverse input to the displacement generation mechanism can be made smaller, an energy loss caused by the reverse input can be suppressed even when the displacement generation mechanism is not provided with an energy recovering function. Therefore, it is possible to obtain the motion conversion device having good operation efficiency.

In accordance with a fifteenth aspect of the present invention, there is provided a motion conversion device according to any one of the first to fourth aspects, wherein, when the plurality of guide members capable of newly contacting the rocking member are provided to the identical guide holding members, the control device controls the operation of the displacement generation mechanism such that the guide member, located at a position closest to a center position of a stroke of the guide holding member itself while in contact, is in contact with the rocking member, and when the guide holding member including the guide member in contact with the rocking member is displaced so as to change a tilt of the rocking member, the control device controls the operation of the displacement generation mechanism so as to minimize an amount of displacement of the guide holding member.

With this arrangement, a stroke required for the displacement generation mechanism can be suppressed. Therefore, it is possible to obtain the motion conversion device having smaller displacement generation mechanisms.

In accordance with a sixteenth aspect of the present invention, there is provided a motion conversion device according to any one of the first to fourth aspects, wherein, when the guide holding members located on two sides of the guide holding member including the guide member in contact with the rocking member are operated by the identical displacement generation mechanism, the control device controls the operation of the displacement generation mechanism such that the displacement of the guide holding member located in a relative motion direction of the rocking member leads to a desired position.

With this arrangement, even when the number of the displacement generation mechanisms is minimized, the transmission gear ratio can be changed efficiently. Therefore, it is possible to obtain the motion conversion device in which the portion occupied by the displacement generation mechanisms is made smaller.

In accordance with a seventeenth aspect of the present invention, there is provided a flexible actuator using the motion conversion device according to any one of the first to fourth aspects, wherein an elastic mechanism having potential energy changed in response to the displacement of the linear motion member is connected to the linear motion member.

With this arrangement, a generated force from the elastic mechanism is converted to an arbitrary force, and connected to an external load, and operations between the driving and recovering can be carried out without connected points depending on operation directions. Therefore, it is possible to obtain the flexible actuator that can improve the operation efficiency, with flexibility being maintained.

In accordance with an eighteenth aspect of the present invention, there is provided a flexible actuator according to the 17th aspect, wherein the elastic mechanism is provided as a piston-cylinder mechanism that is pressurized by a pressure of a compressive fluid.

With this arrangement, the adjustment of elastic modulus of the flexible mechanism can be easily carried out by the amount of the compressive fluid. Therefore, it is possible to obtain the flexible actuator whose performances can be easily adjusted.

In accordance with a nineteenth aspect of the present invention, there is provided a flexible actuator with multiple axes, comprising:

a plurality of flexible actuators according to the 18th aspect, wherein the compressive fluid for use in applying a pressure to each of the flexible actuators is commonly used.

With this arrangement, since pressure fluctuations in the compressive fluid can be averaged, the pressure fluctuations of the compressive fluid caused by changes in the piston position can be made smaller as the cooperativity of the operations of the respective flexible actuators is lower so that the flexible actuator with multiple axes having more stable performances can be obtained.

In accordance with a twentieth aspect of the present invention, there is provided a joint driving unit comprising:

the flexible actuator according to the 17th aspect placed at a joint portion that couples two arms, wherein
one of the arms is driven by the flexible actuator relative to the other arm.

With this arrangement, a joint driving unit that is driven by the flexible actuator described in any one of the seventeenth to nineteenth aspects is prepared so that the joint driving unit having the functions and effects of the flexible actuator can be obtained.

Referring to the drawings, the following will describe various embodiments of the present invention.

First Embodiment

Figure 1C:
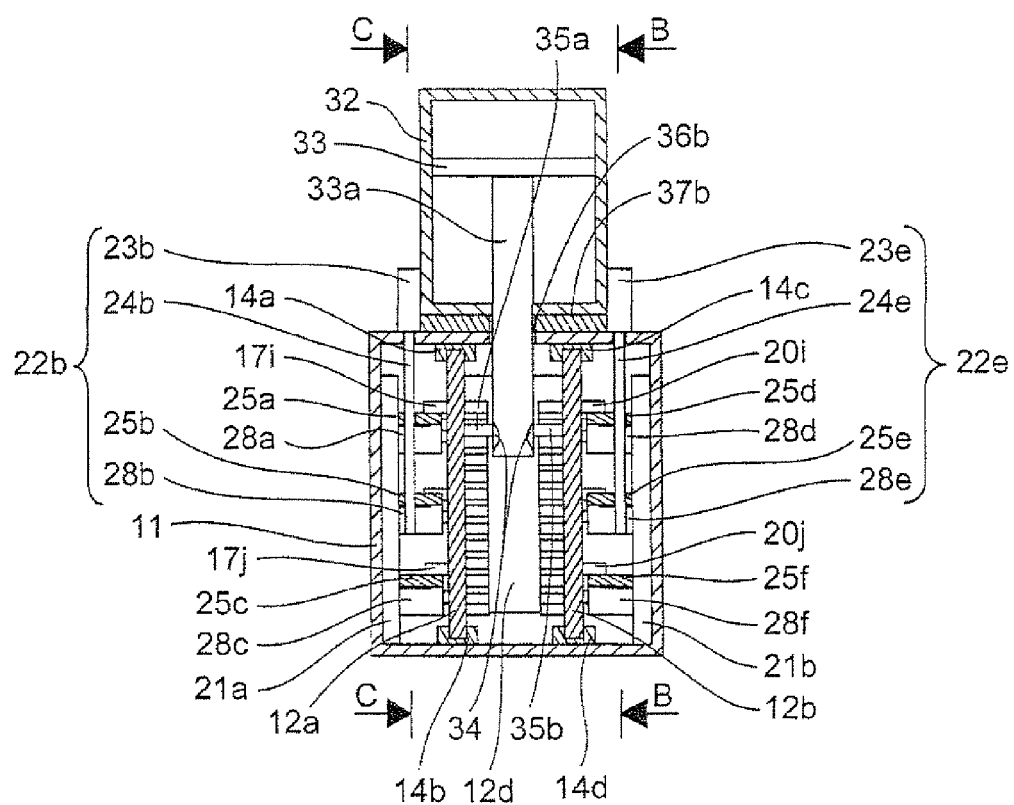
FIG. 1C is a Y-Y line cross-sectional view of FIG. 1A that shows the outline of the linear motion actuator in accordance with the first embodiment of the present invention.
Figure 1D:
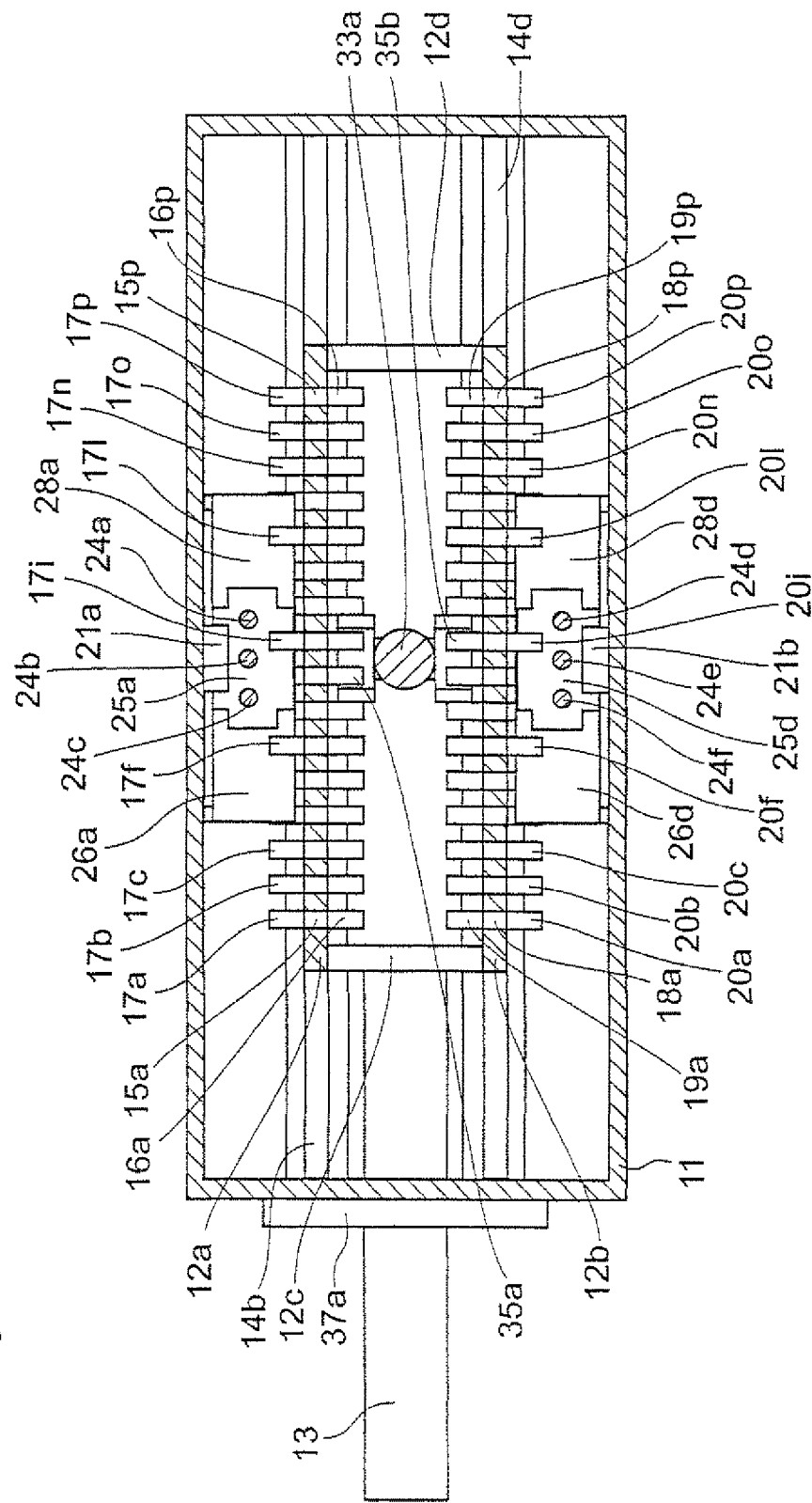
FIG. 1D is an A-A line cross-sectional view of FIG. 1B that shows the outline of the linear motion actuator in accordance with the first embodiment of the present invention.
Figure 1E:
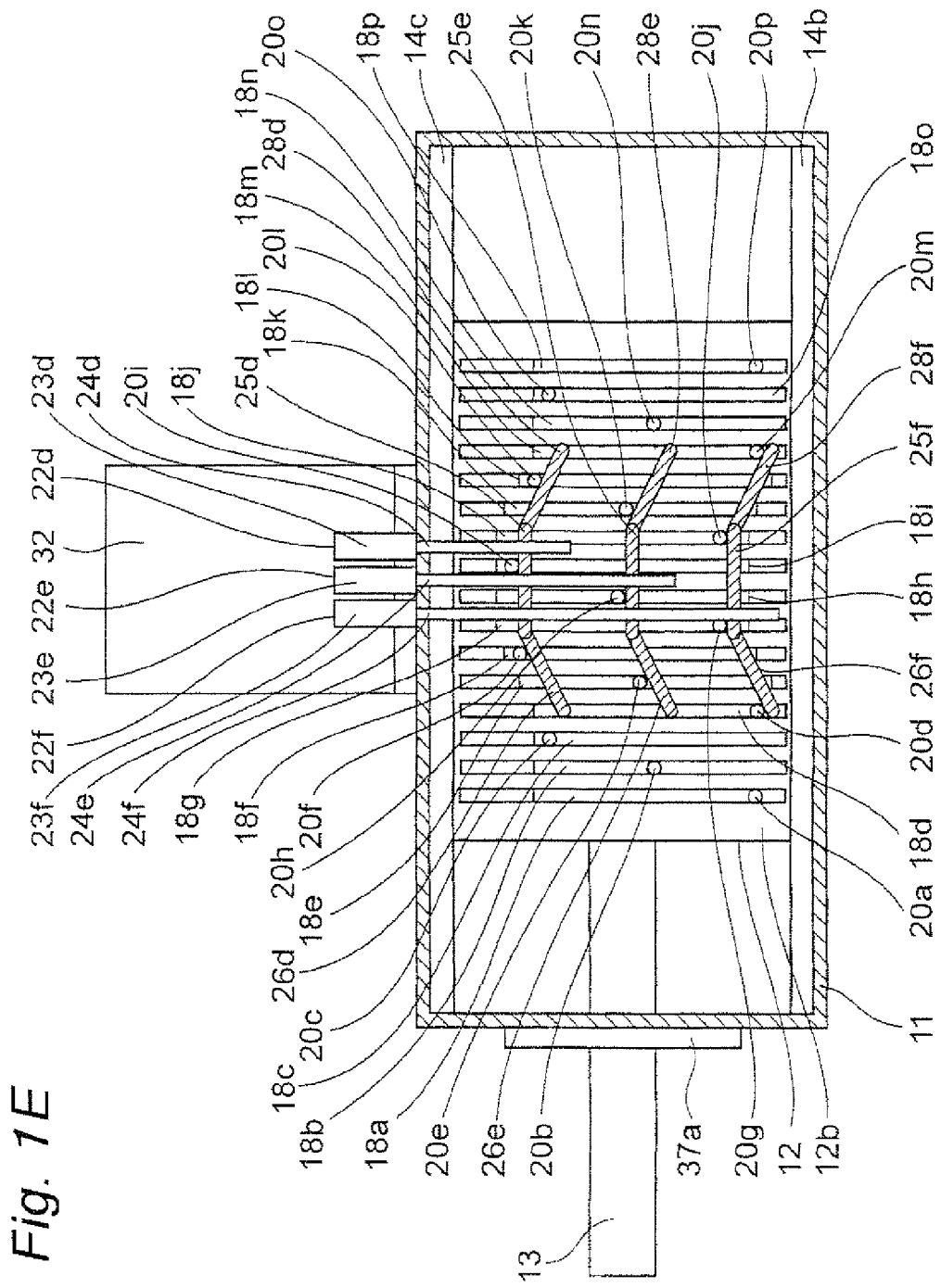
FIG. 1E is a B-B line cross-sectional view of FIG. 1C that shows the outline of the linear motion actuator in accordance with the first embodiment of the present invention.
Figure 1F:
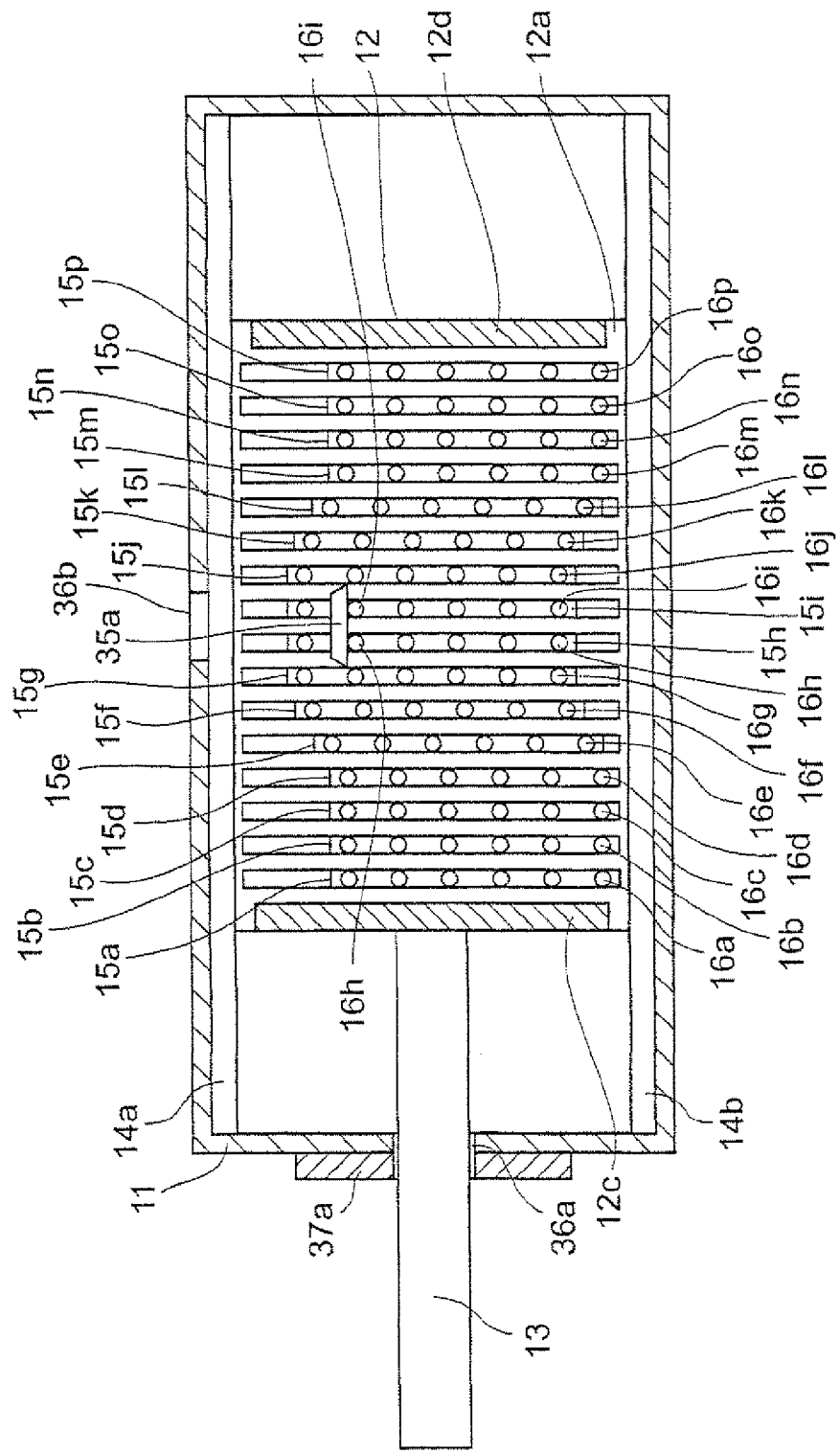
FIG. 1F is a cross-sectional view that shows an outline of a driving state of the linear motion actuator in accordance with the first embodiment of the present invention.
Figure 1G:
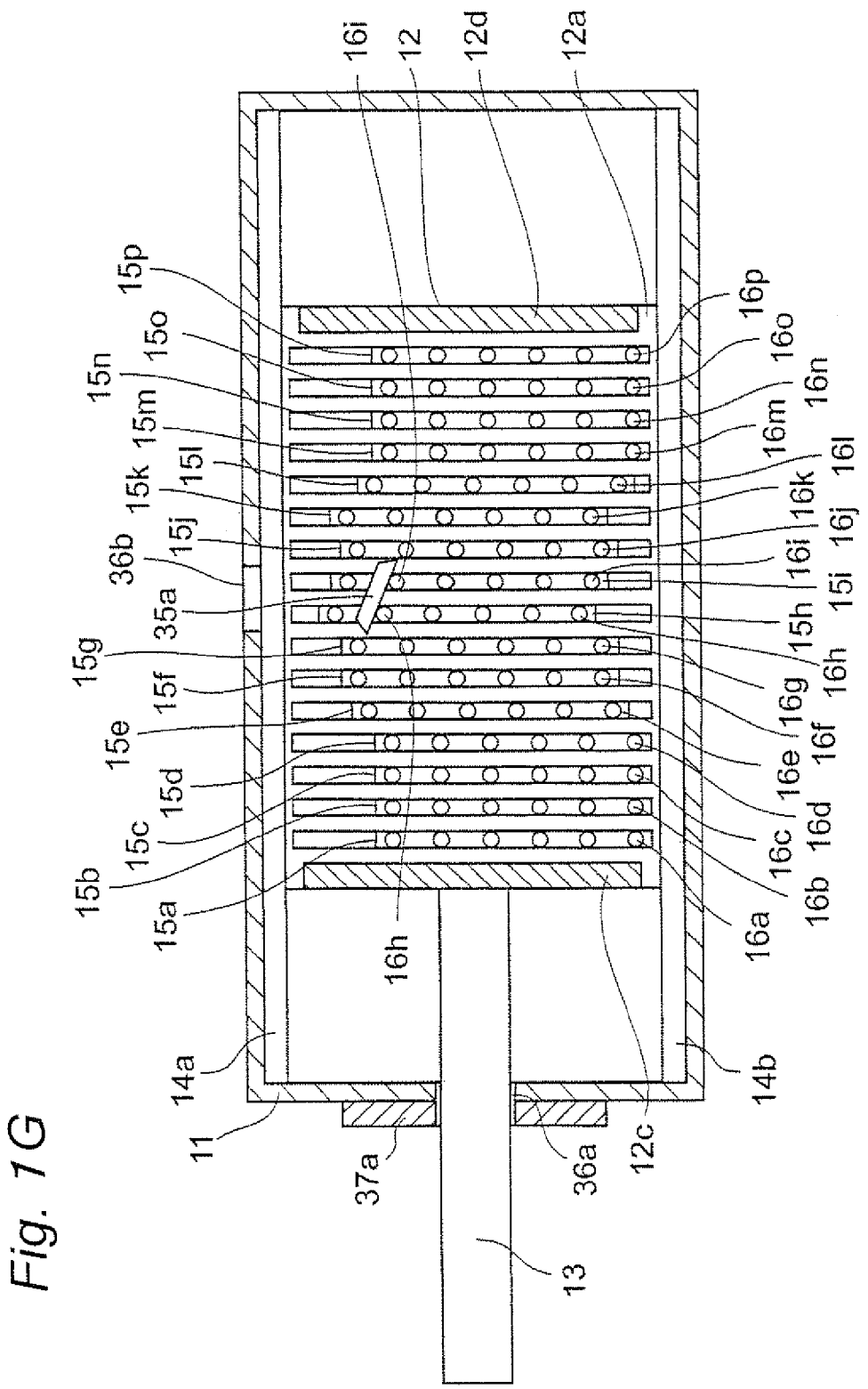
FIG. 1G is a cross-sectional view that shows an outline of a driving state of the linear motion actuator in accordance with the first embodiment of the present invention.
Figure 1H:
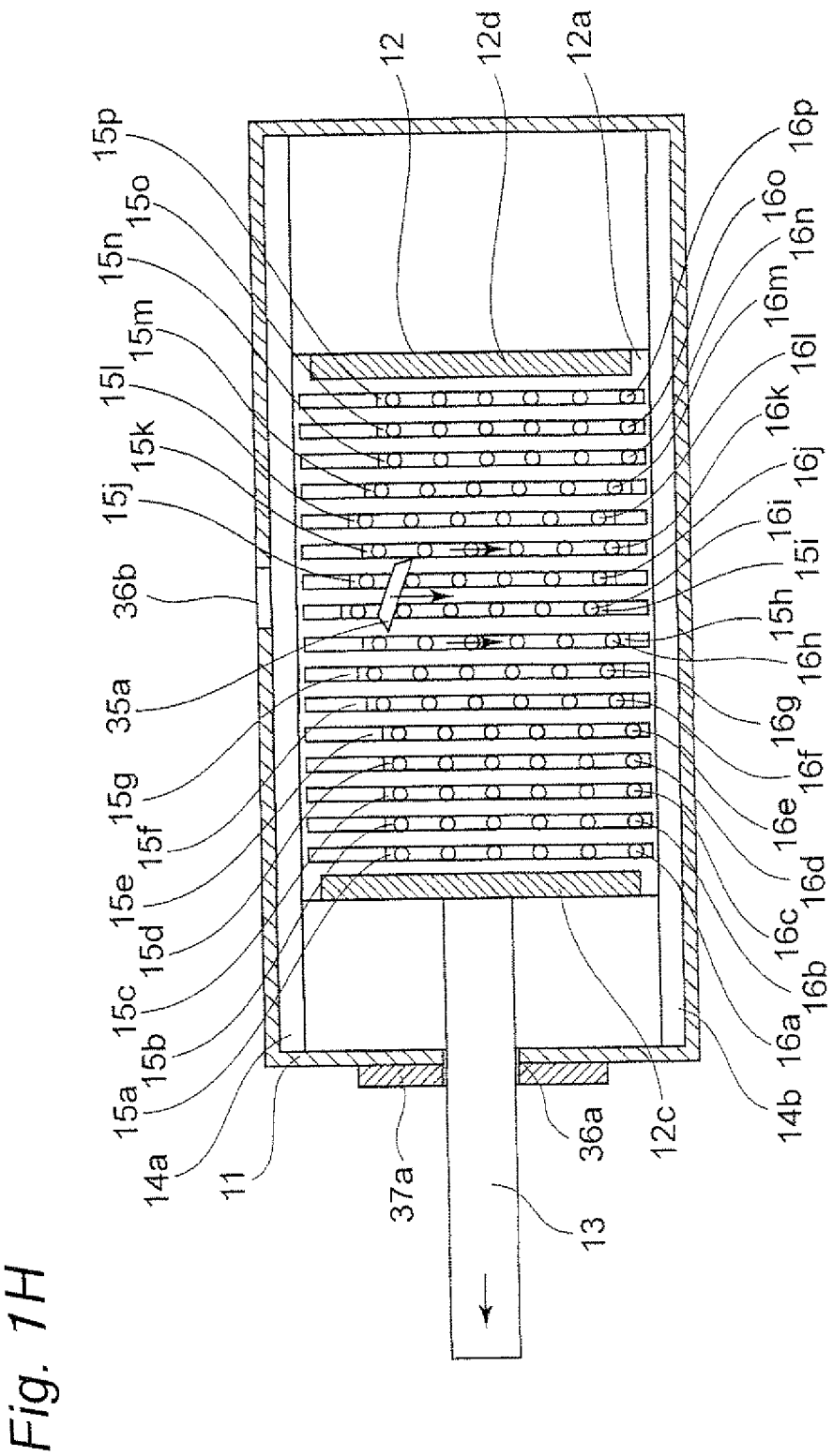
FIG. 1H is a cross-sectional view that shows an outline of a driving state of the linear motion actuator in accordance with the first embodiment of the present invention.
Figure 1I:
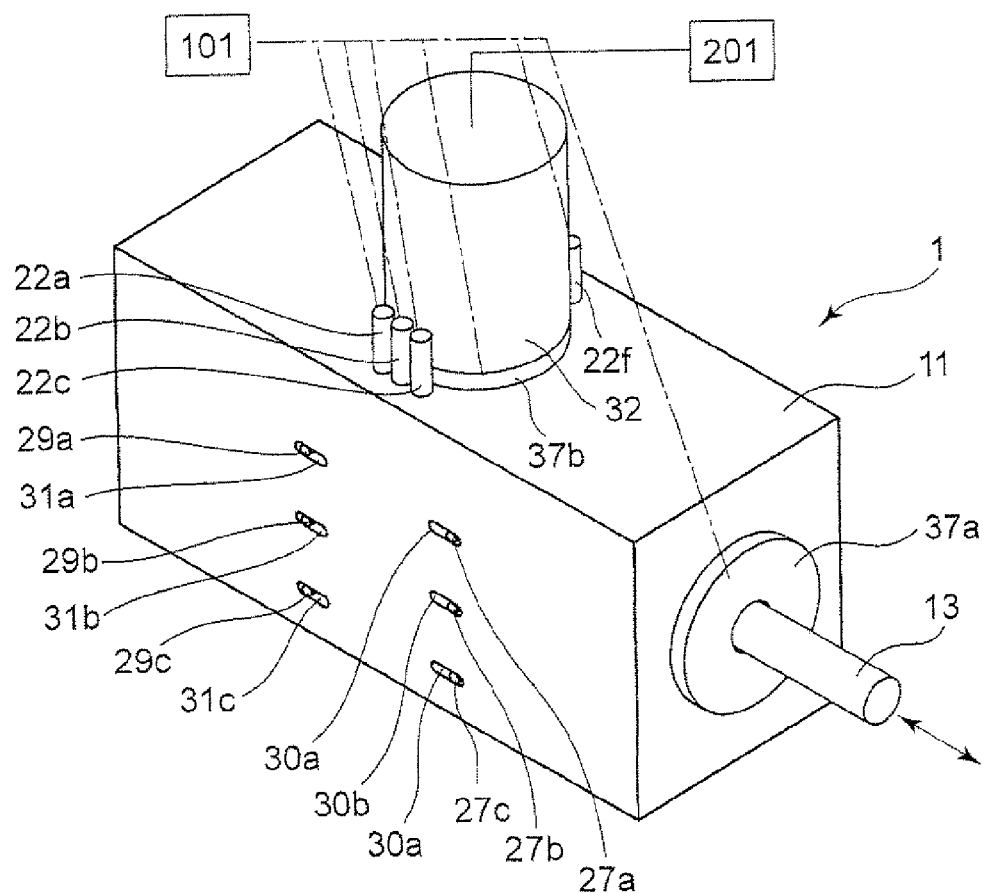
FIG. 1I is a perspective view that shows an outline of the linear motion actuator in accordance with the first embodiment of the present invention.
Figure 1J:
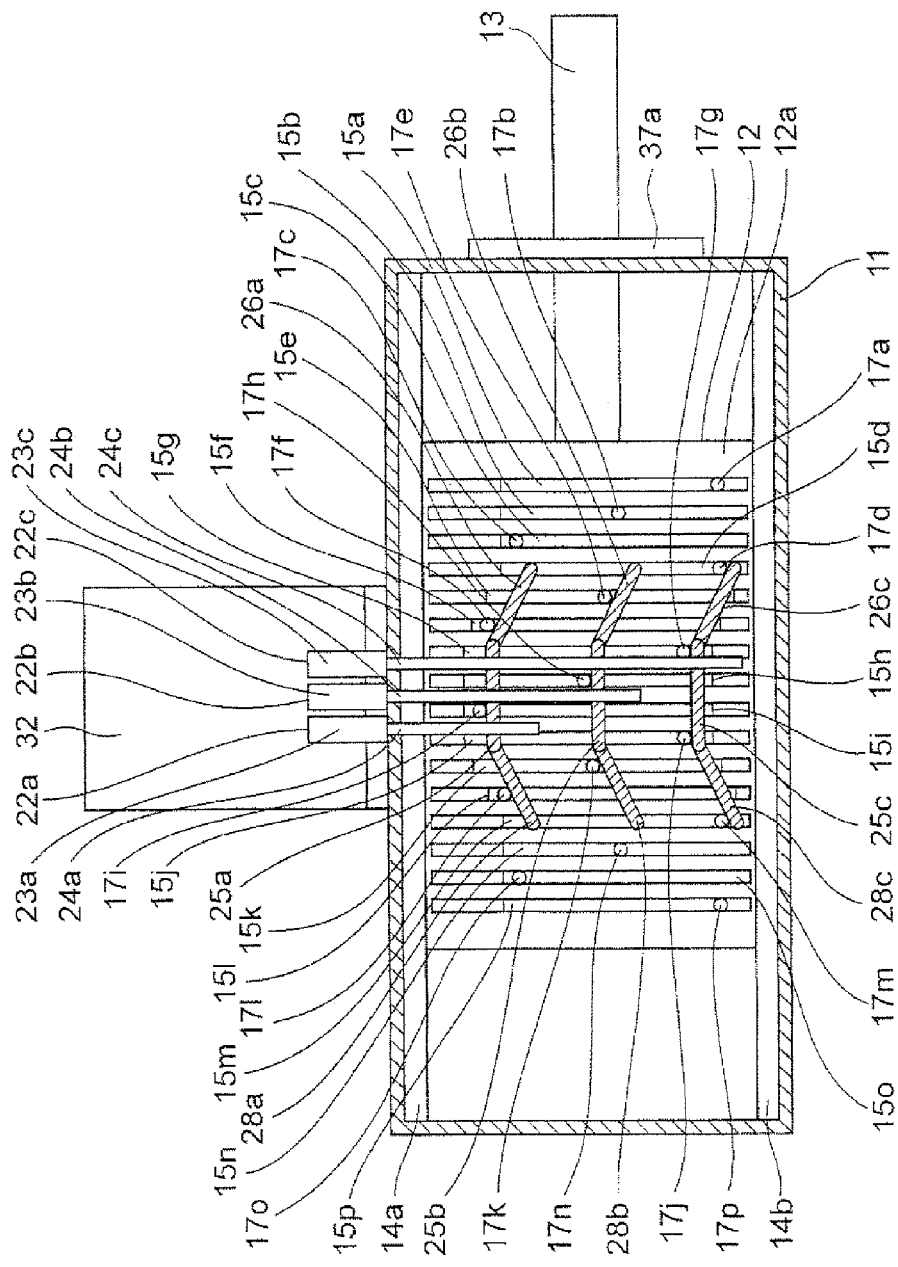
FIG. 1J is a C-C line cross-sectional view of FIG. 1C that shows the outline of the linear motion actuator in accordance with the first embodiment of the present invention.

FIGS. 1A and 1I are perspective views each of which shows an outline of a linear motion actuator 1 as one example of a flexible actuator using a motion conversion device in accordance with a first embodiment of the present invention. FIG. 1B is an X-X line cross-sectional view of FIG. 1A and FIG. 1C is a Y-Y line cross-sectional view of FIG. 1A, respectively. Moreover, FIG. 1D is an A-A line cross-sectional view of FIG. 1B, FIG. 1E is a B-B line cross-sectional view of FIG. 1C, and FIG. 1J is a C-C line cross-sectional view of FIG. 1C. FIG. 1F is a view corresponding to the cross-sectional view of FIG. 1B in which a cylinder 32, a piston 33, a rotary member 34, and a transmission plate 35b are not shown for simplicity of the description, and FIG. 1K is a cross-sectional view that shows the cross section of FIG. 1F viewed in a reverse direction.

In FIGS. 1A to 1K, four guide rails 14a, 14b, 14c, and 14d are installed in parallel with one another with predetermined intervals, in a frame 11 having a rectangular parallelepiped box-shape serving as one example of a base member.

A box-shaped member 12 serving as one example of the linear motion structural member is connected to the guide rails 14a, 14b, 14c, and 14d in a manner so as to linearly and freely reciprocally move, more specifically, so as to freely reciprocally move in lateral directions of FIG. 1B. Moreover, a rod 13 is secured to a substantially center portion of one of the ends of the box-shaped member 12 in the axial direction of the box-shaped member 12, so as to be exposed to the outside of the frame 11 through a through hole 36a formed in the substantially center portion of one of endplates of the frame 11; thus, the movement of the box-shaped member 12 can be taken out of the frame 11.

Moreover, the amount of displacement of the rod 13 can be measured by a linear encoder 37a placed on the circumference of the through hole 36a on one of the end plates of the frame 11. The linear encoder 37a may be of a magnetostrictive type or an optical type.

The box-shaped member 12 has a structure in which a plate-shaped member 12a connected to the two guide rails 14a and 14b shown on the left side in the frame 11 of FIG. 1C and a plate-shaped member 12b connected to the two guide rails 14c and 14d shown on the right side in the frame 11 of FIG. 1C are coupled to each other with two plate-shaped members 12c and 12d illustrated on the lateral ends in the frame 11 of FIG. 1B.

In the plate-shaped member 12a, sixteen grooves 90 that have an elongated rectangular shape and are in parallel with one another are formed in a vertical direction (a direction substantially perpendicular to the shifting directions of the box-shaped member 12) of FIG. 1B, and sixteen rod-shaped support members 15a, 15b, 15c, 15d, 15e, 15f, 15g, 15h, 15i, 15j, 15k, 15l, 15m, 15n, 15o, and 15p, each serving as one example of a guide holding member, are held at equal intervals so as to freely reciprocally move in the sixteen elongated rectangular grooves 90 in the vertical direction (direction substantially perpendicular to the shifting directions of the box-shaped member 12) of FIG. 1B. Onto the front surfaces of the support members 15a, 15b, 15c, 15d, 15e, 15f, 15g, 15h, 15i, 15j, 15k, 15l, 15m, 15n, 15o, and 15p, sixteen cam follower member groups G16a, G16b, G16c, G16d, G16e, G16f, G16g, G16h, G16i, G16j, G16k, G16l, G16m, G16n, G16o, and G16p respectively configured by six cylinder-shaped cam follower members 16a, 16b, 16c, 16d, 16e, 16f, 16g, 16h, 16i, 16j, 16k, 16l, 16m, 16n, 16o, and 16p, disposed at equal intervals in the axial direction, each serving as one example of a guide member, are respectively connected, and also onto the rear surface of each of the support members, each of cylinder-shaped cam follower members 17a, 17b, 17c, 17d, 17e, 17f, 17g, 17h, 17i, 17j, 17k, 17l, 17m, 17n, 17o, and 17p is connected. As will be described later, the cam follower members 17c, 17f, 17i, 17l, and 17o are disposed on the upper portions of the respective support members so as to be made in contact with plate-shaped members 25a, 26a, and 28a, which will be described later. The cam follower members 17b, 17e, 17h, 17k, and 17n are disposed on the center portions of the respective support members so as to be made in contact with plate-shaped members 25b, 26b, and 28b, which will be described later. The cam follower members 17a, 17d, 17g, 17j, 17m, and 17p are disposed on the lower portions of the respective support members so as to be made in contact with plate-shaped members 25c, 26c, and 28c, which will be described later. Moreover, all the cam follower members 16a, 16b, 16c, 16d, 16e, 16f, 16g, 16h, 16i, 16j, 16k, 16l, 16m, 16n, 16o, and 16p are designed to have the same diameter. Furthermore, all the cam follower members 17a, 17b, 17c, 17d, 17e, 17f, 17g, 17h, 17i, 17j, 17k, 17l, 17m, 17n, 17o, and 17p are designed to have the same diameter. The cam follower members 16a, 16b, 16c, 16d, 16e, 16f, 16g, 16h, 16i, 16j, 16k, 16l, 16m, 16n, 16o, and 16p are respectively formed with respect to the support members 15a, 15b, 15c, 15d, 15e, 15f, 15g, 15h, 15i, 15j, 15k, 15l, 15m, 15n, 15o, and 15p (15a to 15p), at intervals in the shifting directions of the support members 15a to 15p.

Figure 4A:
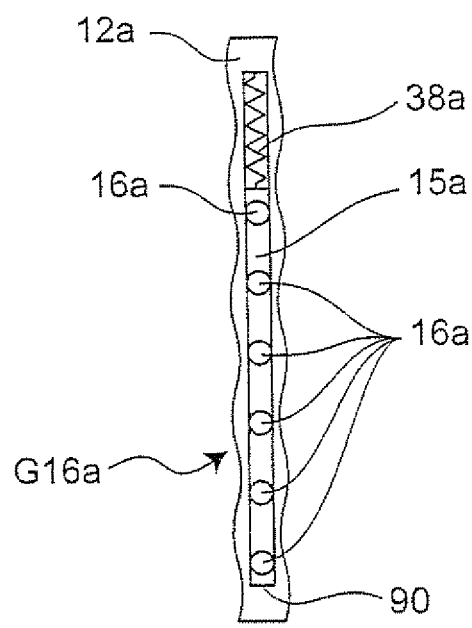
FIG. 4A is a view that shows one example of a precompression mechanism in accordance with the first embodiment of the present invention.
Figure 4B:
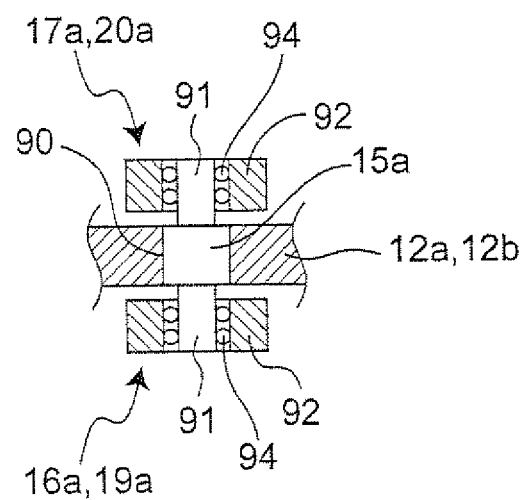
FIG. 4B is an enlarged cross-sectional view that shows a specific structure near a support member in accordance with the present invention.

As typically shown as an example in FIG. 4B, the six cam follower members 16a, 16b, 16c, 16d, 16e, 16f, 16g, 16h, 16i, 16j, 16k, 16l, 16m, 16n, 16o, and 16p respectively in the cam follower member groups G16a, G16b, G16c, G16d, G16e, G16f, G16g, G16h, G16i, G16j, G16k, G16l, G16m, G16n, G16o, and G16p on the front surfaces of the support members 15a, 15b, 15c, 15d, 15e, 15f, 15g, 15h, 15i, 15j, 15k, 15l, 15m, 15n, 15o, and 15p, as well as the cam follower members 17a, 17b, 17c, 17d, 17e, 17f, 17g, 17h, 17i, 17j, 17k, 17l, 17m, 17n, 17o, and 17p on the rear surfaces of the support members 15a, 15b, 15c, 15d, 15e, 15f, 15g, 15h, 15i, 15j, 15k, 15l, 15m, 15n, 15o, and 15p, are each configured by a column-shaped shaft portion 91 that is secured to each of the support members 15a, 15b, 15c, 15d, 15e, 15f, 15g, 15h, 15i, 15j, 15k, 15l, 15m, 15n, 15o, and 15p, and a cylindrical circumferential portion 92 that is freely rotatable relative to the shaft portion 91 by the respective cam follower members in each of the cam follower member groups and needle bearings 94 respectively built in the cam follower members, so that the respective cam follower members in each of the cam follower member groups and the circumferential portions 92 of the respective cam follower members are freely rotatable relative to the support members 15a, 15b, 15c, 15d, 15e, 15f, 15g, 15h, 15i, 15j, 15k, 15l, 15m, 15n, 15o, and 15p.

In the same manner as in the plate-shaped member 12a, in the plate-shaped member 12b, sixteen grooves 90 that have an elongated rectangular shape and are in parallel with one another are formed in a vertical direction of FIG. 13, and sixteen rod-shaped support members 18a, 18b, 18c, 18d, 18e, 18f, 18g, 18h, 18i, 18j, 18k, 18l, 18m, 18n, 18o, and 18p, each serving as one example of a guide holding member, are connected to one another at equal intervals in the sixteen elongated rectangular grooves 90, so as to be freely reciprocally move in the vertical direction of FIG. 1B. Onto the front surfaces of the support members 18a, 18b, 18c, 18d, 18e, 18f, 18g, 18h, 18i, 16j, 18k, 18l, 18m, 18n, 18o, and 18p, sixteen cam follower member groups G19a, G19b, G19c, G19d, G19e, G19f, G19g, G19h, G19i, G19j, G19k, G19l, G19m, G19n, G19o, and G19p respectively configured by six cylinder-shaped cam follower members 19a, 19b, 19c, 19d, 19e, 19f, 19g, 19h, 19i, 19j, 19k, 19l, 19m, 19n, 19o, and 19p, disposed at equal intervals in the axial direction, each serving as one example of a guide member, are connected respectively, and also onto the rear surface of each of the support members, each of cylinder-shaped cam follower members 20a, 20b, 20c, 20d, 20e, 20f, 20g, 20h, 20i, 20j, 20k, 20l, 20m, 20n, 20o, and 20p is connected. As will be described later, the cam follower members 20c, 20f, 20i, 20l, and 20o are disposed on the upper portions of the respective support members so as to be made in contact with plate-shaped members 25d, 26d, and 28d, which will be described later. The cam follower members 20b, 20e, 20h, 20k, and 20n are disposed on the center portions of the respective support members so as to be made in contact with plate-shaped members 25e, 26e, and 28e, which will be described later. The cam follower members 20a, 20d, 20g, 20j, 20m, and 20p are disposed on the lower portions of the respective support members so as be made in contact with plate-shaped members 25f, 26f, and 28f, which will be described later. Moreover, all the cam follower members 19a, 19b, 19c, 19d, 19e, 19f, 19g, 19h, 19i, 19j, 19k, 19l, 19m, 19n, 19o, and 19p are designed to have the same diameter. Furthermore, all the cam follower members 20a, 20b, 20c, 20d, 20e, 20f, 20g, 20h, 20i, 20j, 20k, 20l, 20m, 20n, 20o, and 20p are designed to have the same diameter. The cam follower members 19a, 19b, 19c, 19d, 19e, 19f, 19g, 19h, 19i, 19j, 19k, 19l, 19m, 19n, 19o, and 19p are respectively formed with respect to the support members 18a, 18b, 18c, 18d, 18e, 18f, 18g, 18h, 18i, 18j, 18k, 18l, 18m, 18n, 18o, and 18p (18a to 18p), at intervals in the shifting directions of the support members 18a to 18p.

As typically shown as an example of FIG. 4B, the six cam follower members 19a, 19b, 19c, 19d, 19e, 19f, 19g, 19h, 19i, 19j, 19k, 19l, 19m, 19n, 19o, and 19p respectively in the cam follower member groups G19a, G19b, G19c, G19d, G19e, G19f, G19g, G19h, G19i, G19j, G19k, G19l, G19m, G19n, G19o, and G19p on the front surfaces of the support members 18a, 18b, 18c, 18d, 18e, 18f, 18g, 18h, 18i, 18j, 18k, 18l, 18m, 18n, 18o, and 18p, as well as the cam follower members 20a, 20b, 20c, 20d, 20e, 20f, 20g, 20h, 20i, 20j, 20k, 20l, 20m, 20n, 20o, and 20p on the rear surfaces of the support members 18a, 18b, 18c, 18d, 18e, 18f, 18g, 18h, 18i, 18j, 18k, 18l, 18m, 18n, 18o, and 18p, are each configured by a column-shaped shaft portion 91 that is secured to each of the support members 18a, 18b, 18c, 18d, 18e, 18f, 18g, 18h, 18i, 18j, 18k, 18l, 18m, 18n, 18o, and 18p, and a cylindrical circumferential portion 92 that is freely rotatable relative to the shaft portion 91 by the respective cam follower members in each of the cam follower member groups and needle bearings 94 respectively built in the cam follower members, so that the respective cam follower members in each of the cam follower member groups and the circumferential portions 92 of the respective cam follower members are freely rotatable relative to the support members 18a, 18b, 18c, 18d, 18e, 18f, 18g, 18h, 18i, 18j, 18k, 18l, 18m, 18n, 18o, and 18p.

The respective grooves 90 in the plate-shaped members 12a and 12b are made longer than the rod-shaped support members so that, as described earlier, the rod-shaped support members are allowed to freely move in the grooves 90 in the longitudinal direction. Moreover, in order to prevent the respective rod-shaped support members from coming off the grooves 90, for example, the diameter of each cam follower member is made larger than the width of each groove 90, and by placing the cam follower members on the front surface side and rear surface side of the rod shaped support member, each rod-shaped support member is formed so as not to come off the groove 90 in a direction orthogonal to the longitudinal direction. The structure for preventing the rod-shaped support members from coming off the grooves 90 is not limited to this structure, but various structures may be adopted.

The cam follower members 16a to 16p and 19a to 19p on the front surface side and the cam follower members 17a to 17p and 20a to 20p on the rear surface side are connected to the shaft portion 91 secured to the support members 15a to 15p and 18a to 18p in a manner so as to allow the circumferential portion 92 to freely rotate, and this structure is desirable in view of realizing reduction in resistance to be generated when they relatively move while being made in contact with the transmission plates 35a and 35b to be described later or the plate-shaped members 25a to 25f.

Of course, the method for allowing a surface member of the cam follower member serving as one example of the guide member to freely rotate is not limited to the above, and, for example, a structure in which an outer ring of a ball bearing is secured to the support member, with a cam follower member serving as one example of the guide member being configured by a rod-shaped member to be secured to an inner ring of the ball bearing, may be used and the same functions and effects can be obtained.

Moreover, each of the cam follower member groups is configured by six cam follower members disposed in the axial direction at equal intervals, and this structure is preferable in view of the effect that, since the interval of the cam follower members located on the periphery of each of transmission plates 35a and 35b to be described later is prevented from being changed even if the position of a piston 33a to be described later is changed, a control computer 101 to be described later can easily carry out controlling operations.

Moreover, the support members 15a to 15p and 18a to 18p are allowed to reciprocally move freely in the vertical direction of FIG. 1B so as to be independently from each other, and a precompression mechanism for pressing the support members 15a to 15p and 18a to 18p toward one side in the shifting directions, for example, downward may be installed between those support members and the box-shaped member 12.

FIG. 4A shows one example of this precompression mechanism. In FIG. 4A, only the periphery of the support member 15a is typically illustrated in an enlarged manner. In FIG. 4A, a compression spring 38a, which is one example of the precompression mechanism, is attached between the upper end face of the support member 15a and the upper end face of the groove 90 in the plate-shaped member 12a in a compressed manner. As in a state shown in FIG. 4A, by keeping the compression spring 38a in a compressed state even in a state where the support member 15a is located in the lowermost position inside the groove 90, a force is always exerted from the compression spring 38a downward in FIG. 4A to the support member 15a. This structure is desirably used because the positions of the support members 15a to 15p and 18*a* to 18*p* can be stabilized irrespective of the gravity direction. The precompression mechanism is not particularly limited to the compression spring, and any combinations of known techniques may be utilized as long as they can achieve the same function. Moreover, each of the cam follower members is configured by the six cam follower members in the first embodiment; however, the present invention is not intended to be limited to this structure.

Moreover, in the frame 11, three linear motion mechanisms each serving as one example of a displacement generation mechanism that allows some of the support members 15*a* to 15*p* and 18*a* to 18*p* to have relative displacements to the box-shaped member 12, namely, first, second, and third linear motion mechanisms 22*a*, 22*b*, and 22*c* are connected to the frame 11 by using a guide rail 21*a* secured to the frame 11 in the vertical direction of FIG. 1C. In the same manner, another three different linear motion mechanisms each serving as one example of the displacement generation mechanism, namely, fourth, fifth, and sixth linear motion mechanisms 22*d*, 22*e*, and 22*f* are connected to the frame 11 by using a guide rail 21*b* secured to the frame 11 in the vertical direction of FIG. 1C.

As shown in FIG. 1J, the first linear motion mechanism 22*a* is configured by a first motor 23*a* secured to the center portion of the upper end face of the frame 11, a first feeding screw 24*a* that is coupled to a rotary shaft of the motor 23*a* and is forwardly/reversely rotated by a driving operation of the first motor 23*a*, a first plate-shaped member 25*a* through which the first feeding screw 24*a* is screwed to penetrate and which is allowed to reciprocally shift in the vertical direction on the guide rail 21*a* in response to the forward/reverse rotation of the first feeding screw 24*a*, a first plate-shaped member 26*a* that is connected by a hinge to the end of the first plate-shaped member 25*a* on the left side of FIG. 1E so as to freely rotate, a cam follower member 27*a* (see FIG. 1I) secured to the end of the first plate-shaped member 26*a* on the left side of FIG. 1E, a first plate-shaped member 28*a* that is connected by a hinge to the end of the first plate-shaped member 25*a* on the right side of FIG. 1E so as to freely rotate, and a cam follower member 29*a* (see FIG. 1I) secured to the end of the first plate-shaped member 28*a* on the right side of FIG. 1E. Moreover, the cam follower member 27*a* is movably inserted into a through hole 30*a* that is formed in the frame 11 and has a long hole shape elongated in the shifting directions (lateral directions in FIGS. 1D and 1E) of the box-shaped member 12. In the same manner, the cam follower member 29*a* is movably inserted into a through hole 31*a* that is formed in the frame 11 and has a long hole shape elongated in the shifting directions (lateral directions in FIGS. 1D and 1E) of the box-shaped member 12.

In the same manner as in the first linear motion mechanism 22*a*, as shown in FIG. 1J, the second linear motion mechanism 22*b* is configured by a second motor 23*b* secured to the center portion of the upper end face of the frame 11 so as to be adjacent to the first motor 23*a*, a second feeding screw 24*b* that is coupled to a rotary shaft of the second motor 23*b* and forwardly/reversely rotated by a driving operation of the second motor 23*b*, a second plate-shaped member 25*b* placed below the first plate-shaped member 25*a*, through which the second feeding screw 24*b* is screwed to penetrate and which is allowed to reciprocally shift in the vertical direction on the guide rail 21*a* in response to the forward/reverse rotation of the second feeding screw 24*b*, a second plate-shaped member 26*b* that is placed below the first plate-shaped member 26*a* and is connected by a hinge to the end of the second plate-shaped member 25*b* on the left side of FIG. 1E so as to freely rotate, a cam follower member 27*b* (see FIG. 1I) secured to the end of the second plate-shaped member 26*b* on the left side of FIG. 1E, a plate-shaped member 28*b* (see FIG. 1C) that is placed below the first plate-shaped member 28*a* and is connected by a hinge to the end of the second plate-shaped member 25*b* on the right side of FIG. 1E so as to freely rotate, and a cam follower member 29*b* (see FIG. 1I) secured to the end of the second plate-shaped member 28*b* on the right side of FIG. 1E. Moreover, the cam follower member 27*b* and the cam follower member 29*b* are respectively movably inserted into through holes 30*b* and 31*b* that are formed in the frame 11 and each have a long hole shape elongated in the shifting directions (lateral directions in FIGS. 1D and 1E) of the box-shaped member 12. Moreover, the second feeding screw 24*b* is allowed to penetrate through a through hole in the first plate-shaped member 25*a*, having a hole diameter larger than the outer diameter of the second feeding screw 24*b* so that the first plate-shaped member 25*a* is made so as not to be moved by the forward/reverse rotation of the second feeding screw 24*b*.

In the same manner as in the second linear motion mechanism 22*a*, as shown in FIG. 1J, the third linear motion mechanism 22*c* is configured by a third motor 23*c* secured to the center portion of the upper end face of the frame 11 so as to be adjacent to the second motor 23*b*, a third feeding screw 24*c* that is coupled to a rotary shaft of the third motor 23*c* and forwardly/reversely rotated by a driving operation of the third motor 23*c*, a third plate-shaped member 25*c* placed below the second plate-shaped member 25*b*, through which the third feeding screw 24*c* is screwed to penetrate and which is allowed to reciprocally shift in the vertical direction on the guide rail 21*a* in response to the forward/reverse rotation of the third feeding screw 24*c*, a third plate-shaped member 26*c* that is placed below the second plate-shaped member 26*b* and is connected by a hinge to the end of the third plate-shaped member 25*c* on the left side of FIG. 1E so as to freely rotate, a cam follower member 27*c* (see FIG. 1I) secured to the end of the third plate-shaped member 26*c* on the left side of FIG. 1E, a third plate-shaped member 28*c* (see FIG. 1C) that is placed below the second plate-shaped member 28*b* and is connected by a hinge to the end of the third plate-shaped member 25*c* on the right side of FIG. 1E so as to freely rotate, and a cam follower member 29*c* (see FIG. 1I) secured to the end of the third plate-shaped member 28*c* on the right side of FIG. 1E. Moreover, the cam follower member 27*c* and the cam follower member 29*c* are respectively movably inserted into through holes 30*c* and 31*c* that are formed in the frame 11 and each have a long hole shape elongated in the shifting directions (lateral directions in FIGS. 1D and 1E) of the box-shaped member 12. Moreover, the third feeding screw 24*c* is allowed to penetrate through through holes in the first and second plate-shaped members 25*a* and 25*b*, each having a hole diameter larger than the outer diameter of the third feeding screw 24*c* so that the first and second plate-shaped member 25*a* and 25*b* are made so as not to be moved by the forward/reverse rotation of the third feeding screw 24*c*.

Moreover, as shown in FIG. 1E, the fourth linear motion mechanism 22*d* is configured by a fourth motor 23*d* secured to the center portion of the upper end face of the frame 11, a fourth feeding screw 24*d* that is coupled to a rotary shaft of the fourth motor 23*d* and forwardly/reversely rotated by a driving operation of the fourth motor 23*d*, a fourth plate-shaped member 25*d* through which the fourth feeding screw 24*d* is screwed to penetrate and which is allowed to reciprocally shift in the vertical direction on the guide rail 21*b* in response to the forward/reverse rotation of the fourth feeding screw 24*d*, a fourth plate-shaped member 26*d* that is connected by a hinge to the end of the fourth plate-shaped member 25*d* on the left side of FIG. 1E so as to freely rotate, a cam follower member 27d (see FIG. 1A) secured to the end of the fourth plate-shaped member 26d on the left side of FIG. 1E, a fourth plate-shaped member 28d that is connected by a hinge to the end of the fourth plate-shaped member 25d on the right side of FIG. 1E so as to freely rotate, and a cam follower member 29d (see FIG. 1A) secured to the end of the fourth plate-shaped member 28d on the right side of FIG. 1E. Moreover, the cam follower member 27d is movably inserted into a through hole 30d that is formed in the frame 11 and has a long hole shape elongated in the shifting directions (lateral directions in FIGS. 1D and 1E) of the box-shaped member 12. In the same manner, the cam follower member 29d is movably inserted into a through hole 31d that is formed in the frame 11 and has a long hole shape elongated in the shifting directions (lateral directions in FIGS. 1D and 1E) of the box-shaped member 12.

In the same manner as in the fourth linear motion mechanism 22d, as shown in FIG. 1E, the fifth linear motion mechanism 22e is configured by a fifth motor 23e secured to the center portion of the upper end face of the frame 11 so as to be adjacent to the fourth motor 23d, a fifth feeding screw 24e that is coupled to a rotary shaft of the fifth motor 23e and forwardly/reversely rotated by a driving operation of the fifth motor 23e, a fifth plate-shaped member 25e placed below the fourth plate-shaped member 25d, through which the fifth feeding screw 24e is screwed to penetrate and which is allowed to reciprocally shift in the vertical direction on the guide rail 21b in response to the forward/reverse rotation of the fifth feeding screw 24e, a fifth plate-shaped member 26e that is placed below the fourth plate-shaped member 26d and is connected by a hinge to the end of the fifth plate-shaped member 25e on the left side of FIG. 1E so as to freely rotate, a cam follower member 27e (see FIG. 1A) secured to the end of the fifth plate-shaped member 26e on the left side of FIG. 1E, a fifth plate-shaped member 28e that is placed below the fourth plate-shaped member 28d and is connected by a hinge to the end of the fifth plate-shaped member 25e on the right side of FIG. 1E so as to freely rotate, and a cam follower member 29e (see FIG. 1A) secured to the end of the fifth plate-shaped member 28e on the right side of FIG. 1E. Moreover, the cam follower member 27e and the cam follower member 29e are respectively movably inserted into through holes 30e and 31e that are formed in the frame 11 and each have a long hole shape elongated in the shifting directions (lateral directions in FIGS. 1D and 1E) of the box-shaped member 12. Moreover, the fifth feeding screw 24e is allowed to penetrate through a through hole in the fourth plate-shaped member 25d, having a hole diameter larger than the outer diameter of the fifth feeding screw 24e so that the fourth plate-shaped member 25d is made so as not to be moved by the forward/reverse rotation of the fifth feeding screw 24e.

In the same manner as in the fourth linear motion mechanism 22d, as shown in FIG. 1E, the sixth linear motion mechanism 22f is configured by a sixth motor 23f secured to the center portion of the upper end face of the frame 11 so as to be adjacent to the fifth motor 23e, a sixth feeding screw 24f that is coupled to a rotary shaft of the sixth motor 23f and forwardly/reversely rotated by a driving operation of the sixth motor 23f, a sixth plate-shaped member 25f placed below the fifth plate-shaped member 25e, through which the sixth feeding screw 24f is screwed to penetrate and which is allowed to reciprocally shift in the vertical direction on the guide rail 21b in response to the forward/reverse rotation of the sixth feeding screw 24f, a sixth plate-shaped member 26f that is placed below the fifth plate-shaped member 26e and is connected by a hinge to the end of the sixth plate-shaped member 25f on the left side of FIG. 1E so as to freely rotate, a cam follower member 27f (see FIG. 1A) secured to the end of the sixth plate-shaped member 26f on the left side of FIG. 1E, a sixth plate-shaped member 28f that is placed below the fifth plate-shaped member 28e and is connected by a hinge to the end of the sixth plate-shaped member 25f on the right side of FIG. 1E so as to freely rotate, and a cam follower member 29f (see FIG. 1A) secured to the end of the sixth plate-shaped member 28f on the right side of FIG. 1E. Moreover, the cam follower member 27f and the cam follower member 29f are respectively movably inserted into through holes 30f and 31f that are formed in the frame 11 and each have a long hole shape elongated in the shifting directions (lateral directions in FIGS. 1D and 1E) of the box-shaped member 12. Furthermore, the sixth feeding screw 24f is allowed to penetrate through through holes in the fourth and fifth plate-shaped members 25d and 25e, each having a hole diameter larger than the outer diameter of the sixth feeding screw 24f so that the fourth and fifth plate-shaped members 25d and 25e are made so as not to be moved by the forward/reverse rotation of the sixth feeding screw 24f.

The first, second, and third linear motion mechanisms 22a, 22b, and 22c are designed such that the respective moving ranges in the vertical direction of the first, second, and third plate-shaped members 25a, 25b, and 25c are not overlapped with one another. The first, second, and third plate-shaped members 26a, 26b, and 26c and the first, second, and third plate-shaped members 28a, 28b, and 28c are also designed such that their moving ranges in the vertical direction are not overlapped with one another. Moreover, these members are designed so that, when the box-shaped member 12 is reciprocally shifted, the cam follower members 17c, 17f, 17i, 17l, and 17o are respectively made in contact with the first plate-shaped members 25a, 26a, and 28a, the cam follower members 17b, 17e, 17h, 17k, and 17n are respectively made in contact with the second plate-shaped members 25b, 26b, and 28b, and the can follower members 17a, 17d, 17g, 17j, 17m, and 17p are respectively made in contact with the third plate-shaped members 25c, 26c, and 28c.

In the same manner, the fourth, fifth, and sixth linear motion mechanisms 22d, 22e, and 22f are designed such that the respective moving ranges in the vertical direction of the fourth, fifth, and sixth plate-shaped members 25d, 25e, and 25f are not overlapped with one another. The fourth, fifth, and sixth plate-shaped members 26d, 26e, and 26f and the fourth, fifth, and sixth plate-shaped members 28d, 28e, and 28f are also designed such that their moving ranges in the vertical direction are not overlapped with one another. Moreover, these members are also designed so that, when the box-shaped member 12 is reciprocally shifted, the cam follower members 20c, 20f, 20i, 20l, and 20o are respectively made in contact with the fourth plate-shaped members 25d, 26d, and 28d, the cam follower members 20b, 20e, 20h, 20k, and 20n are respectively made in contact with the fifth plate-shaped members 25e, 26e, and 28e, and the cam follower members 20a, 20d, 20g, 20j, 20m, and 20p are respectively made in contact with the sixth plate-shaped members 25f, 26f, and 28f.

Figure 5:
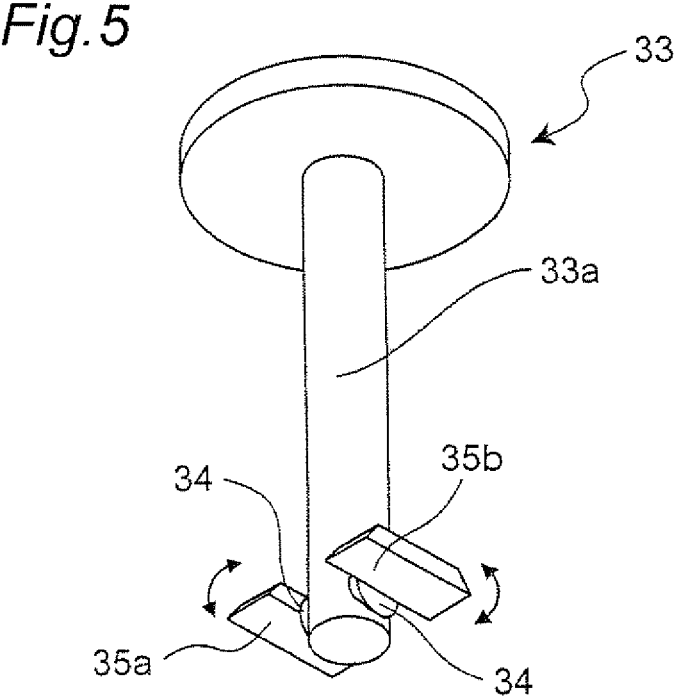
FIG. 5 is a perspective view that shows an outline of a piston and a transmission plate in accordance with the first embodiment of the present invention.

Moreover, on the center portion of the upper end face of the frame 11 on the upper side of FIGS. 1B and 1C, there are secured a cylinder 32 and a linear encoder 37b placed on the circumference of the piston rod 33a of the piston 33 inside the cylinder 32. Inside the cylinder 32, the piston 33 serving as one example of the linear motion member is installed so as to freely reciprocally move in the vertical direction (directions substantially in parallel with the shifting directions of the support members 15a to 15p; 18a to 18p relative to the frame 11) of FIGS. 1B and 1C. The amount of displacement of the piston 33, that is, the amount of displacement of the piston rod 33a, can be measured by a linear encoder 37b. The linear encoder 37b may be of a magnetostrictive type or an optical type. As shown in FIG. 1A, a downward force in FIG. 1B (hereinafter, referred to as "driving force") is exerted to the piston 33 by high-pressure gas serving as one example of a compressive fluid inside an air-pressure tank 201 connected to the cylinder 32. In this manner, the cylinder 32 and the piston 33 configure a piston-cylinder mechanism serving as one example of an elastic mechanism of which potential energy is changed in response to the displacement of the piston 33. The piston rod 33a of the piston 33 is inserted into the frame 11 through a through hole 36b formed in the frame 11. Moreover, near the lower end of the piston rod 33a, the rotary member 34 is connected to the piston rod 33a via a bearing (not shown) so as to freely rotate. The transmission plates 35a and 35b, each made of a trapezoidal plate-shaped member and serving as one example of the rocking member, are secured to the two ends of the rotary member 34 so that the rotary member 34 and the transmission plates 35a and 35b are integrally rotated in synchronism with one another (rocked around the axis substantially perpendicular to both of the shifting directions of the box-shaped member 12 and the shifting directions of the piston 33). That is, the transmission plates 35a and 35b, which are provided at the end portions of the piston rod 33a of the piston 33, are held so as to rock around the axis substantially perpendicular to both of the shifting directions of the box-shaped member 12 and the shifting directions of the piston 33, and are disposed so as to be made in contact with some of the cam follower members 16a to 16p; 19a to 19p. The piston 33, the rotary member 34, and the transmission plates 35a and 35b are schematically shown also in FIG. 5 in a perspective view. The lower surface of each of the transmission plates 35a and 35b in FIG. 1B forms a plane that includes the center axis of the rotary member 34. This structure is desirably used because, when the transmission plates 35a and 35b are tilted, no displacement components except for the tilts are generated on the lower surfaces of the transmission plates 35a and 35b in FIG. 1B. The lower surface of the transmission plate 35a is pressed onto some of the cam follower members 16a to 16p (for example, onto the cam follower members 16h and 16i in a state shown in FIG. 1F) by a driving force from the piston-cylinder mechanism. In the same manner, the lower surface of the other transmission plate 35b is pressed onto some of the cam follower members 19a to 19p (for example, onto the cam follower members 19h and 19i in a state shown in FIG. 1K) by a driving force from the piston-cylinder mechanism. In this case, each of the transmission plates 35a and 35b has a trapezoidal shape in which the upper side in each of FIG. 1F and FIG. 1K is made narrower than the lower surface side. In other words, the cross-sectional shape on the plane perpendicular to the rocking center axis of the transmission plate 35a or 35b includes a tapered portion that makes the contact surface with the cam following members wider. This structure is desirably used because, even in the case when the transmission plate 35a or 35b is tilted as shown in FIG. 1G, the side face of the transmission plate 35a or 35b is prevented from extending on right and left sides in FIGS. 1F and 1K from the lower surface of the transmission plate 35a or 35b that forms the contact surface with the cam follower members 16a to 16p; 19a to 19p, and the displacement of the cam follower members that are not made in contact with the lower surface of the transmission plate 35a or 35b is prevented from being disturbed.

Figure 6A:
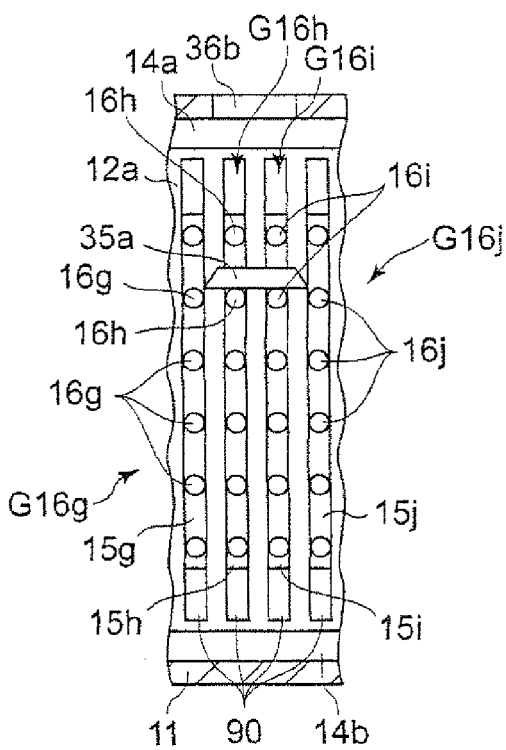
FIG. 6A is a partially enlarged view that shows one example of a contact state between the transmission plate and a cam follower member in a cam follower member group in accordance with the first embodiment of the present invention.

Moreover, the width of the transmission plate 35a or 35b (the dimension in the lateral direction of FIG. 1F or FIG. 1K) corresponds to {(the distance between the centers of the cam follower members in the adjacent cam follower member groups×3)−(the diameter of the cam follower member in the cam follower member groups)}, and the width is designed such that, in the case when the box-shaped member 12 is shifted with the transmission plate 35a or 35b being kept horizontally as shown in FIG. 1B, the lower surface of each of the transmission plates 35a and 35b is always made in contact with the cam follower members in the two or three cam follower member groups. For example, in a state shown in FIG. 6A that is a partially enlarged view of FIG. 1F, the lower surface of the transmission plate 35a is made in contact with the cam follower members 16h and 16i in the two cam follower member groups G16h and G16i. In contrast, in the case when the box-shaped member 12 is shifted rightward and brought into a state shown in FIG. 6C, the lower surface thereof is made in contact with the cam follower members 16h, 16i, and 16j in the three cam follower member groups G16h, G16i, and G16j.

Figure 7A:
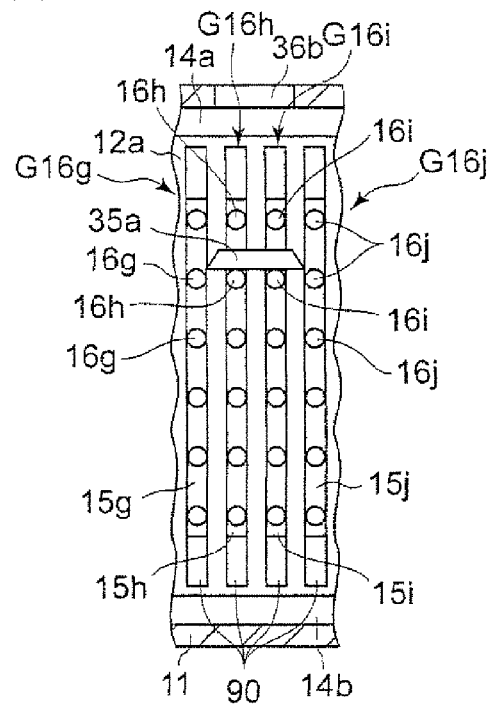
FIG. 7A is a partially enlarged view of a displacement plate 35a side, which shows an outline of a speed changing operation in accordance with the first embodiment of the present invention.
Figure 7B:
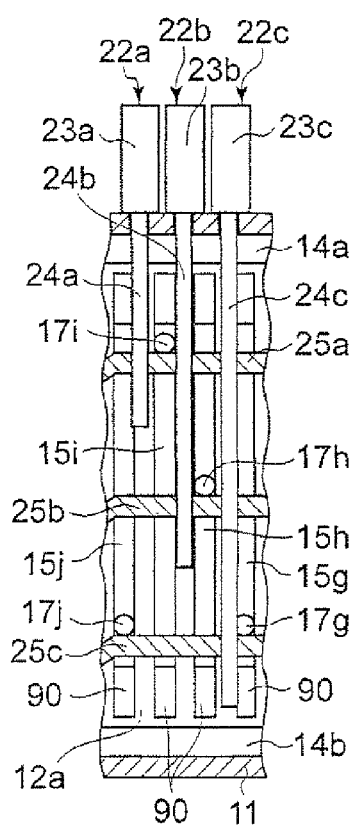
FIG. 7B is a partially enlarged view of a second plate-shaped member 25b side in a state shown in FIG. 7A that shows the outline of the speed changing operation in accordance with the first embodiment of the present invention.
Figure 7C:
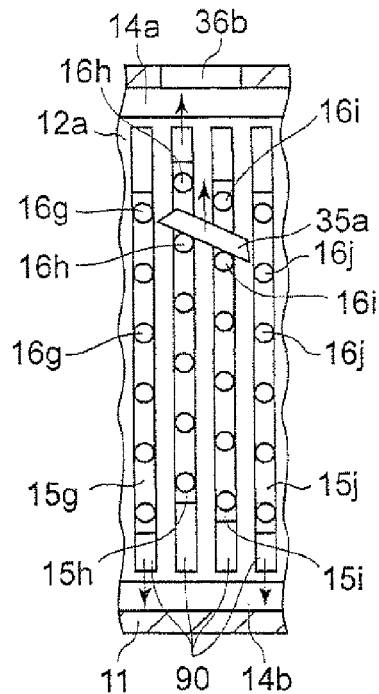
FIG. 7C is a partially enlarged view of the displacement plate 35a side, which shows an outline of a speed changing operation in accordance with the first embodiment of the present invention.
Figure 7D:
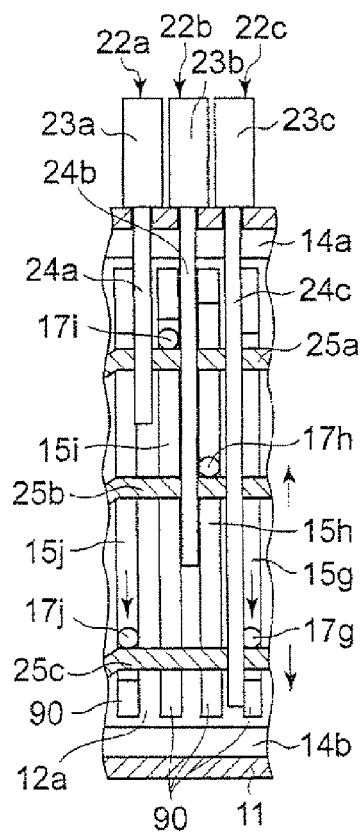
FIG. 7D is a partially enlarged view of the second plate-shaped member 25b side in a state shown in FIG. 7C that shows the outline of the speed changing operation in accordance with the first embodiment of the present invention.
Figure 7E:
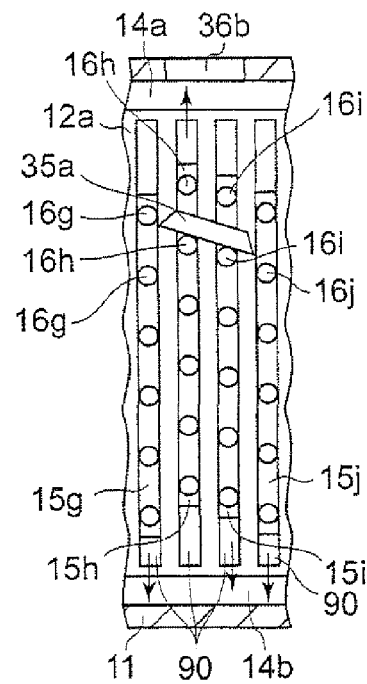
FIG. 7E is a partially enlarged view of the displacement plate 35a side, which shows an outline of a speed changing operation in accordance with the first embodiment of the present invention.
Figure 7F:
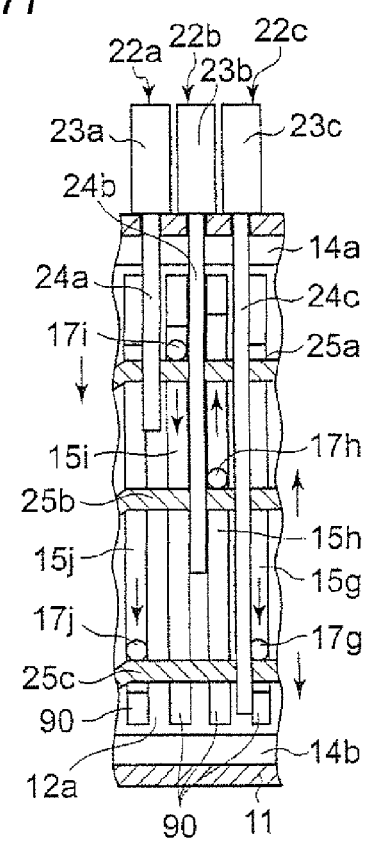
FIG. 7F is a partially enlarged view of the second plate-shaped member 25b side in a state shown in FIG. 7E that shows the outline of the speed changing operation in accordance with the first embodiment of the present invention.

Moreover, the control computer 101, serving as a control device that changes the transmission gear ratio between the displacement velocity of the piston 33 and the displacement velocity of the box-shaped member 12 by controlling the operations of the plurality of displacement generation mechanisms 22a to 22f, is connected respectively to the first to sixth motors 23a to 23f and the linear encoders 37a and 37b in the first to sixth linear motion mechanisms 22a to 22f. In accordance with the driving operations of the first to sixth motors 23a to 23f controlled by the control computer 101, the first to sixth feeding screws 24a to 24f are forwardly/reversely rotated independently from each other so that the positions of the first to sixth plate-shaped members 25a to 25f are changed independently from each other. The control computer 101 can change the transmission gear ratio between the displacement velocity of the piston 33 and the displacement velocity of the box-shaped member 12 by controlling the operations of the first to sixth linear motion mechanisms 22a to 22f. In accordance with the displacements of the first to sixth plate-shaped members 25a to 25f, some of the support members 15a to 15p (for example, the support members 15g, 15h, 15i, and 15j in the state of FIG. 1B) connected to the cam follower members 17a to 17p and some of the support members 18a to 18p (for example, the support members 18g, 18h, 18i, and 18j in the state of FIG. 1B) connected to the cam follower members 20a to 20p are displaced in cooperation with one after another. The displacements of the support members 15a to 15p and 18a to 18p are exerted on the transmission plates 35a and 35b through the cam follower members 16a to 16p and 19a to 19p, so that the positions or the angles of the transmission plates 35a and 35b are changed. For example, in the case when the periphery of the transmission plate 35a is in a state shown in FIG. 7A and FIG. 7B (the cam follower members 16g, 16h, 16i, and 16j in the adjacent four cam follower member groups G16g, G16h, G16i, and G16j are positioned at the same height in the vertical direction), the second motor 23b is rotated so that the second plate-shaped member 25b is displaced upward by the rotation of the second feeding screw 24b (see FIG. 7D), the cam follower member 17h which has been located close to the upper surface of the second plate-shaped member 25b or made in contact therewith is also displaced upward together with the second plate-shaped member 25b by being pressed by the second plate-shaped member 25b, so that the support member 15h coupled to the cam follower member 17h on the rear surface thereof and the cam follower member 16h on the front surface of the support member 15h are also displaced upward in the same manner. As a result, the transmission plate 35a is shifted upward while being tilted as shown in FIG. 7C, to be brought into a state shown in FIGS. 7C and 7D.

Next, the following will describe functions of the linear motion actuator 1, which are executed under the control of the control computer 101.

The linear motion actuator 1 has a laterally symmetrical structure relative to the center axis when viewed from the direction of FIG. 1C; therefore, in the following, the functions will be described by using the reference numerals indicated in FIG. 1F and the like corresponding to the left side of FIG. 1C, and with respect to the portion corresponding to the right side of FIG. 1C, the description thereof is not given by indicating the corresponding reference numerals in parentheses.

Figure 8A:
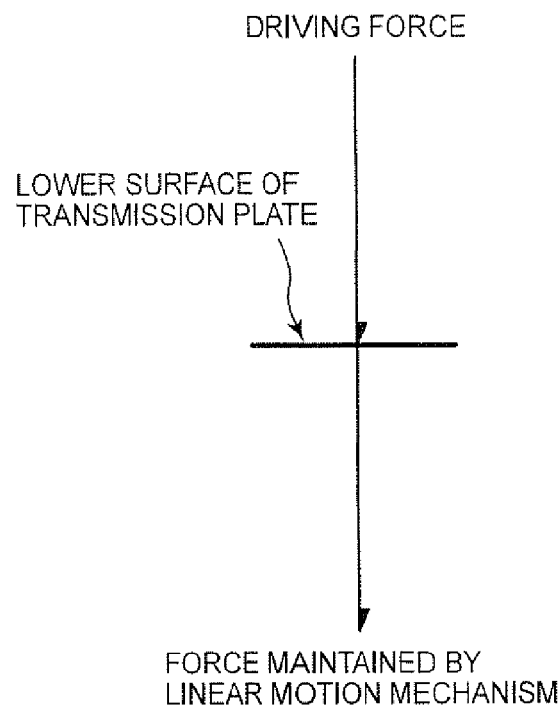
FIG. 8A is a view that shows a balanced state of forces in the first embodiment of the present invention.

A force to be exerted on the rod 13 of the linear motion actuator 1 (hereinafter, referred to as "generated force") is determined by the driving force from the piston-cylinder mechanism and the degree of the tilt of each of the transmission plates 35a and 35b. That is, in a state shown in FIG. 1F, FIG. 6A, and FIG. 6C where the transmission plate 35a (35b) is kept horizontally in FIG. 1F, FIG. 6A, and FIG. 6C, the driving force from the piston-cylinder mechanism to be exerted on the transmission plate 35a (35b) is transmitted through the cam follower member 16h (19h), the cam follower member 16i (19i), the support member 15h (18h), the support member 15i (18i), the second (fifth) linear motion mechanism 22b (22e), and the first (fourth) linear motion mechanism 22a (22d), and is kept by the frame 11, with the result that the generated force in the rod 13 becomes 0. At this time, the state of the force is indicated in FIG. 8A.

Figure 6B:
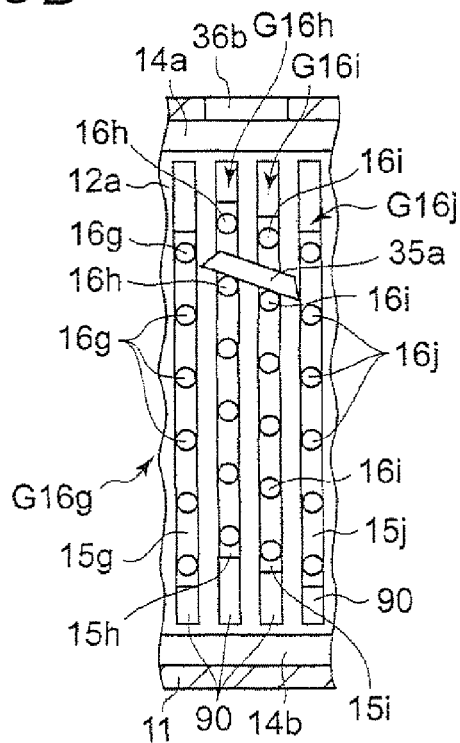
FIG. 6B is a partially enlarged view that shows another example of a contact state between the transmission plate and a cam follower member in the cam follower member group in accordance with the first embodiment of the present invention.
Figure 6C:
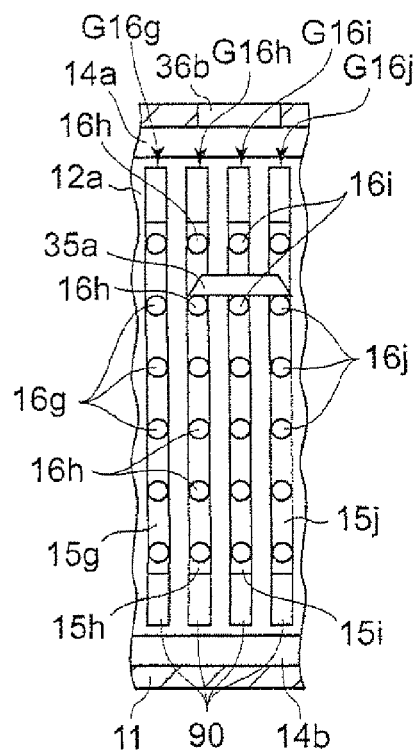
FIG. 6C is a partially enlarged view that shows still another example of a contact state between the transmission plate and a cam follower member in the cam follower member group in accordance with the first embodiment of the present invention.
Figure 6D:
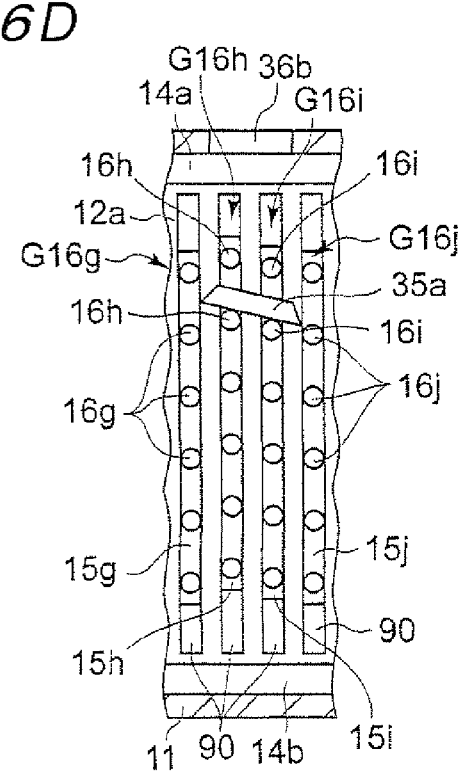
FIG. 6D is a partially enlarged view that shows still another example of a contact state between the transmission plate and a cam follower member in the cam follower member group in accordance with the first embodiment of the present invention.
Figure 8B:
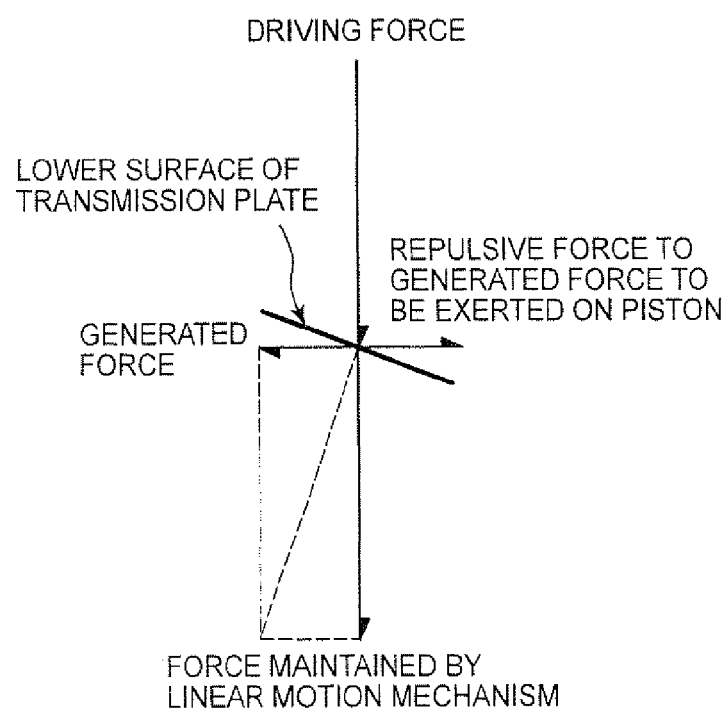
FIG. 8B is another view that shows a balanced state of forces in the first embodiment of the present invention.
Figure 8C:
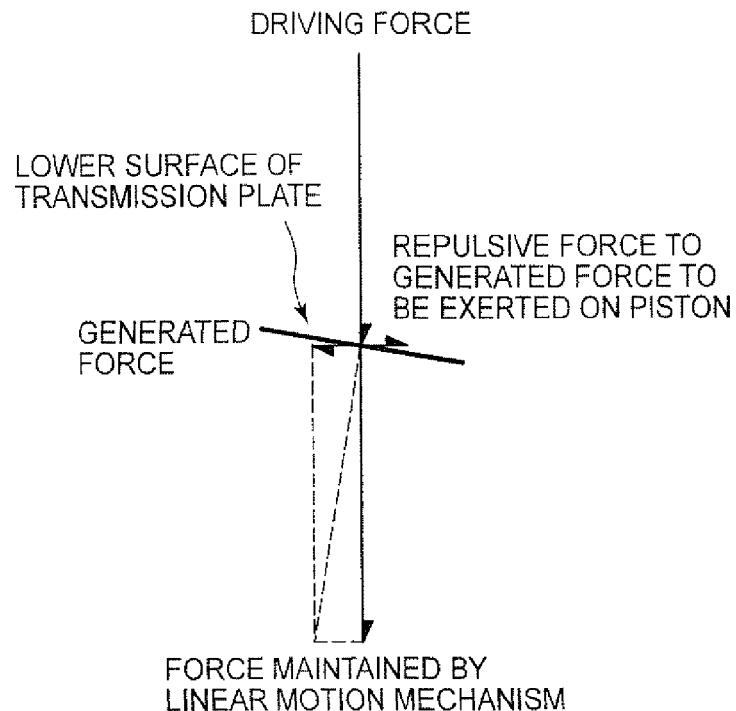
FIG. 8C is still another view that shows a balanced state of forces in the first embodiment of the present invention.

In contrast, in the case when the transmission plate 35a (35b) is brought into a state tilted from the horizontal state, as shown in FIG. 1G and FIG. 6B (for example, in FIG. 1G, the transmission plate 35a is in an upper-left tilted state with its right end directed downward and with its left end directed upward), forces in the lateral direction (for example, leftward in FIG. 1G) are exerted at the contact points between the transmission plate 35a (35b) and the cam follower member 16h (19h) as well as the cam follower member 16i (19i). The downward force to be exerted on each of the cam follower members 16h (19h) and 16i (19i) is transmitted through the support member 15h (18h), the support member 15i (18i), the second (fifth) linear motion mechanism 22b (22e), and the first (fourth) linear motion mechanism 22a (22d), and is supported by the frame 11, in the manner similar to the horizontal state, while the leftward force to be exerted on each of the cam follower member 16h (19h) and the cam follower member 16i (19i) is transmitted through the support member 15h (18h), the support member 15i (18i), and the box-shaped member 12, and is outputted to the rod 13. In a static state where losses due to sliding or the like are ignored, this leftward force is represented by a product of the driving force exerted on the piston 33 by high-pressure gas serving as one example of a compressive fluid inside the air-pressure tank 201 and a tangent relative to the angle change from the horizontal state of the transmission plate 35a (35b). The state of the force in this case is indicated as in FIG. 8B. Moreover, in the case as shown in FIG. 6D when the tilt of the transmission plate 35a (35b) is smaller than that in the state shown in FIG. 6B, the state of the force is indicated as in FIG. 8C so that the generated force in the rod 13 becomes smaller.

As described above, by driving the first motor 23a to the sixth motor 23f so as to tilt the transmission plates 35a and 35b at tilted angles corresponding to output forces from the rod 13 as expected by the control computer 101, force controlling operations of the linear motion actuator 1 can be carried out.

Moreover, with respect also to disturbances in the high-frequency band on which no control of the control computer 101 is exerted, since the flexibility is maintained by the elasticity of the cylinder 32, the linear motion actuator 1 is safe and flexible to the contact.

In the case in FIG. 1G when the linear motion actuator 1 causes the rod 13 to be shifted leftward, the linear motion actuator 1 is defined as executing work to the outside of the linear motion actuator 1. More specifically, in the case when the control computer 101 keeps the driving operations of the first (fourth) motor 23a (23d) and the second (fifth) motor 23b (23e) in a resting state, as the rod 13 is shifted leftward, the transmission plate 35a (35b) is allowed to slide on the front surfaces of the cam follower member 16h (19h) and the cam follower member 16i (19i) so that the piston 33 is shifted downward in FIG. 1G. In this case, by the energy lost by the cylinder 32 and the air-pressure tank 201, the linear motion actuator 1 executes work to the outside of the linear motion actuator 1.

In contrast, in the case in FIG. 1G when the linear motion actuator 1 causes the rod 13 to be shifted rightward, the linear motion actuator 1 is subjected to work applied from the outside of the linear motion actuator 1. That is, in the case when the control computer 101 keeps the driving operations of the first (fourth) motor 23a (23d) and the second (fifth) motor 23b (23e) in a resting state, as the rod 13 is shifted rightward, the transmission plate 35a (35b) is allowed to slide on the front surfaces of the cam follower member 16h (19h) and the cam follower member 16i (19i) so that the piston 33 is shifted upward in FIG. 1G. In this case, by the work having been executed on the linear motion actuator 1 from the outside of the linear motion actuator 1, energy is accumulated in the cylinder 32 and the air-pressure tank 201.

In this manner, the linear motion actuator 1 not only executes work to the outside of the linear motion actuator 1, but also carries out a regeneration operation for accumulating energy inside the linear motion actuator 1 in response to the work from the outside of the linear motion actuator 1. Therefore, in comparison with an actuator that cannot carry out the regeneration operation, the linear motion actuator 1 in accordance with the first embodiment can improve the operation efficiency. In other words, the linear motion actuator 1 of the first embodiment can also solve the following conventional issues.

More specifically, the aforementioned flexible actuators such as SEA, DM2, and VST, attempt to greatly reduce influences of inertia on the motor side onto the input from the robot arm side by connecting the robot arm to the motor with an elastic member interposed therebetween. In other words, the structure fails to directly transmit energy inputted from the robot arm side to the motor side, making it difficult to electrically regenerate the energy.

In the case of a robot that works in an area close to the person, there are many opportunities in which work is performed from the outside of the flexible actuator, such as cooperative jobs with the person or jobs of unloading objects. However, in the case of a conventional flexible actuator that cannot carry out the energy regeneration operation, the actuator consumes energy even in a state where work is performed thereon from the outside of the flexible actuator, with the result that there are issues that the efficiency of the entire operations seriously deteriorates.

In contrast, as described earlier, the linear motion actuator 1 of the first embodiment makes it possible to improve the operation efficiency, and consequently to solve the above-mentioned issues.

Next, the following will describe operations of the control computer 101 during operations of the linear motion actuator 1. In the first embodiment, 16 rows on one side of the cam follower member groups G16a to G16p (G19a to G19p) are used; however, only the cam follower members in the 2 to 3 cam follower member groups are always made in contact with the transmission plate 35a (35h). In other words, the control computer 101 carries out the operations so as to set the tilt of the transmission plate 35a (35b) in a range satisfying this condition. More specifically, the range is determined so as to make the cosine of the width of the transmission plate 35a (35b) greater than (the distance between the centers of the cam follower members in the adjacent cam follower member groups×2). Under this condition, the minimum number of the linear motion mechanisms required is three. In a state where the box-shaped member 12 is kept standing still, the tilt of the transmission plate 35a (35b) is changed by operating the 2 to 3 linear motion mechanisms so that the generated force in the rod 13 can be controlled. When the computer 101 operates the first (fourth) linear motion mechanism 22a (22d) and the second (fifth) linear motion mechanism 22b (22e) to change from the state shown in FIG. 1F, FIG. 7A, and FIG. 7B to the state shown in FIG. 1G, FIG. 7C, and FIG. 7D, a leftward force in FIG. 1G is exerted on the box-shaped member 12. When the box-shaped member 12 is thus shifted leftward, the transmission plate 35a (35b) is made in contact with the cam follower member 16j (19j). In a state where the transmission plate 35a (35b) is kept in contact only with the cam follower member 16h (19h) and the cam follower member 16i (19i), the cam follower member 16j (19j) can be freely displaced by the third (sixth) linear motion mechanisms 22c (22f), so that, as shown in FIG. 1G, the control computer 101 controls the cam follower member 16j (19j) so as to be preliminarily brought to a position where the transmission plate 35a (35b) can be smoothly made in contact therewith (for example, the cam follower member 16j (19j) is brought to a position (desired position) slightly below the extended plane of the lower surface of the transmission plate 35a (35b)). As the box-shaped member 12 is continuously shifted leftward, there is obtained a state shown in FIG. 1H and, since the transmission plate 35a (35b) is made in contact only with the cam follower member 16i (19i) and the cam follower member 16j (19j), so that the cam follower member 16k (19k) can be freely displaced by the second (fifth) linear motion mechanism 22b (22e). On the other hand, in the case when work is performed onto the linear motion actuator 1 from the outside and the box-shaped member 12 is shifted rightward in the state shown in FIG. 1G, the control computer 101 operates the third (sixth) linear motion mechanism 22c (22f) so as to allow the transmission plate 35a (35b) to be smoothly made in contact with the cam follower member 16g (19g) in place of the cam follower member 16j (19j). The determination as to which positional control of the cam follower member 16j (19j) or the cam follower member 16g (19g) is preferentially carried out can be made by the shifting directions of the box-shaped member 12. More specifically, in the case when the box-shaped member 12 is shifted leftward in FIG. 1G, the control computer 101 preferentially controls the position of the cam follower member 16j (19j) rather than the positional control of the cam follower member 16g (19g), and in the case when the box-shaped member 12 is shifted leftward in FIG. 1G, the control computer 101 preferentially controls the position of the cam follower member 16g (19g) rather than the positional control of the cam follower member 16j (19j). In this manner, in response to the displacement of the box-shaped member 12, the displacements of the cam follower members 16a to 16p (19a to 19p) and the tilt of the transmission plate 35a (35b) are sequentially changed by the control computer 101 and the first to sixth linear motion mechanisms 22a to 22f so that the generated force to be exerted on the rod 13 is controlled to the desired value; therefore, the linear motion actuator 1 can be successively operated. Of course, the generated force to be exerted on the rod 13 of the linear motion actuator 1 is not limited to the leftward direction of FIG. 1G, and a tilted state reversed to that of FIG. 1G (an upper-right tilted state where the left end of the transmission plate 35a is directed downward with the right end thereof being directed upward) may be achieved so that the generated force in the rod 13 of the linear motion actuator 1 is directed rightward in FIG. 1G.

In the controlling method used when the control computer 101 controls to operate the first (fourth) linear motion mechanism 22a (22d) to the third (sixth) linear motion mechanism 22c (22f), in the case of changing the tilt of the transmission plate 35a (35b), it is desirable in view of energy efficiency to carry out the operations such that the reverse input from the piston 33 to the first (fourth) linear motion mechanism 22a (22d) to the third (sixth) linear motion mechanism 22c (22f) is minimized. This is because, as long as the first (fourth) linear motion mechanism 22a (22d) to the third (sixth) linear motion mechanism 22c (22f) are not allowed to carry out the energy regeneration operations, work to be operated on the first (fourth) linear motion mechanism 22a (22d) to the third (sixth) linear motion mechanism 22c (22f) by the piston 33, that is, the reverse input to the first (fourth) linear motion mechanism 22a (22d) to the third (sixth) linear motion mechanism 22c (22f) is kept equivalent to the loss. As the specific operations, when the transmission plate 35a (35b) is tilted from the state shown in FIG. 1F to the state shown in FIG. 1G, it is desirable to keep the cam follower member 16i (19i) located on the lower side in FIG. 1G as much as possible so as not to be operated downward. That is, in the case when the transmission plate 35a (35b) is tilted in a manner of such a change from the state of FIG. 7A and FIG. 7B to the state of FIG. 7C and FIG. 7D, as long as the stroke range of the support member 15h (18h) corresponding to the cam follower member 16h (19h) to be placed on the upper side and the performance of the second (fifth) linear motion mechanism 22b (22e) corresponding to the cam follower member 16h (19h) are acceptable, the first (fourth) linear motion mechanism 22a (22d) corresponding to the cam follower member 16i (19i) is made to stand still or to move upward in FIG. 1G. With this arrangement, the reverse input from the piston 33 to the first (fourth) linear motion mechanism 22a (22d) to the third (sixth) linear motion mechanism 22c (22f) can be reduced to the minimum. Moreover, the support members 15a (18a) to 15p (18p) need to be easily stroked upward in FIG. 1G in order to effectively exert these operations; therefore, in the case when the cam follower members 16a to 16p (19a to 19p) are newly made in contact with the transmission plate 35a (35b) in accordance with the shift of the box-shaped member 12, the control computer 101 desirably controls the first (fourth) linear motion mechanism 22a (22d) to the third (sixth) linear motion mechanism 22c (22f) so that the cam follower members located as upward as possible in FIG. 1G in the corresponding cam follower member group are made in contact with the transmission plate 35a (35b).

Moreover, in another controlling method used when the control computer 101 controls to operate the first (fourth) linear motion mechanism 22a (22d) to the third (sixth) linear motion mechanism 22c (22f), upon changing the tilt of the transmission plate 35a (35b), it is desirable in view of utilizing a low-speed linear motion mechanism to carry out the operations such that the displacements of the first (fourth) linear motion mechanism 22a (22d) to the third (sixth) linear motion mechanism 22c (22f) are kept to the minimum. As the specific operations, when the transmission plate 35a (35b) is tilted from the state shown in FIG. 1F to the state shown in FIG. 1G, it is desirable to operate the second (fifth) linear motion mechanism 22b (22e) and the first (fourth) linear motion mechanism 22a (22d) so as to make the amount of upward movement of the cam follower member 16h (19h) and the amount of downward movement of the cam follower member 16i (19i) equal to each other, in the same manner as in the change from the state of FIG. 7A and FIG. 7B to the state of FIG. 7C and FIG. 7D. With this arrangement, it is possible to reduce a velocity required to the first (fourth) linear motion mechanism 22a (22d) to the third (sixth) linear motion mechanism 22c (22f) to the minimum. Moreover, the support members 15a (18a) to 15p (18p) need to be stroked in both of the upward and downward directions in FIG. 1G when necessary in order to effectively exert these operations; therefore, in the case when the cam follower members 16a to 16p (19a to 19p) are newly made in contact with the transmission plate 35a (35b) in accordance with the shift of the box-shaped member 12, the control computer 101 desirably controls the first (fourth) linear motion mechanism 22a (22d) to the third (sixth) linear motion mechanism 22c (22f) so that among the cam follower members included in the corresponding cam follower member group, those allow the corresponding support members 15a (18a) to 15p (18p) to be located closest to the center of the stroke range are made in contact therewith.

In the first embodiment, the number of the cam follower members in the cam follower member groups to be made in contact with the transmission plate 35a (35b) is set to 2 to 3; however, the present invention is not intended to be limited to this case, and the number of the cam follower members to be made in contact with the transmission plate 35a (35b) may be increased in accordance with the number of the linear motion mechanisms. The maximum number of the cam follower members in the cam following member groups to be made in contact therewith needs to be made equal to the number of the linear motion mechanisms so as to change the tilt of the transmission plate 35a (35b), and the minimum number can be set to 2, so that increase in the maximum number of the cam follower members in the cam follower member groups to be made in contact therewith is desirable in view of increasing the tilt to be acceptable by the transmission plate 35a (35b). In contrast, limiting the number of the cam follower members in the cam follower member groups to be made in contact with the transmission plate to 2 to 3 is desirable in view of minimizing the number of the linear motion mechanisms. However, in the case when the tilt of the transmission plate 35a (35b) is increased, the transmission plate 35a (35b) tends to be made in contact with both of the adjacent cam follower members unless the distance between the cam follower members included in the cam follower member groups is sufficiently large. In order to prevent this circumstance, the support members 15a to 15p and 18a to 18p may be designed to be modified or splitable so as to extend or separate the distance between the cam follower members 16a to 16p and 19a to 19p included in the cam follower member groups G16a to G16p and G19a to G19p.

In the first embodiment, the number of the linear motion mechanisms is made to identical with the maximum number of the cam follower members in the cam follower member groups to be made in contact therewith; however, the present invention is not intended to be limited to this arrangement, and the number of the linear motion mechanisms may exceed the maximum number of the cam follower members. In this case, since the positions of the cam follower members in the cam follower member groups located on the two sides of the cam follower member in the cam follower member group to be made in contact with the transmission plate 35a (35b) can be controlled independently, this structure is desirable in view of the effect that it is not necessary for the control computer 101 to switch the cam follower member groups to be position-controlled depending on the shifting directions of the box-shaped member 12. Moreover, since it is also possible to independently control the positions of the cam follower members in the cam follower member groups located on one side of the cam follower member in the cam follower member group to be made in contact with the transmission plate 35a (35b), the cam follower member 15k can be preliminarily shifted toward the state of FIG. 1H, for example, even from the state shown in FIG. 1G. This arrangement is desirable because the linear motion actuator 1 can be successively operated even in the case when a linear motion mechanism having a slow operation speed is used.

In the first embodiment, all the support members 15a to 15p and the support members 18a to 18p are disposed at equal intervals, and all the cam follower members 16a to 16p and the cam follower members 19a to 19p included in the cam follower member groups G16a to G16p and the cam follower member groups G19a to G19p are disposed at equal intervals, so that this structure is desirable in view of controllability and performance stability of the linear motion actuator 1; however, the present invention is not intended to be limited to this case.

In the first embodiment, one linear motion member (the piston 33) is combined with one linear motion structural member (the box-shaped member 12); however, not being limited to this structure, a plurality of linear motion members (for example, pistons 33) may be combined with one linear motion structural member. Alternatively, some of the plurality of the linear motion members may be used for driving, while the other ones of the plurality of the linear motion members may be used for regenerating, so that energy transmission may be carried out via the linear motion members. Another structure may be proposed in which a plurality of rocking members (the transmission plates 35a, 35b) distributed in the shifting directions of the linear motion structural member (the box-shaped member 12) may be connected to one linear motion member (the piston 33). In this case, it is desirable to dispose the rocking members so as to be symmetrical with respect to the center axis of the linear motion member (the piston 33) because an unnecessary rotary torque is prevented from being exerted on the linear motion member (the piston 33).

The first embodiment provides the structure laterally symmetrical with respect to the center axis when viewed from the direction of FIG. 1C, which is desirable because the degree of control freedom can be reduced and because an unnecessary torque is not exerted on the piston 33; however, the present invention is not intended to be limited to this structure, and a different structure may be adopted in which only either one of the left and right sides is used. Moreover, in the first embodiment, since the transmission plates 35a and 35b are integrally tilted, the first linear motion mechanism 22a to the third linear motion mechanism 22c and the fourth linear motion mechanism 22d to the fifth linear motion mechanism 22f are symmetrically operated in synchronism with each other. However, not being limited to this structure, by tilting the transmission plates 35a and 35b independently from each other, the first linear motion mechanism 22a to the third linear motion mechanism 22c and the fourth linear motion mechanism 22d to the sixth linear motion mechanism 22f may be operated asymmetrically so that a generated force exerted on the rod 13 from the transmission plate 35a and a generated force exerted on the rod 13 from the transmission plate 35b may be made different from each other.

Further, in the first embodiment, the air-pressure tank 201, and the piston-cylinder mechanism configured by the cylinder 32 and the piston 33 are used as one example of the elastic mechanism; however, the structure of the elastic mechanism is not limited to this case, and another structure in which no air-pressure tank 201 is used, or still another structure in which an air/oil conversion system is formed between the air-pressure tank and the cylinder to operate the piston by using a hydraulic pressure, or any combinations of the known techniques such as applications of a coil spring or a magnetic spring may be utilized as long as the same functions can be achieved.

Figure 1L:
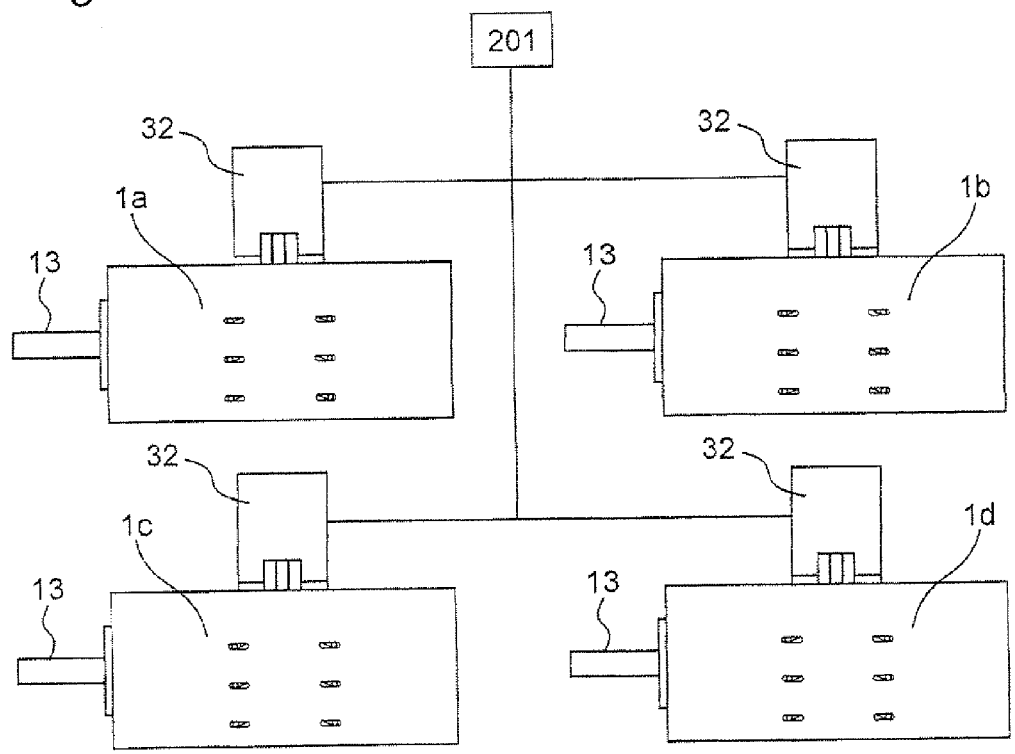
FIG. 1L is a view that shows a structure in which a plurality of linear motion actuators of the first embodiment of the present invention are used, with an air pressure tank being commonly used.

In the case when a plurality of linear motion actuators 1 are utilized, cylinders 32 or air-pressure tanks 201 may be respectively conducted to one another, or one air-pressure tank 201 may be shared by the plurality of linear motion actuators 1, so that the compressive fluid may be commonly utilized. For example, FIG. 1L shows a structure in which one air-pressure tank 201 is shared by four linear motion actuators 1a, 1b, 1c, and 1d. This structure is desirable because, upon operating the individual linear motion actuators 1, the pressure changes can be suppressed.

The motion conversion device in accordance with the first embodiment has a structure that only deals with a force applied to the linear motion member (the piston 33) in one direction; however, by directly coupling the linear motion mechanism and the support member so as to allow the linear motion mechanism being to be integrally operated with the box-shaped member, the transmission plates has a shape for sandwiching the cam follower members in the cam follower member groups, so that forces applied to the linear motion member from two directions can be dealt with.

Figure 2A:
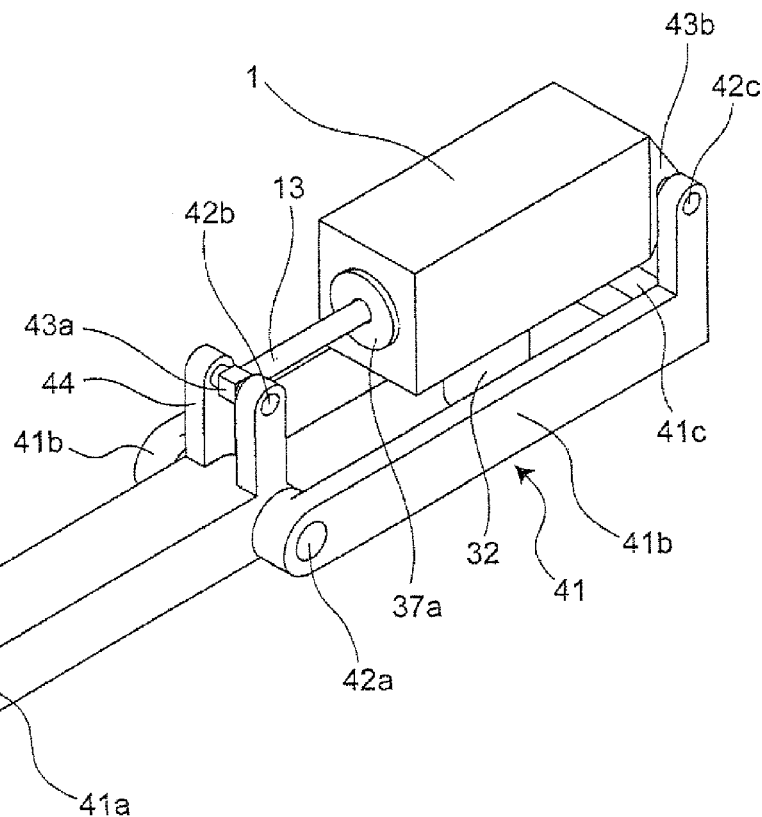
FIG. 2A is a perspective view that shows an outline of a joint driving unit in which the linear motion actuator of the first embodiment of the present invention is used.

Moreover, FIG. 2A shows a structural example of a joint driving unit in which the linear motion actuator 1 of the first embodiment is used. A shaft coupling member 43a is secured to the tip of the rod 13 of the linear motion actuator 1, with a shaft coupling member 43b being secured to the end of the frame 11 on the side opposite to the end from which the rod 13 of the linear motion actuator 1 is exposed. Meanwhile, to the end of an arm 41a coupled with the rod 13, a pair of support pillars 44 opposed to each other are attached, so that a gap between the tips of the paired support pillars 44 and the shaft coupling member 43a are coupled to each other via a shaft 42b so as to freely rotate. Moreover, bending portions of paired L-letter-shaped arms 41b opposed to each other are mutually coupled to a rod-shaped coupling member 41c so that a structure (linear motion actuator support member) 41 having a U-letter shape on a plan view is formed. These paired arms 41b of the linear motion actuator support member 41 are designed so that the tip portions on one of the bending sides and the shaft coupling member 43b are coupled to each other via a shaft 42c so as to freely rotate, and the tip portions on the other bending side and base portion of the paired support pillars 44 are coupled to each other via the shaft 42a so as to freely rotate. The portion coupled by the shaft 42a forms a joint portion between the arm 41a and the arm 42b.

Figure 2B:
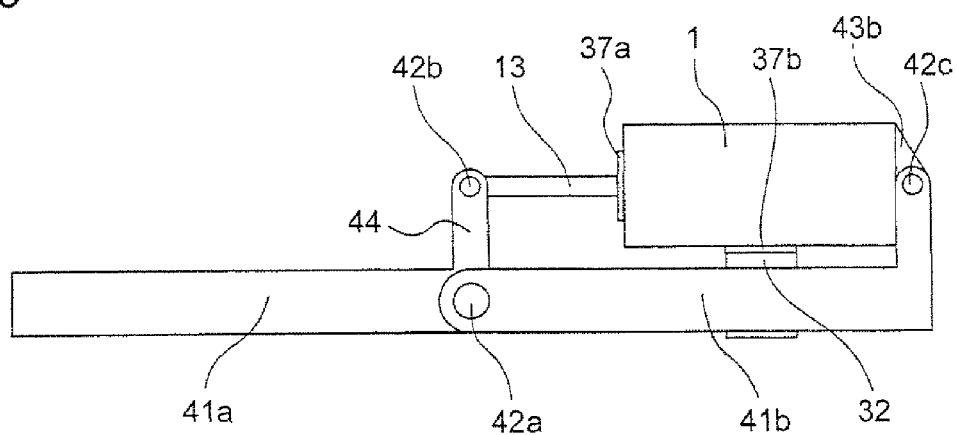
FIG. 2B is a front view that shows the outline of the joint driving unit in which the linear motion actuator of the first embodiment of the present invention is used.
Figure 2C:
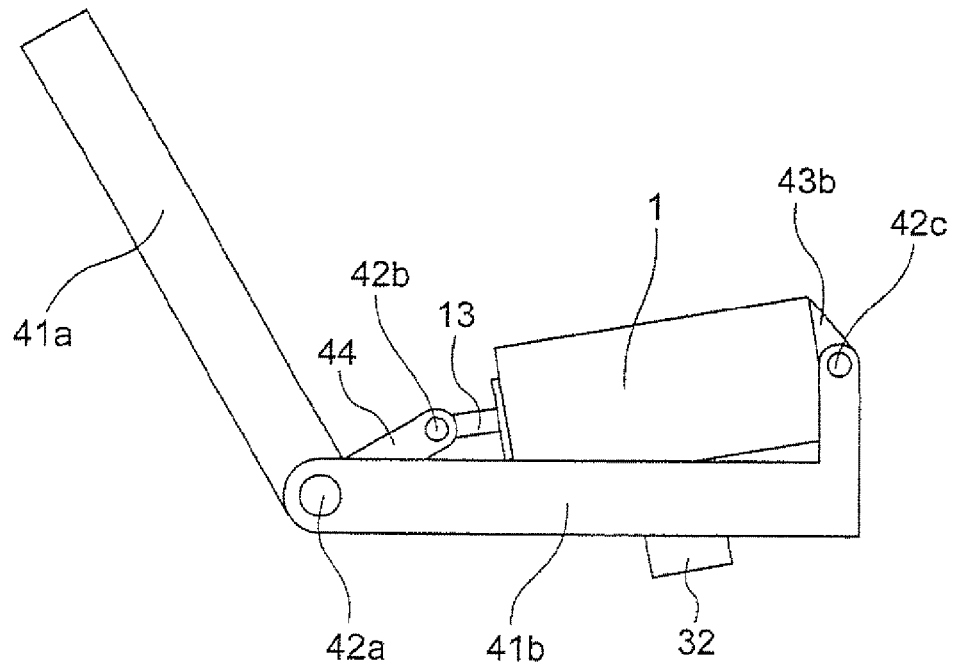
FIG. 2C is a front view that shows the outline of the joint driving unit in which the linear motion actuator of the first embodiment of the present invention is used.

In the above structure, upon operating the linear motion actuator 1 from the state shown in FIG. 2B to move the rod 13 rightward in FIG. 2B, the arm 41a is allowed to carry out a rotation operation clockwise around the shaft 42a relative to the arm 41b so that a state as shown in FIG. 2C is obtained. In the same manner, by moving the rod 13 leftward in FIG. 2B, the arm 41a is allowed to rotate in a reverse direction (that is, anticlockwise around the shaft 42a) around the shaft 42a relative to the arm 41b.

Therefore, in accordance with the first embodiment, a motion conversion device, a flexible actuator using such a device, and a joint driving unit that can variably change a transmission gear ratio with superior conversion efficiency can be obtained. In other words, in accordance with the first embodiment, a force to be exerted on the linear motion member (for example, the piston 33) is outputted to the linear motion structural member (for example, the box-shaped member 12) at a speed variably changed in response to the degree of the tilt of the rocking member (for example, the transmission plate 35a or 35b) of which tilt is changed along a guide row composed by the guide members (for example, the cam follower members 16a to 16p; 19a to 19p). Accordingly, by controlling the displacements of the guide holding members (for example, the support members 15a to 15p; 18a to 18p) using the displacement generation mechanisms (for example, the first to sixth linear motion mechanisms 22a to 22f), the transmission gear ratio can be variably changed. Moreover, this structure is designed so that the outputs of the linear motion member (for example, the piston 33) and the linear motion structural member (for example, the box-shaped member 12) are operated mechanically in cooperation with each other at a ratio in accordance with the tilt of the rocking member (for example, the transmission plate 35a or 35b), and motion conversion is carried out with no loss factors being interposed therebetween, so that it is possible to improve the conversion efficiency.

Second Embodiment

Figure 3A:
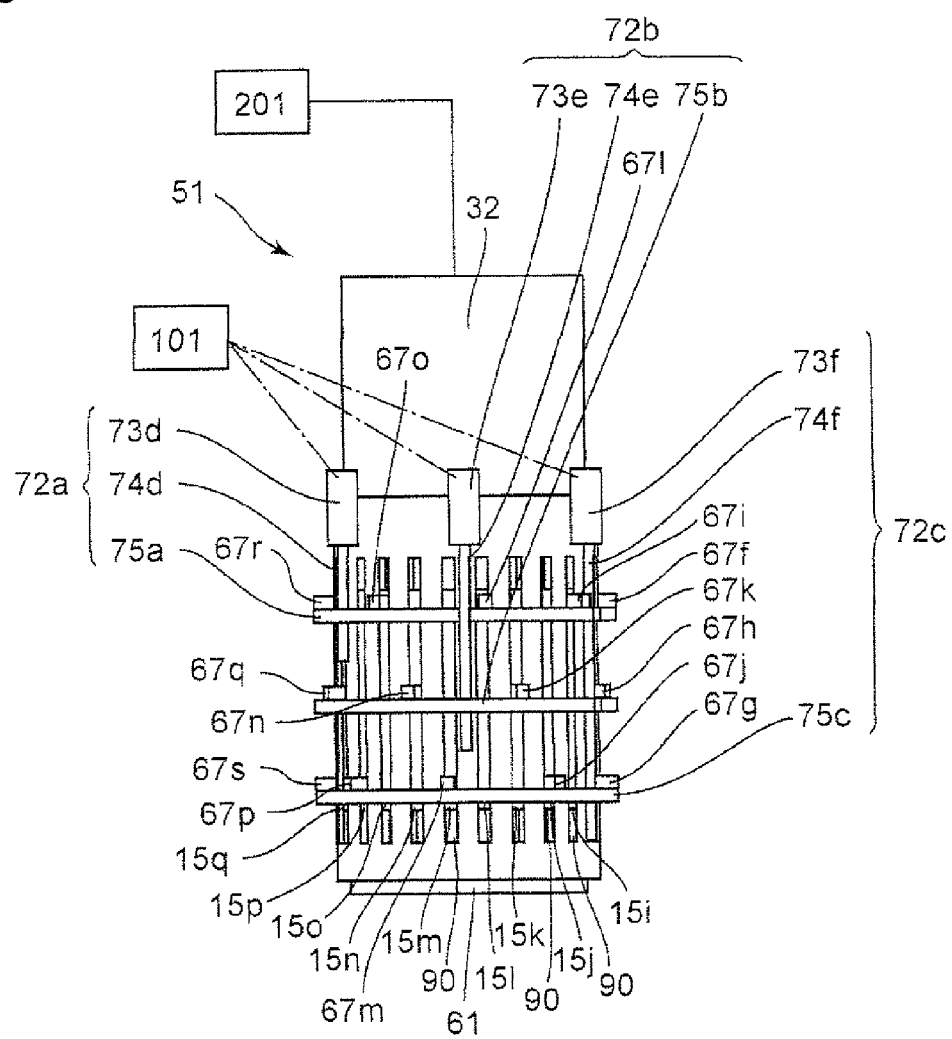
FIG. 3A is a front view that shows an outline of a rotary actuator in accordance with a second embodiment of the present invention.
Figure 3B:
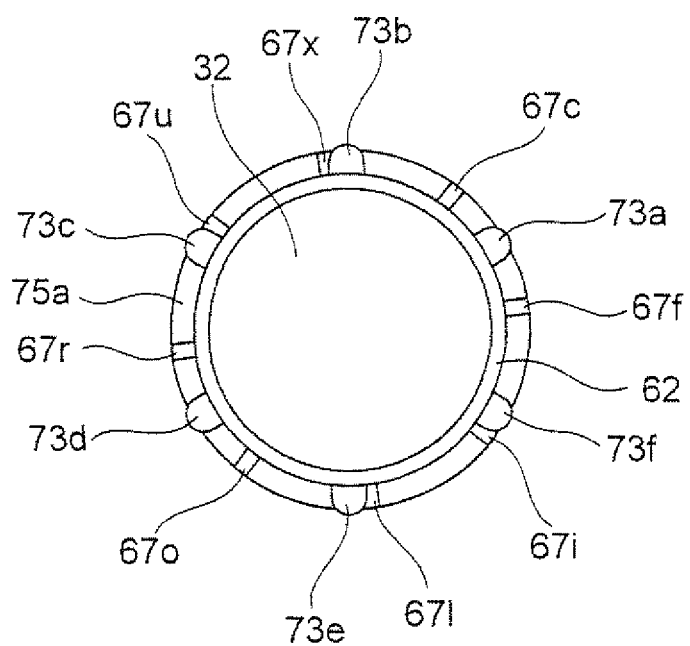
FIG. 3B is a top view that shows the outline of the rotary actuator in accordance with the second embodiment of the present invention.
Figure 3C:
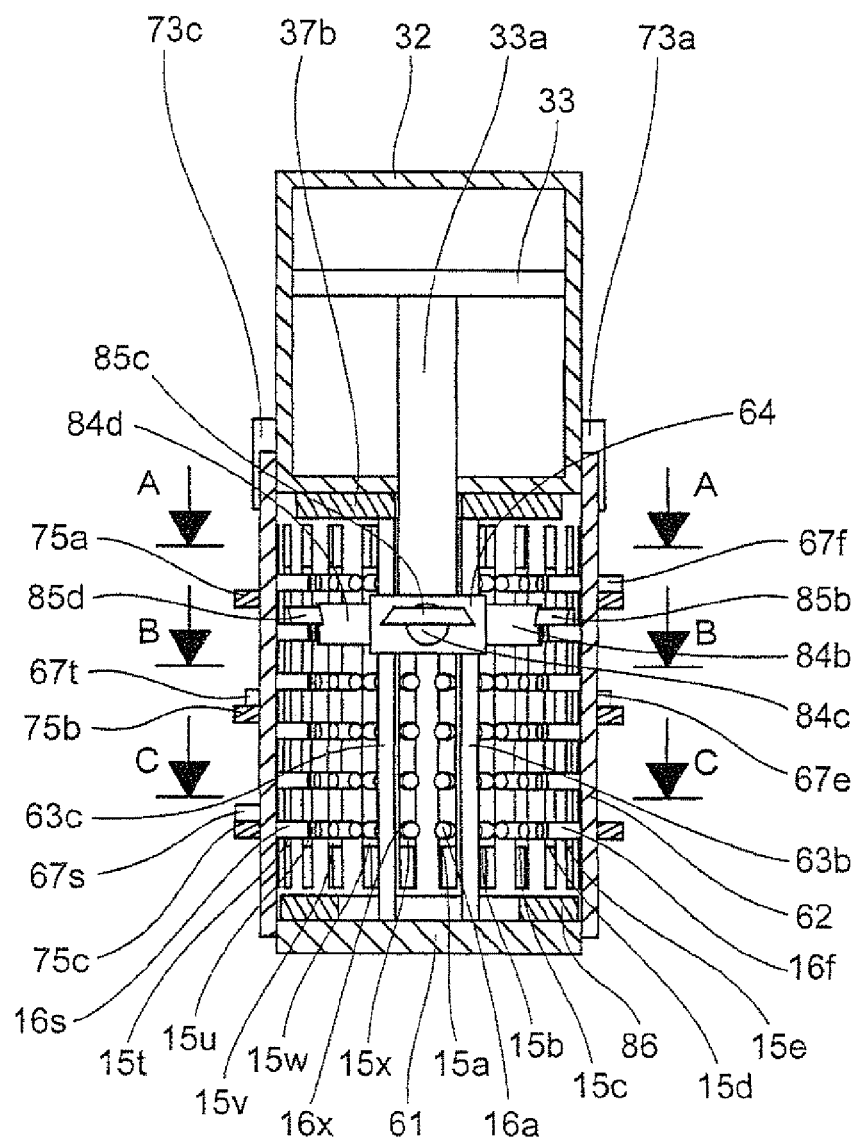
FIG. 3C is a front cross-sectional view that shows the outline of the rotary actuator in accordance with the second embodiment of the present invention.
Figure 3D:
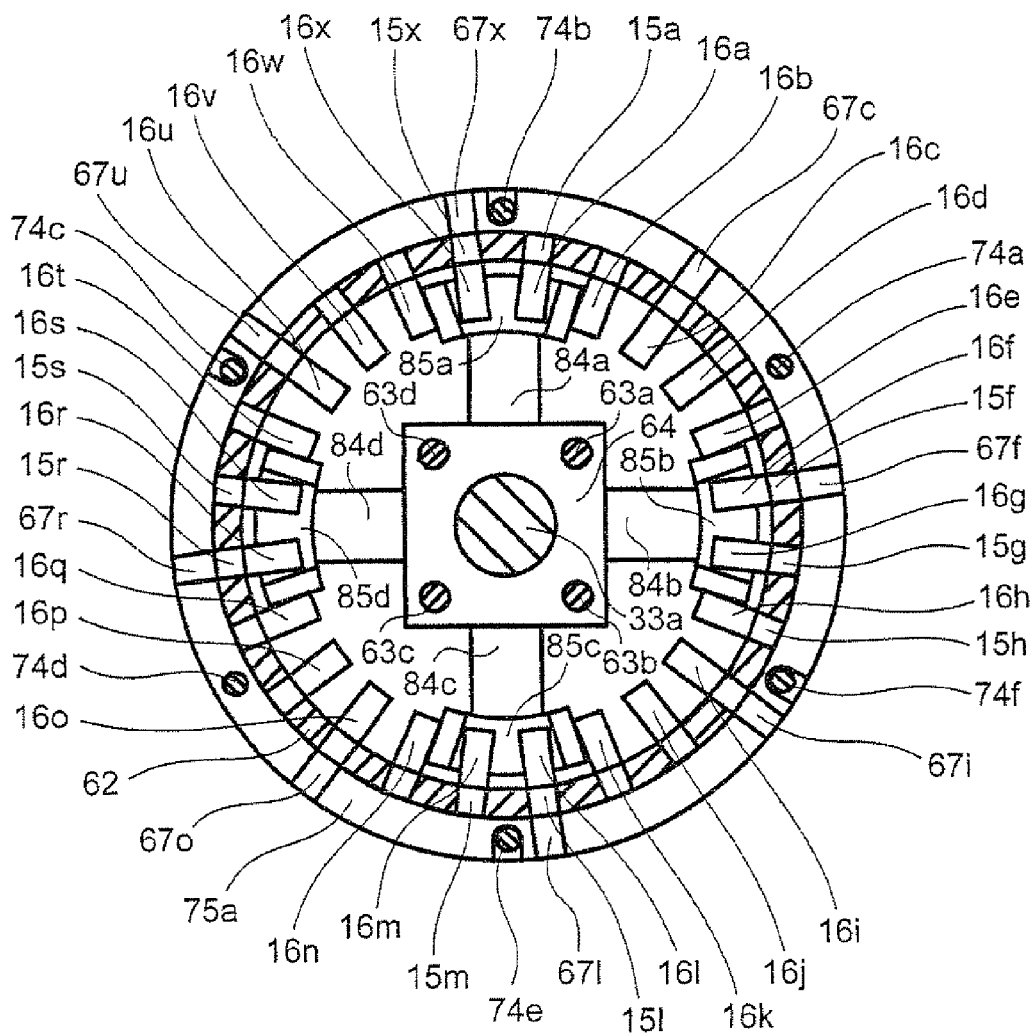
FIG. 3D is an A-A line cross-sectional view of FIG. 3C that shows the outline of the rotary actuator in accordance with the second embodiment of the present invention.
Figure 3E:
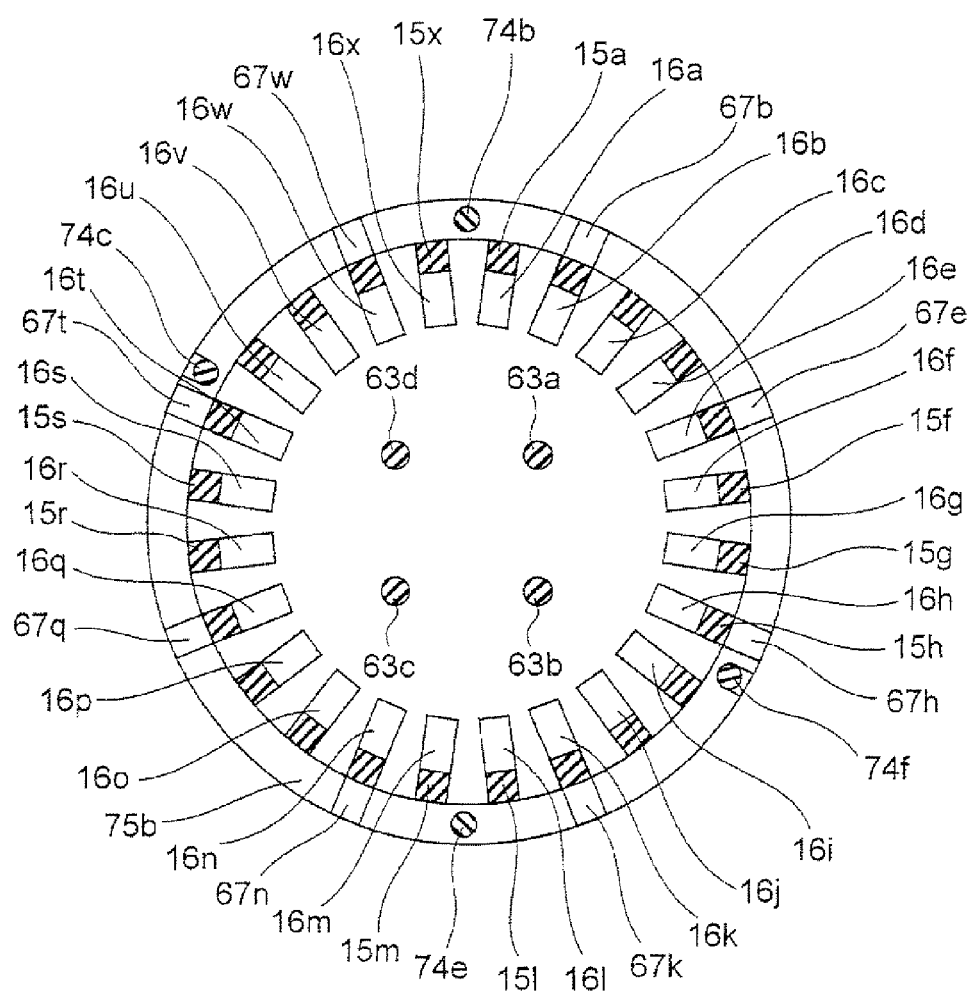
FIG. 3E is a B-B line cross-sectional view of FIG. 3C that shows the outline of the rotary actuator in accordance with the second embodiment of the present invention.
Figure 3F:
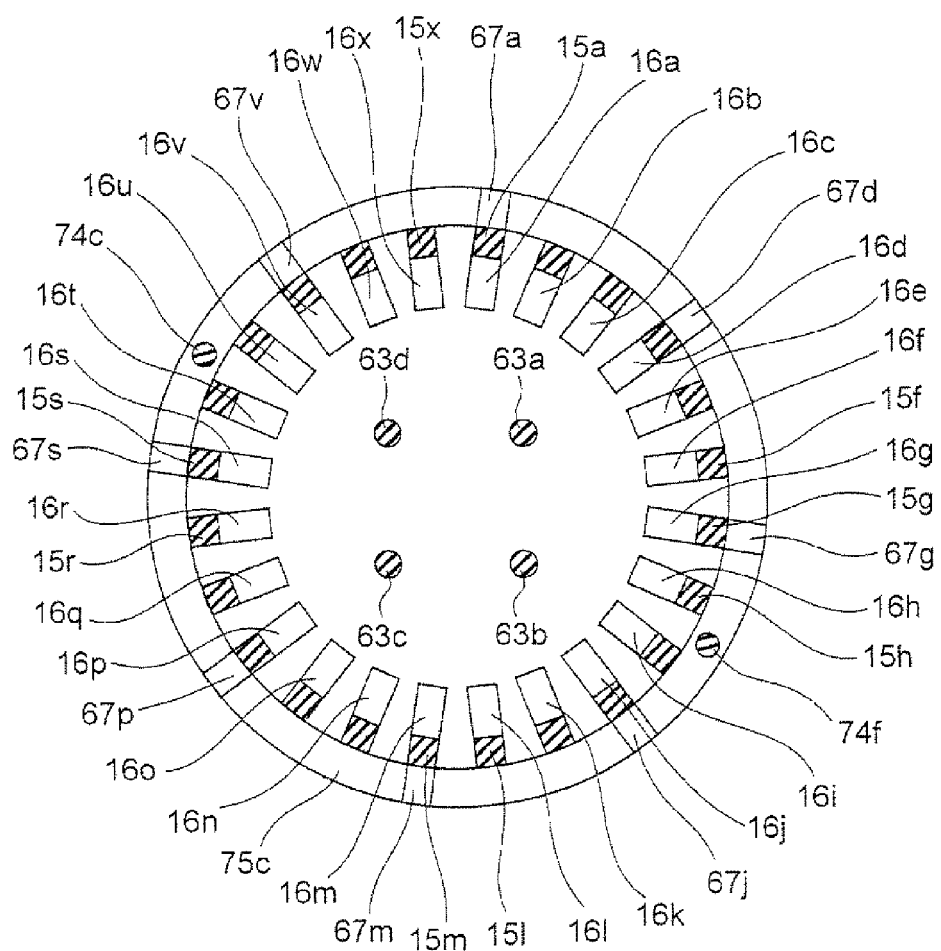
FIG. 3F is a C-C line cross-sectional view of FIG. 3C that shows the outline of the rotary actuator in accordance with the second embodiment of the present invention.

FIG. 3A, FIG. 3B and FIG. 3C are a front view, a top view, and a front cross-sectional view that each show an outline of a rotary actuator 51 serving as one example of a flexible actuator in which a motion conversion device in accordance with a second embodiment of the present invention is used, and FIG. 3D is an A-A line cross-sectional view of FIG. 3C. FIG. 3E and FIG. 3F respectively show a B-B line cross-sectional view and a C-C line cross-sectional view of FIG. 3C, and in these figures, a cylindrical member 62 is not shown. In FIGS. 3A to 3F, a disc member 61 having a disc shape serving as one example of a base member is coupled to a cylinder 32 and four shafts 63a, 63b, 63c, and 63d that are disposed around a center axis of the cylinder at equal intervals. The shafts 63a, 63b, 63c, and 63d are placed in a vertical direction in parallel with one another, and a block 64 having a rectangular plate shape and secured to the lower end of a piston rod 33a of a piston 33 is connected to the shafts 63a, 63b, 63c, and 63d so as to freely reciprocally move in the vertical direction of FIG. 3C (so as to freely reciprocally move in directions substantially in parallel with the shifting directions of support members 15a to 15x to be described later). Moreover, the outer circumference of the cylinder 32 and the cylindrical member 62 serving as one example of a rotary structural member are connected so as to freely rotate via a bearing (for example, a ball bearing). In addition, the outer circumference of the disc member 61 and the cylindrical member 62 are connected so as to freely rotate via a bearing (for example, a combined angular ball bearing) of which thrust direction is constrained so that the cylindrical member 62 is held onto the disc member 61 so as to freely rotate. In this case, the function of constraining the thrust direction may be imparted to the bearing that connects the outer circumference of the cylinder 32 and the cylindrical member 62. Moreover, the rotation angle around the center axis of the cylindrical member 62 is measured by a rotary encoder 86 provided to the disc member 61. As the rotary encoder 86, for example, an optical encoder may be utilized. In the cylindrical member 62, 24 elongated rectangular grooves 90 that are in parallel with one another are formed in a vertical direction (direction substantially in parallel with the rotation axis of the cylindrical member 62) of FIG. 3C so that 24 rod-shaped support members, each serving as one example of the guide holding member, 15a, 15b, 15c, 15d, 15e, 15f, 15g, 15h, 15i, 15j, 15k, 15l, 15m, 15n, 15o, 15p, 15q, 15r, 15s, 15t, 15u, 15v, 15w, and 15x are held in the 24 elongated rectangular grooves 90 at equal intervals so as to freely reciprocally move in the vertical direction (direction substantially in parallel with the rotation axis of the cylindrical member 62) of FIG. 3C. Onto the front surfaces (inner circumferential surfaces) of the support members 15a, 15b, 15c, 15d, 15e, 15f, 15g, 15h, 15i, 15j, 15k, 15l, 15m, 15n, 15o, 15p, 15q, 15r, 15s, 15t, 15u, 15v, 15w, and 15x, 24 cam follower member groups G16a, G16b, G16c, G16d, G16e, G16f, G16g, G16h, G16i, G16j, G16k, G16l, G16m, G16n, G16o, G16p, G16q, G16r, G16s, G16t, G16u, G16v, G16w, and G16x, which are respectively configured by six cylindrical cam follower members 16a, 16b, 16c, 16d, 16e, 16f, 16g, 16h, 16i, 16j, 16k, 16l, 16m, 16n, 16o, 16p, 16q, 16r, 16s, 16t, 16u, 16v, 16w, and 16x, each serving as one example of a guide member and disposed along the axial direction at equal intervals, are respectively connected, and also onto the rear surfaces (outer circumferential surfaces), rod-shaped members 67a, 67b, 67c, 67d, 67e, 67f, 67g, 67h, 67i, 67j, 67k, 67l, 67m, 67n, 67o, 67p, 67q, 67r, 67s, 67t, 67u, 67v, 67w, and 67x, each having a rectangular cross section, are secured. The rod-shaped members 67c, 67f, 67i, 67l, 67o, 67r, 67u, and 67x are attached to the upper portions of the respective support members and are made in contact with ring-shaped members 75a to be described later. The cam follower members 67b, 67e, 67h, 67k, 67n, 67q, 67t, and 67w are attached to the center portions of the respective support members and are made in contact with ring-shaped members 75b to be described later. The cam follower members 67a, 67d, 67g, 67j, 67m, 67p, 67s, and 67v are attached to the lower portions of the respective support members and are made in contact with ring-shaped members 75c to be described later. Moreover, the cam follower members 16a, 16b, 16c, 16d, 16e, 16f, 16g, 16h, 16i, 16j, 16k, 16l, 16m, 16n, 16o, 16p, 16q, 16r, 16s, 16t, 16u, 16v, 16w, and 16x are all designed to have the same diameter. The rod-shaped members 67a, 67b, 67c, 67d, 67e, 67f, 67g, 67h, 67i, 67j, 67k, 67l, 67m, 67n, 67o, 67p, 67q, 67r, 67s, 67t, 67u, 67v, 67w, and 67x, each having a rectangular cross section, are all designed to have the same dimension. Moreover, onto the support members 15a, 15b, 15c, 15d, 15e, 15f, 15g, 15h, 15i, 15j, 15k, 15l, 15m, 15n, 15o, 15p, 15q, 15r, 15s, 15t, 15u, 15v, 15w, and 15x (15a to 15x), the cam follower members 16a, 16b, 16c, 16d, 16e, 16f, 16g, 16h, 16i, 16j, 16k, 16l, 16m, 16n, 16o, 16p, 16q, 16r, 16s, 16t, 16u, 16v, 16w, and 16x are disposed at intervals in the shifting directions of the support members 15a to 15x.

In the same manner as in the first embodiment with the typical example shown in FIG. 4B, the respective 6 cam follower members 16a, 16b, 16c, 16d, 16e, 16f, 16g, 16h, 16i, 16j, 16k, 16l, 16m, 16n, 16o, 16p, 16q, 16r, 16s, 16t, 16u, 16v, 16w, and 16x of the cam follower member groups G16a, G16b, G16c, G16d, G16e, G16f, G16g, G16h, G16i, G16j, G16k, G16l, G16m, G16n, G16o, G16p, G16q, G16r, G16s, G16t, G16u, G16v, G16w, and G16x on the front surfaces (inner circumferential surfaces) of the support members 15a, 15b, 15c, 13d, 15e, 15f, 15g, 15h, 15i, 15j, 15k, 15l, 15m, 15n, 15o, 15p, 15q, 15r, 15s, 15t, 15u, 15v, 15w, and 15x are configured by column-shaped shaft portions 91 that are secured to the respective support members 15a, 15b, 15c, 15d, 15e, 15f, 15g, 15h, 15i, 15j, 15k, 15l, 15m, 15n, 15o, 15p, 15q, 15r, 15s, 15t, 15u, 15v, 15w, and 15x, and cylindrical outer circumferential portions 92 that are made freely rotatable on the shaft portions 91 by needle bearings 94 respectively built in the cam follower members in the respective cam follower member groups, so that the outer circumferential portions 92 of the respective cam follower members in the cam follower member groups are made freely rotatable with respect to the support members 15a, 15b, 15c, 15d, 15e, 15f, 15g, 15h, 15i, 15j, 15k, 15l, 15m, 15n, 15o, 15p, 15q, 15r, 15s, 15t, 15u, 15v, 15w, and 15x.

This structure in which the respective outer circumferential portions 92 of the cam follower members 16a to 16x are freely rotatably connected to the support members 15a to 15x is desirable in view of the effect that reduction is achieved to resistance generated upon relatively moving while being kept in contact with transmission plates 85a to 85d to be described later. Moreover, the support members 15a to 15x are allowed to freely reciprocally move in the vertical direction of FIG. 3C, and a precompression mechanism such as a spring that presses and biases the support members 15a to 15x toward one side in the shifting directions (downward, for example) may be installed in a gap to the cylindrical members 62, in the same manner as in the first embodiment shown in FIG. 4A. This structure is desirably used because the positions of the support members 15a to 15x can be stabilized irrespective of the gravity direction. In the second embodiment, each of the cam follower member groups is configured by the six cam follower members; however, the present invention is not intended to be limited to this structure.

Moreover, to the cylindrical member 62, three linear motion mechanisms 72a, 72b, and 72c, namely, the seventh, eighth, and ninth linear motion mechanisms 72a, 72b, and 72c, each serving as one example of the displacement generation mechanism, are connected so as to relatively displace some of the support members 15a to 15x relative to the cylindrical member 62.

As shown in FIG. 3A, the seventh linear motion mechanism 72a is configured by two seventh motors 73a and 73d that are secured to the upper end edge of the cylindrical member 62 around the center axis of the cylindrical member 62 at intervals of 180 degrees, seventh feeding screws 74a and 74d that are coupled to rotary shafts of the seventh motors 73a and 73d and allowed to forwardly/reversely rotate when driven by the seventh motors 73a and 73d, and a seventh ring-shaped member 75a through which the seventh screws 74a and 74d are screwed and which is allowed to reciprocally move in the vertical directions of FIG. 3A in response to the forward/reverse rotation of the seventh feeding screws 74a and 74d.

In the same manner as in the seventh linear motion mechanism 72a, an eighth linear motion mechanism 72b is configured by two eighth motors 73b and 73e that are secured to the upper end edge of the cylindrical member 62 around the center axis of the cylindrical member 62 at intervals of 180 degrees, eighth feeding screws 74b and 74e that are coupled to rotary shafts of the eighth motors 73b and 73e and allowed to forwardly/reversely rotate when driven by the eighth motors 73b and 73e, and an eighth ring-shaped member 75b through which the eighth screws 74b and 74e are screwed and which is allowed to reciprocally move in the vertical direction of FIG. 3A in response to the forward/reverse rotation of the eighth feeding screws 74b and 74e. Moreover, the eighth feeding screws 74b and 74e penetrate through through holes in the seventh ring-shaped member 75a each having a hole diameter greater than the respective outer diameters of the eighth feeding screws 74b and 74e so that the seventh ring-shaped member 75a is prevented from being moved by forward/reverse rotations of the eighth feeding screws 74b and 74e.

Moreover, in the same manner as in the seventh linear motion mechanism 72a, a ninth linear motion mechanism 72c is configured by two ninth motors 73c and 73f that are secured to the upper end edge of the cylindrical member 62 around the center axis of the cylindrical member 62 at intervals of 180 degrees, ninth feeding screws 74c and 74f that are coupled to rotary shafts of the ninth motors 73c and 73f and allowed to forwardly/reversely rotate when driven by the ninth motors 73c and 73f, and a ninth ring-shaped member 75c through which the ninth screws 74c and 74f are screwed and which is allowed to reciprocally move in the vertical direction of FIG. 3A in response to the forward/reverse rotation of the ninth feeding screws 74c and 74f. Moreover, the ninth feeding screws 74c and 74f penetrate through through holes in the seventh and eighth ring-shaped members 75a and 75b having hole diameters greater than the respective outer diameters of the ninth feeding screws 74c and 74f so that the seventh and eighth ring-shaped members 75a and 75b are prevented from being moved by forward/reverse rotations of the ninth feeding screws 74c and 74f.

The seventh, eighth, and ninth linear motion mechanisms 72a, 72b, and 72c are designed so that the moving ranges in the vertical direction of the seventh, eighth, and ninth ring-shaped members 75a, 75b, and 75c are not overlapped with one another. Moreover, rod-shaped members 67c, 67f, 67i, 67l, 67o, 67r, 67u, and 67x are respectively secured to the seventh ring-shaped member 75a, rod-shaped members 67b, 67e, 67h, 67k, 67n, 67q, 67t, and 67w are respectively secured to the eighth ring-shaped member 75b, and rod-shaped members 67a, 67d, 67g, 67j, 67m, 67p, 67s, and 67v are respectively secured to the ninth ring-shaped member 75c, such that the same displacement is generated for every 45 degrees.

Figure 3G:
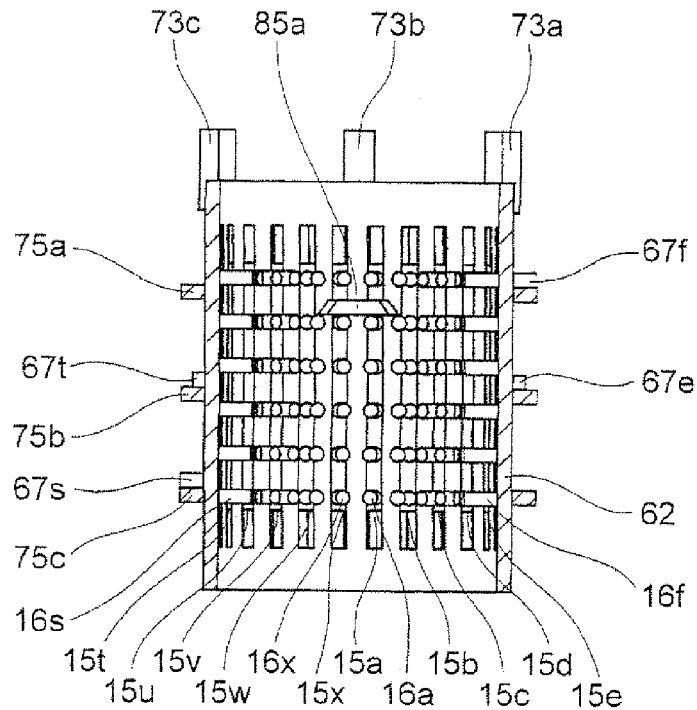
FIG. 3G is a cross-sectional view that shows an outline of a driving state of the rotary actuator of the second embodiment of the present invention.
Figure 3H:
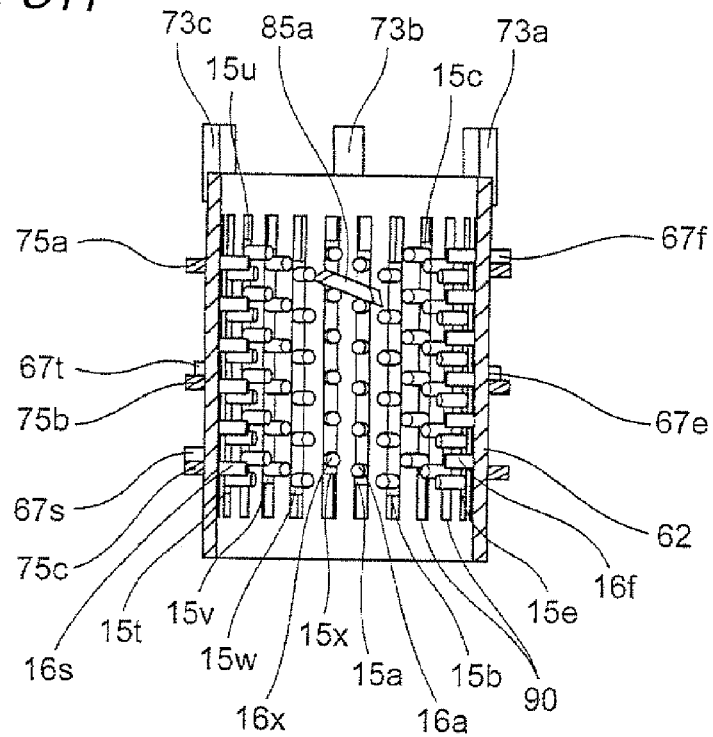
FIG. 3H is a cross-sectional view that shows an outline of a driving state of the rotary actuator of the second embodiment of the present invention.

Moreover, to the block 64 secured to the lower end of the piston rod 33a of the piston 33, the rotary members 84a, 84b, 84c, and 84d are connected via bearings, respectively at intervals of 90 degrees so as to freely rotate (so as to rock around the axis substantially perpendicular to the shifting directions of the piston 33). Transmission plates 85a, 85b, 85c, and 85d each serving as one example of the rocking member are respectively secured to the tips of the rotary members 84a, 84b, 84c, and 84d. The lower surface of each of the transmission plates 85a to 85d in FIG. 3C forms a plane including the center axis of each of the rotary members 84a to 84d. This structure is desirably used because, when the transmission plates 85a to 85d are tilted, no displacement components other than the tilt are generated on the lower surface of each of the transmission plates 85a to 85d in FIG. 3C. The lower surface of each of the transmission plates 85a to 85d is pressed onto some of the cam follower members among the cam follower members 16a to 16x by a driving force provided from the piston-cylinder mechanism and exerted onto the piston 33. For example, in a state shown in FIG. 3C, the transmission plate 85a is pressed onto the cam follower members 16a and 16x, the transmission plate 85b is pressed onto the cam follower members 16f and 16g, the transmission plate 85c is pressed onto the cam follower members 16l and 16m, and the transmission plate 85d is pressed onto the cam follower members 16r and 16s. Since the cam follower members in the cam follower member groups are designed to cause the same displacements for every 45 degrees, the transmission plates 85a to 85d placed at intervals of 90 degrees and the cam follower members in the cam follower member groups which are made in contact therewith are designed to automatically form the same positional relationships. This structure is desirable because, even if the number of the transmission plates increases, there is no need to increase the number of the linear motion mechanisms. In this case, each of the transmission plates 85a to 85d has a sector plate shape in a plan view as well as has a trapezoidal shape provided with an upper narrowed portion relative to the lower surface side of FIG. 3C. In other words, the shape is designed such that in the cross-sectional shape on the plane perpendicular to the rocking center axis of each of the transmission plates 85a to 85d, a tapered portion having a widened contact surface with the cam follower member is provided. By adopting such a shape, even when the transmission plates 85a to 85d are tilted as shown in FIG. 3H, the side face of each of the transmission plates 85a to 85d is prevented from protruding from right and left ends of the lower surface of each of the transmission plates 85a to 85d that forms a contact surface with the cam follower members 16a to 16x; therefore, this arrangement is desirable because the displacements of the cam follower members that are not made in contact with the lower surfaces of the transmission plates 85a to 85d is prevented from being disturbed. Moreover, the width in the circumferential direction of each of the transmission plates 85a to 85d (the dimension in the lateral direction in FIG. 3D) is defined as {(the sector length between centers of the cam follower members in the adjacent cam follower member groups×3)−(the diameter of the cam follower members in the cam follower member groups)}, and in the case when the cylindrical member 62 is rotated with the transmission plates 85a to 85d being in the horizontal state, as shown in FIG. 3C, the lower surface of each of the transmission plates 85a to 85d is made to have such a width so as to be always made in contact with the 2 to 3 cam follower members in the cam follower member groups.

Moreover, a control computer 101 serving as one example of a control device that changes the transmission gear ratio between the displacement velocity of the piston 33 and the rotation speed of the cylinder-shaped member 62 by controlling operations of the plurality of displacement generation mechanisms 72a, 72b, and 72c is connected to the seventh to ninth motors 73a to 73f of the seventh to ninth linear motion mechanisms 72a to 72c, respectively, a linear encoder 37b, and a liner encoder 86. FIG. 3G is a view not showing the cylinder 32, the piston 33, the disc member 61, the shafts 63a to 63d, the block 64, the rotary members 84a to 84c, and the transmission plates 85b to 85d from the cross-sectional view of FIG. 3C, for easiness of the illustration thereof.

Figure 9A:
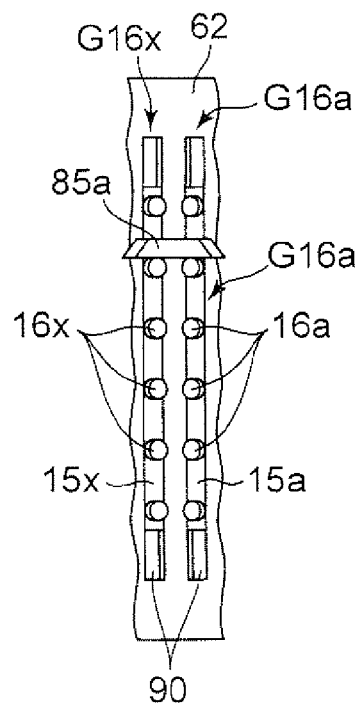
FIG. 9A is a partially enlarged view that shows one example of a contact state between a transmission plate and a cam follower member in a cam follower member group in accordance with the second embodiment of the present invention.

In accordance with the operations of the seventh to ninth motors 73a to 73f controlled by the control computer 101, the seventh to ninth feeding screws 74a to 74f are respectively rotated so that the positions of the seventh to ninth ring-shaped members 75a to 75c are respectively changed. In accordance with the displacements of the seventh to ninth ring-shaped members 75a to 75c, the support members 15a to 15x connected to the rod-shaped members 67a to 67x are displaced in cooperation therewith. The displacements of the support members 15a to 15x are exerted on the transmission plates 85a to 85d through the cam follower members 16a to 16x so that the positions or the angles of the transmission plates 85a to 85d are changed. For example, in a case when the periphery of the transmission plate 85a is in a state as shown in FIG. 3G (a partially enlarged view of the periphery of the transmission plate 85a is shown in FIG. 9A), if the seventh motors 74a and 74d are rotated and the seventh ring-shaped member 75a is displaced upward, the rod-shaped members 67c, 67f, 67i, 67l, 67o, 67r, 67u, and 67x are also displaced upward integrally with the seventh plate-shaped member 75a, so that the support members 15c, 15f, 15i, 15l, 15o, 15r, 15u, and 15x as well as the cam follower members 16c, 16f, 16i, 16l, 16o, 16r, 16u, and 16x, which are coupled thereto, are also displaced upward in the same manner. As a result, the displacement plate 85a is moved upward, while being tilted, to be brought into a state shown in FIG. 3H (a partially enlarged view of the periphery of the transmission plate 85a is shown in FIG. 9B).

Next, the following will describe functions of the rotary actuator 51 made under control of the control computer 101. In FIG. 3D, since the support members 15a to 15x, the cam follower members 16a to 16x, the rotary members 84a to 84d, and the transmission plates 85a to 85d have a cyclic structure for every 90 degrees, the following will describe functions relating to the transmission plate 85a, and with respect to the transmission plates 85b to 85d, the description thereof is not given by indicating each of the corresponding reference numerals in the transmission plates 85b, 85c, and 85d in parentheses.

A torque to be exerted on the cylindrical member 62 of the rotary actuator 51 (hereinafter, referred to as "generated torque") is determined by the driving force from the piston-cylinder mechanism to be exerted onto the piston 33 and the degree of the tilt of each of the transmission plates 85a to 85d. More specifically, in a state shown in FIG. 3G and FIG. 9A where the transmission plate 85a (85b, 85c, 85d) is horizontally provided, the driving force from the piston-cylinder mechanism to be exerted onto the transmission plate 85a (85b, 85c, 85d) is transmitted through the cam follower members 16x (16f, 16l, 16r) and 16a (16g, 16m, 16s), the support members 15x (15f, 15l, 15r) and 15a (15g, 15m, 15s), the linear motion mechanisms 72a and 72c, and the cylindrical member 62, and is kept by the disc member 61, with the result that the generated torque in the cylindrical member 62 becomes 0.

Figure 9B:
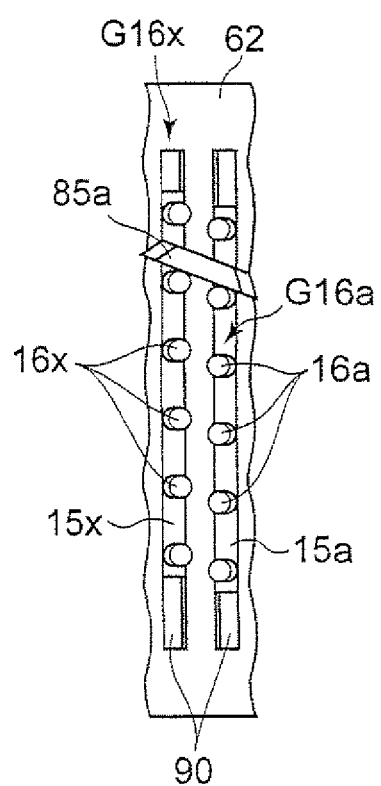
FIG. 9B is a partially enlarged view that shows another example of a contact state between the transmission plate and a cam follower member in the cam follower member group in accordance with the second embodiment of the present invention.

In contrast, in the case when the transmission plate 85a (85b, 85c, 85d) is brought into a tilted state from the horizontal state as shown in FIG. 3H and FIG. 9B (for example, in FIG. 3H and FIG. 9S, the transmission plate 85a is kept in a state tilted upward to the left with the right end directed downward and with the left end directed upward), forces in a lateral direction (for example, leftward in FIG. 3H and FIG. 9B) are exerted at contact points between the transmission plate 85a (85b, 85c, 85d) and the cam follower members 16x (16f, 16l, 16r) and 16a (16g, 16m, 16s). The downward force to be exerted onto the cam follower members 16x (16f, 16l, 16r) and 16a (16g, 16m, 16s) is transmitted through the support members 15x (15f, 15l, 15r) and 15a (15g, 15m, 15s), the linear motion mechanisms 72a and 72c, and the cylindrical member 62, and is held by the disc member 61, while the leftward force to be exerted onto the cam follower members 16x (16f, 16l, 16r) and 16a (16g, 16m, 16s) is transmitted through the support members 15x (15f, 15l, 15r) and 15a (15g, 15m, 15s) and is outputted to the cylindrical member 62. In a static state where losses due to sliding or the like are ignored, this leftward force, that is, the generated anticlockwise torque around an upward axis in FIG. 3H relative to the cylindrical member 62, is substantially expressed by a product of a force indicated by a product of the driving force exerted on the piston 33 from the piston-cylinder mechanism and a tangent relative to the angle change from the horizontal state of the transmission plate 85a (85b, 85c, 85d), and a contact radius between the transmission plates 85a to 85d and the cam follower members 16a to 16x. Moreover, in order to stabilize the contact positions between the transmission plates 85a to 85d and the cam follower members 16a to 16x, it is desirable to form the tip of each of the cam follower members in the cam follower member groups into a spherical shape. Thus, by driving the motors 73a to 73f so as to allow the transmission plates 85a to 85d to have a tilt angle corresponding to a torque that the control computer 101 desires to output, the torque control can be carried out on the rotary actuator 51.

Moreover, with respect also to disturbances in the high-frequency band on which no control of the control computer 101 is exerted, since the flexibility is maintained by the elasticity of the cylinder 32, the rotary actuator 51 is capable of functioning as a safe flexible actuator against the contact.

Figure 3I:
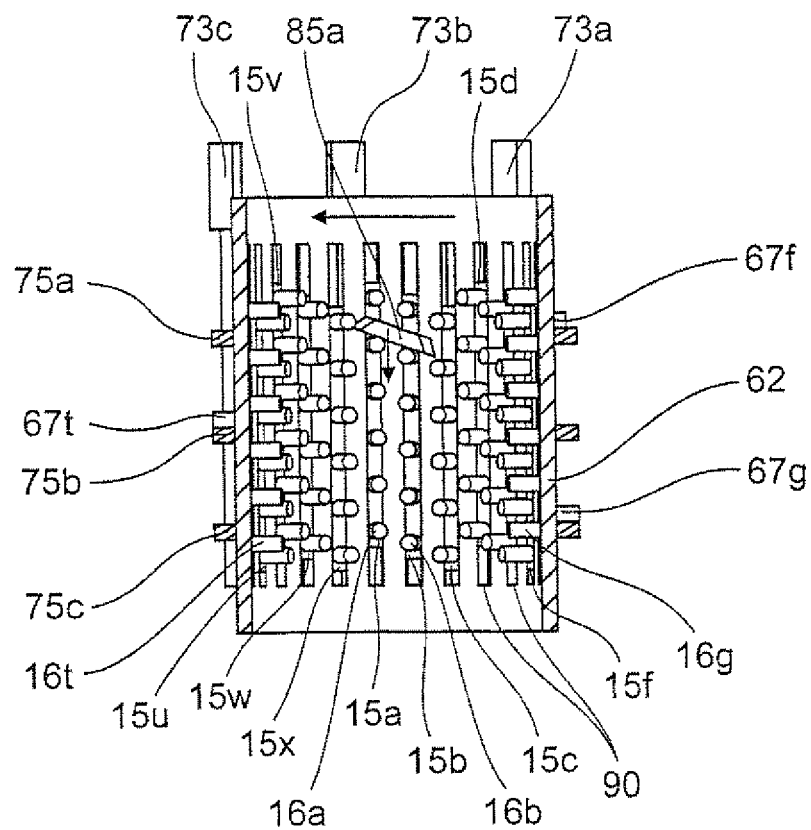
FIG. 3I is a cross-sectional view that shows an outline of a driving state of the rotary actuator of the second embodiment of the present invention.

In the case when the cylindrical member 62 of the rotary actuator 51 is rotated in the torque generation direction, more specifically, from a state shown in FIG. 3H to a state shown in FIG. 3I, the rotary actuator 51 is defined as executing work to the outside. That is, in a case when the control computer 101 keeps the driving operations of the motors 73a, 73c, 73d, and 73f in a resting state, as the cylindrical member 62 is rotated, the transmission plate 85a (85b, 85c, 85d) is allowed to slide on the surfaces of the cam follower members 16x (16f, 16l, 16r) and 16a (16g, 16m, 16s) so that the piston 33 is allowed to shift downward in FIG. 3C. In this case, by the energy lost by the cylinder 32 and the air-pressure tank 201, the rotary actuator 51 executes work to the outside of the rotary actuator 51.

In contrast, in the case when the cylindrical member 62 of the rotary actuator 51 is rotated in a direction opposite to the torque generation direction, namely, from the state shown in FIG. 3I to the state shown in FIG. 3H, the rotary actuator 51 is defined as being worked from the outside. That is, in the case when the control computer 101 keeps the driving operations of the motors 73b, 73c, 73e, 73f in a resting state, as the cylindrical member 62 is moved rightward and rotated, the transmission plate 85a (85b, 85c, 85d) is allowed to slide on the surfaces of the cam follower members 16b (16h, 16n, 16t) and 16a (16g, 16m, 16s) so that the piston 33 is allowed to shift upward in FIG. 3C. In this case, by the work executed on the rotary actuator 51 from the outside of the rotary actuator 51, energy is accumulated in the cylinder 32 and the air-pressure tank 201.

In this manner, the rotary actuator 51 is capable of not only executing work to the outside of the rotary actuator 51, but also carrying out a regeneration operation for accumulating energy inside the linear motion actuator 51 in response to work operated from the outside of the rotary actuator 51. Therefore, in comparison with an actuator that cannot carry out the regeneration operation, the rotary actuator 51 in accordance with the second embodiment can improve the operation efficiency.

In other words, the rotary actuator 51 of the second embodiment can also solve the following conventional issues.

More specifically, the aforementioned flexible actuators, such as SEA, DM2, and VST, attempt to greatly reduce influences of inertia on the motor side onto the input from the robot arm side, by connecting the robot arm to the motor with an elastic member interposed therebetween. In other words, this structure fails to directly transmit energy inputted from the robot arm side to the motor side, thereby making it difficult to electrically regenerate the energy.

In the case of a robot that works in an area close to the person, there are many opportunities in which work is performed from the outside of the flexible actuator, such as cooperative jobs with the person or jobs for unloading objects. However, in the conventional flexible actuator that cannot carry out the energy regeneration operation, the actuator consumes energy even in a state where work is performed from the outside of the flexible actuator, with the result that the efficiency of the entire operations seriously deteriorates.

In contrast, the rotary actuator 51 in accordance with the second embodiment is capable of not only executing work to the outside of the rotary actuator 51 but also carrying out a regeneration operation for accumulating energy inside the linear motion actuator 51 in response to work operated from the outside of the rotary actuator 51, so that it is possible to improve the operation efficiency.

Next, the following will describe operations of the control computer 101 while the rotary actuator 51 is operating. In the second embodiment, 24 rows of the cam follower member groups G16a to G16x are used; however, always made in contact with the transmission plate 85a (85b, 85c, 85d) are the 2 to 3 cam follower members in the cam follower member groups. In other words, the control computer 101 carries out operations so as to set the tilt of the transmission plate 85a (85b, 85c, 85d) in a range satisfying this condition. Under this condition, the minimum number of the linear motion mechanisms required is three. In a state where the cylindrical member 62 is standing still, the tilt of the transmission plate 85a (85b, 85c, 85d) is changed by operating the 2 to 3 linear motion mechanisms, so that the generated torque can be controlled. When the computer 101 operates the seventh and ninth linear motion mechanism 72a and 72c from the state shown in FIG. 3G into a state shown in FIG. 3H, a torque is exerted on the cylindrical member 62 by a leftward force in FIG. 3H. When the cylindrical member 62 is thus rotated in the torque generation direction, the transmission plate 85a (85b, 85c, 85d) is made in contact with the cam follower member 16b (16h, 16n, 16t). In a state where the transmission plate 85a (85b, 85c, 85d) is kept in contact only with the cam follower members 16x (16f, 16l, 16r) and 16a (16g, 16m, 16s), the cam follower member 16b (16h, 16n, 16t) can be freely displaced by the eighth linear motion mechanisms 72b, so that, as shown in FIG. 3H, the control computer 101 controls the cam follower member 16b (16h, 16n, 16t) so as to be preliminarily brought to a position (desired position) where the transmission plate 85a (85b, 85c, 85d) can be smoothly made in contact therewith. In a case when the cylindrical member 62 is continuously shifted leftward and rotated to be brought into a state shown FIG. 3I, the transmission plate 85a (85b, 85c, 85c) is made in contact only with the cam follower members 16a (16g, 16m, 16s) and 16b (16h, 16n, 16t), so that, at this time, the cam follower member 16c (16i, 16o, 16u) can be freely displaced by the seventh linear motion mechanism 72a. On the other hand, in a case when work is performed on the rotary actuator 51 from the outside and the cylindrical member 62 is shifted rightward and rotated in the state shown in FIG. 3H, the control computer 101 operates the eighth linear motion mechanism 72b so as to allow the transmission plate 85a (85b, 85c, 85d) to be smoothly made in contact with the cam follower member 16w (16e, 16k, 16q) in place of the cam follower member 16b (16h, 16n, 16t). Which positional control of the cam follower member 16b (16h, 16n, 16t) or the cam follower member 16w (16e, 16k, 16q) is preferentially carried out can be determined by the rotation direction of the cylindrical member 62. More specifically, in a case when the cylindrical member 62 is rotated anticlockwise around the upward axis of FIG. 3H, the control computer 101 preferentially controls the position of the cam follower member 16b (16h, 16n, 16t) rather than the positional control of the cam follower member 16w (16e, 16k, 16q), and in a case when the cylindrical member 62 is rotated clockwise around the upward axis of FIG. 3H, the control computer 101 preferentially controls the position of the cam follower member 16w (16e, 16k, 16q) rather than the positional control of the cam follower member 16b (16h, 16n, 16t). In this manner, in response to the rotation of the cylindrical member 62, the displacements of the cam follower members 16a to 16x and the tilt of the transmission plate 85a (85b, 85c, 85d) are changed by the control computer 101 and the linear motion mechanisms 72a to 72c, so that the generated torque to be exerted on the cylindrical member 62 is controlled toward the desired value; therefore, the rotary actuator 51 can be successively operated. Of course, the direction of the generated torque of the rotary actuator 51 is not limited to the clockwise direction around the upward axis of FIG. 3H, and a tilted state reversed to that of FIG. 3H (a state tilted upward to the right in which the left end of the transmission plate 85a is directed downward with the right end thereof being directed upward) may be provided so that the generated torque can be exerted clockwise around the upward axis of FIG. 3H.

As the controlling method used when the control computer 101 operates the linear motion mechanisms 72a to 72c, in the case of changing the tilt of the transmission plate 85a (85b, 85c, 85d), it is desirable in view of energy efficiency to carry out the operations such that the reverse input from the piston 33 to the linear motion mechanisms 72a to 72c is minimized. This is because, as long as the linear motion mechanisms 72a to 72c are not allowed to carry out the energy regeneration operation, work to be operated on the linear motion mechanisms 72a to 72c by the piston 33, that is, the reverse input to the linear motion mechanisms 72a to 72c, is kept equivalent to the loss. As the specific operations, when the transmission plate 85a (85b, 85c, 85d) is tilted from the state shown in FIG. 3G to the state shown in FIG. 3H, it is desirable to keep the cam follower member 16a (16g, 16m, 16s) located on the lower side in FIG. 3H as much as possible so as not to be driven downward. As long as the stroke range of the support member 15x (15f, 15l, 15r) corresponding to the cam follower member 16x (16f, 16l, 16r) that is placed on the upper side upon tilting the transmission plate 35a (35b) and the performance of the linear motion mechanism 72a corresponding to the cam follower member 16x (16f, 16l, 16r) are acceptable, the linear motion mechanism 72c corresponding to the cam follower member 16a (16g, 16m, 16s) is made to stand still or to move upward in FIG. 3H. With these operations, the reverse input from the piston 33 to the linear motion mechanisms 72a to 72c can be reduced to the minimum. Moreover, the support members 15a to 15x need to be easily stroked upward in FIG. 3H in order to effectively exert these operations; therefore, in the case when the cam follower members 16a to 16x are newly made in contact with the transmission plate 85a (85b, 85c, 85d) in accordance with the rotation of the cylindrical member 62, the control computer 101 desirably controls the linear motion mechanism 72a to 72c so that, in the corresponding cam follower member groups, the cam follower member located as upward as possible in FIG. 3H is made in contact therewith.

Moreover, as another controlling method used when the control computer 101 controls to operate the linear motion mechanism 72a to 72c, in the case of changing the tilt of the transmission plate 85a (85b, 85c, 85d), it is desirable to carry out the operations such that the displacements of the linear motion mechanisms 72a to 72c are made to the minimum, in view of utilizing a low-speed linear motion mechanism. As the specific operations, when the transmission plate 85a (85b, 85c, 85d) is tilted from the state shown in FIG. 3G to the state shown in FIG. 3H, it is desirable to operate the linear motion mechanism 72a and the linear motion mechanism 72c so as to make the amount of upward movement of the cam follower member 16x (16f, 16l, 16r) and the amount of downward movement of the cam follower member 16a (16g, 16m, 16s) equal to each other. With this arrangement, it is possible to reduce to the minimum a velocity required to the linear motion mechanisms 72a to 72c. Moreover, the support members 15a to 15x need to be stroked in both of upward and downward directions in FIG. 3H when necessary in order to effectively exert these operations; therefore, in the case when the cam follower members 16a to 16x are newly made in contact with the transmission plate 85a (85b, 85c, 85d) in accordance with the rotation of the cylindrical member 62, the control computer 101 desirably controls the linear motion mechanisms 72a to 72c so that among the cam follower members 16a to 16x included in the cam follower member groups G16a to G16x, the cam follower members causing the corresponding support members 15a to 15x to be located closest to the center in the stroke range are made in contact therewith.

In the second embodiment, the number of the cam follower members in the cam follower member groups to be made in contact with the transmission plate is set to 2 to 3; however, the present invention is not intended to be limited to this case, and the number thereof may be increased in accordance with the number of the linear motion mechanisms. The maximum number of the cam follower members in the cam following member groups to be made in contact therewith needs to be made equal to the number of the linear motion mechanisms so as to change the tilt of the transmission plate, and the minimum number can be set to 2, so that increase in the maximum number of the cam follower members in the cam follower member groups to be made in contact therewith is desirable in view of increasing the tilt to be acceptable by the transmission plate. In contrast, limiting to 2 to 3 to the number of the cam follower members in the cam follower member groups to be made in contact with the transmission plate is desirable in view of minimizing the number of the linear motion mechanisms. However, in the case when the tilt of the transmission plate is increased, the transmission plate tends to be made in contact with both of the cam follower members in the adjacent cam follower member groups unless the distance between the cam follower members included in the cam follower member groups is sufficiently wide. In order to prevent this circumstance, the support members 15a to 15x may be designed to have a deformable or splitable structure so as to extend or separate the distance between the cam follower members 16a to 16x included in the cam follower member groups G16a to G16x.

In the second embodiment, the number of the linear motion mechanisms is made to be coincident with the maximum number of the cam follower members in the cam follower member groups to be made in contact therewith; however, the present invention is not intended to be limited to this arrangement, and the number of the linear motion mechanisms may exceed the maximum number of the cam follower members. In this case, since the positions of the cam follower members in the cam follower member groups located on the two sides of the cam follower member in the cam follower member group to be made in contact with the transmission plate can be controlled independently, this structure is desirable in view of the effect that it is not necessary for the control computer 101 to switch the cam follower member groups to be position-controlled depending on the rotation directions of the cylindrical member 62. Moreover, since this arrangement also makes it possible to independently control the positions of the cam follower members in the cam follower member groups located on one side of the cam follower member in the cam follower member group to be made in contact with the transmission plate, the cam follower member in the cam follower member group can be preliminarily shifted so that the rotary actuator 51 can be desirably operated successively even in a case when a linear motion mechanism having a slow operation speed is used.

In the second embodiment, all the support members 15a to 15x are disposed at equal intervals, and the cam follower members 16a to 16x included therein are disposed at equal intervals, so that this structure is desirable in view of controllability and performance stability of the rotary actuator 51; however, the present invention is not intended to be limited to this case.

In the second embodiment, one linear motion member (the piston 33) is combined with one rotary structural member (the cylindrical member 62); however, not being limited to this structure, a plurality of linear motion members may be combined to one linear motion structural member. Alternatively, some linear motion members thereof may be used for driving, while the other linear motion members thereof may be used for regenerating, so that energy transmission may be carried out via the linear motion members.

In the second embodiment, the inside of the rotary structural member (the cylindrical member 62) has a cyclic structure for every 90 degrees when viewed from the direction of FIG. 3D, so that it is desirable because the degree of control freedom can be reduced and because an unnecessary rotary torque is not exerted on the piston 33; however, not being limited to this structure, there may be used another structure having a cyclic structure for degrees other than 90 degrees, or still another structure in which by increasing the number of the linear motion mechanisms, the transmission plates 85a to 85d can be tilted independently.

In the second embodiment, the piston-cylinder mechanism configured by the air-pressure tank 201, the cylinder 32, and the piston 33 is used as one example of the elastic mechanism in which the potential energy is changed depending on the displacement of the piston 33; however, the structure of the elastic mechanism is not limited to the above, and another structure in which no air-pressure tank 201 is used, or still another structure in which an air/oil conversion system is formed between the air-pressure tank and the cylinder so that the piston is operated by using a hydraulic pressure, or any combinations of the known techniques, such as applications of a coil spring or a magnetic spring, may be utilized as long as the same functions can be achieved. Moreover, in a case when a plurality of rotary actuators 51 are utilized, cylinders 32 or air-pressure tanks 201 may be respectively conducted to one another. This structure is desirable because, upon operating the individual rotary actuators 51, the pressure changes can be suppressed.

The second embodiment provides the structure in which the transmission plate is installed inside the cylindrical member; however, the present invention is not intended to be limited to this structure, and another structure may be adopted in which the transmission plate is placed outside of the cylindrical member.

The motion conversion device in accordance with the second embodiment has the structure that only deals with a force applied to the linear motion member (the piston 33) in one direction; however, by forming the transmission plate into such a shape as to sandwich the cam follower members in the cam follower member groups, forces applied to the linear motion member from two directions can be dealt with.

Moreover, by using the rotary actuator 51 of the second embodiment, a joint driving unit for driving a joint that couples two arms to each other may be formed. One of the arms is secured to the cylinder 32 and the disc member 61 and the other arm is secured to the cylindrical member 62, so that the joint driving unit can be easily realized.

In this structure, the angle between the two arms can be changed by the generated torque of the rotary actuator, and when the joint angle is changed by an external force, the energy can be regenerated.

In the first embodiment or the second embodiment, among three or more adjacent support members (for example, 15*i*, 15*j*, 15*k*) that are subjected to a displacement by the three or more displacement generation mechanisms 22*a* to 22*f* or 72*a*, 72*b*, and 72*c*, the support member (for example, 15*i*) positioned on one of the end portions is designed to be displaced simultaneously with the support member (for example, 15*l*) positioned adjacent to the support member (for example, 15*k*) that is not included in the aforementioned three or more support members (for example 15*i*, 15*j*, 15*k*) and is positioned on the other end portion of the three or more support members (for example, 15*i*, 15*j*, 15*k*).

In this structure, the distribution of the support members that are operated by the respective displacement generation mechanisms 22*a* to 22*f* or 72*a*, 72*b*, and 72*c* can be made uniform so that loads to be imposed on the displacement generation mechanisms can be averaged. Therefore, a motion conversion device in which a portion occupied by the displacement generation mechanisms has a smaller size can be obtained.

Among the various embodiments or modified examples, arbitrary embodiments or modified examples may be appropriately combined, so that the respective effects can be obtained.

In accordance with the present invention, the motion conversion device, the flexible actuator using such a device, and the joint driving unit make it possible to easily control a transmission gear ratio or a force, and are superior in operation efficiency, and the present invention is effectively utilized in, for example, a joint driving actuator for a robot or a joint driving unit using the same.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A motion conversion device comprising:
   a base member;
   a rotary structural member that is held on the base member so as to rotate;
   a plurality of guide holding members that are provided on the rotary structural member and are held thereon so as to reciprocally move substantially in parallel with a rotary axis of the rotary structural member;
   a plurality of guide members that are provided respectively to the guide holding members at intervals in shifting directions of the guide holding members;
   a linear motion member that is held on the base member so as to reciprocally move in directions substantially in parallel with the shifting directions of the guide holding members;
   a rocking member that is provided to an end of the linear motion member and is held thereon so as to rock around an axis substantially perpendicular to the shifting directions of the linear motion member, while being placed so as to be in contact with parts of the guide members;
   three displacement generation mechanisms that are coupled to the guide holding members so as to allow parts of the guide holding members to be displaced relatively to the rotary structural member; and
   a control device that controls motions of the three displacement generation mechanisms so as to change a transmission gear ratio between a displacement velocity of the linear motion member and a rotation velocity of the rotary structural member.

2. The motion conversion device according to claim 1, wherein the plurality of guide holding members are provided on a circumference around the rotation axis of the rotary structural member at equal intervals.

3. The motion conversion device according to claim 1, wherein the rocking member is one of a plurality of rocking members provided to the end of the linear motion member, and
   wherein the rocking members are disposed symmetrically with respect to a center axis in the shifting directions of the linear motion member.

4. The motion conversion device according to claim 1, wherein surface portions of the guide members capable of contacting the rocking member are freely rotatable with respect to the guide holding members.

5. The motion conversion device according to claim 1, wherein the plurality of guide members are provided on the guide holding members at equal intervals.

6. The motion conversion device according to claim 1, further comprising a precompression mechanism that presses the guide holding members toward one side in the shifting directions of the guide holding members.

7. The motion conversion device according to claim 1, wherein the guide holding members hold the guide members so as to allow a distance between the guide members to be extendable.

8. The motion conversion device according to claim 1, wherein a contact surface of the rocking member against the guide members forms a plane including a rocking center axis of the rocking member.

9. The motion conversion device according to claim 1, wherein the rocking member has a tapered portion that has a contact surface for contacting the guide members, the tapered portion widening in a direction toward the guide members in a cross section perpendicular to a rocking center axis of the rocking member.

10. The motion conversion device according to claim 1, wherein the plurality of guide members includes three guide members adjacent to one another, the three guide members being displaced respectively by the three displacement generation mechanisms,
    wherein the three guide members includes a first guide member, a second guide member disposed next to the first guide member, a third guide member disposed on an opposite side of the second guide member from the first guide member,
    wherein the plurality of guide members further includes a fourth guide member disposed on an opposite side of the third guide member from the second guide member,
    wherein the displacement generation mechanisms are configured such that the first guide member is displaced simultaneously with the fourth guide member.

11. The motion conversion device according to claim 1, wherein the rocking member is one of a plurality of rocking members provided to the end of the linear motion member, and
    wherein displacements of the guide holding members in response to an operation of the displacement generation mechanisms are identical for each of installation intervals of the rocking members.

12. The motion conversion device according to claim 1, wherein, when a first guide member of the plurality of guide members located at a position closest to the linear motion member is in contact with the rocking member, and when the first guide member is displaced so as to change a tilt of the rocking member, the control device controls the operation of the displacement generation mechanisms so as to minimize an amount of displacement in a reverse direction from a contact surface of the first guide member in contact with the rocking member.

13. The motion conversion device according to claim 1, wherein, when a first guide member of the plurality of guide members located at a position closest to a center position of a respective one of the guide holding members is in contact with the rocking member, and when the first guide member is displaced so as to change a tilt of the rocking member, the control device controls the operation of the displacement generation mechanisms so as to minimize an amount of displacement in a reverse direction from a contact surface of the first guide member in contact with the rocking member.

14. The motion conversion device according to claim 1, wherein the plurality of guide members includes a first guide member, a second guide member, and a third guide member, the first guide member being disposed on an opposite side of the second guide member from the third guide member, and the first guide member and the third guide member being operated by the same one of the displacement generation mechanisms, and wherein, when the first guide member is in contact with the rocking member, the control device controls the operation of said one of the displacement generation mechanisms such that the displacement of the first and third guide member leads the rocking member to a desired position.

15. An elastic actuator comprising:
the motion conversion device of claim 1; and
an elastic mechanism which includes the linear motion member, wherein a potential energy change of the elastic mechanism causes the displacement of the linear motion member.

16. The elastic actuator according to claim 15, wherein the elastic mechanism is a piston cylinder mechanism configured to be pressurized by a compressive fluid.

17. A multi-axis actuator comprising:
a plurality of elastic actuators according to claim 16,
wherein each of the elastic actuators is configured to be pressurized by the compressive fluid.

* * * * *